US011887140B2

(12) United States Patent
Sun

(10) Patent No.: US 11,887,140 B2
(45) Date of Patent: Jan. 30, 2024

(54) RISK-CONSTRAINED OPTIMIZATION OF VIRTUAL POWER PLANTS IN POOL AND FUTURE MARKETS

(71) Applicant: Mitsubishi Electric Research Laboratories, Inc., Cambridge, MA (US)

(72) Inventor: Hongbo Sun, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 164 days.

(21) Appl. No.: 17/184,889

(22) Filed: Feb. 25, 2021

(65) Prior Publication Data
US 2022/0284458 A1    Sep. 8, 2022

(51) Int. Cl.
*G06Q 30/0201* (2023.01)
*G06Q 50/06* (2012.01)
*G06Q 10/0635* (2023.01)

(52) U.S. Cl.
CPC ..... *G06Q 30/0206* (2013.01); *G06Q 10/0635* (2013.01); *G06Q 50/06* (2013.01)

(58) Field of Classification Search
CPC . G06Q 30/0206; G06Q 10/0635; G06Q 50/06
See application file for complete search history.

(56) References Cited

U.S. PATENT DOCUMENTS

| | | | |
|---|---|---|---|
| 9,537,330 B2 * | 1/2017 | Crane | H01M 10/443 |
| 10,112,499 B2 * | 10/2018 | Shi | H02J 3/322 |
| 10,234,886 B2 * | 3/2019 | Asghari | G05F 1/66 |
| 10,755,295 B2 | 8/2020 | Ilic et al. | |

(Continued)

OTHER PUBLICATIONS

Thompson, Colin J., Guttmann, Anthony J., and Thompson, Ben J.P., "Trading indicators with information-gap uncertainty," The Journal of Risk Finance, Emerald Group Publishing Limited, vol. 9, No. 5, 2008, pp. 467-476.*

(Continued)

*Primary Examiner* — Nathan Erb
(74) *Attorney, Agent, or Firm* — Gene Vinokur; Hironori Tsukamoto

(57) ABSTRACT

Embodiments for distributing energy for an energy system having an energy generation source, an energy storage system and a load. The method including identifying a risk level for the energy system, the risk level having objectives prioritized relative to one another. Calculating an objective function based on values including energy market values, electricity rates, and power producing, storing and consumption. Identifying an Optimized solution for charging or discharging the energy storage system based on the objective function. Controlling the distribution of energy to the energy storage system for charging according to the Optimized solution based on the objective function and discharging according to the Optimized solution. The objective function is Optimized using feasibility constraints, again Optimized using technical constraints and additional constraints. The Optimized solution maximizes an expected total pool market revenue and an expected total future market revenue, while minimizing an expected total energy cost for the energy system.

18 Claims, 18 Drawing Sheets

(56) References Cited

U.S. PATENT DOCUMENTS

| | | | | |
|---|---|---|---|---|
| 11,320,796 | B1* | 5/2022 | Eltayeb | G06Q 50/06 |
| 2010/0231162 | A1* | 9/2010 | Gibson | B60L 8/00 |
| | | | | 320/101 |
| 2010/0289447 | A1* | 11/2010 | Dobson | H02J 7/00 |
| | | | | 320/101 |
| 2012/0133337 | A1* | 5/2012 | Rombouts | G07F 15/006 |
| | | | | 320/155 |
| 2013/0030784 | A1* | 1/2013 | Viassolo | G06Q 10/00 |
| | | | | 703/18 |
| 2014/0148963 | A1* | 5/2014 | Ozog | H02J 3/008 |
| | | | | 700/291 |
| 2014/0172503 | A1* | 6/2014 | Hammerstrom | G05B 15/02 |
| | | | | 705/7.31 |
| 2015/0127425 | A1* | 5/2015 | Greene | H02J 3/32 |
| | | | | 705/7.31 |
| 2016/0141874 | A1* | 5/2016 | Hunt | H02J 3/14 |
| | | | | 700/296 |
| 2016/0159239 | A1* | 6/2016 | Shi | H02J 13/00028 |
| | | | | 320/134 |
| 2016/0231725 | A1* | 8/2016 | Carter | G05B 13/041 |
| 2016/0352116 | A1* | 12/2016 | Katayama | H02J 3/32 |
| 2017/0038786 | A1* | 2/2017 | Asghari | G05F 1/66 |
| 2017/0091878 | A1* | 3/2017 | Subburaj | G06Q 40/04 |
| 2017/0096076 | A1* | 4/2017 | Hernandez Cervantes | |
| | | | | H02J 7/007182 |
| 2018/0198291 | A1* | 7/2018 | Kuo | H02J 7/007192 |
| 2019/0079473 | A1* | 3/2019 | Kumar | H02J 3/003 |
| 2019/0185025 | A1* | 6/2019 | Kumar | B61C 17/12 |
| 2019/0206000 | A1* | 7/2019 | ElBsat | H02J 3/381 |
| 2019/0385182 | A1* | 12/2019 | Price | G06Q 50/06 |
| 2020/0386814 | A1* | 12/2020 | Fogarty | H01M 10/44 |
| 2021/0328448 | A1* | 10/2021 | Konopka | H02J 7/00712 |
| 2022/0271360 | A1* | 8/2022 | Shao | H01M 10/6554 |
| 2022/0305256 | A1* | 9/2022 | Dham | A61N 1/365 |

OTHER PUBLICATIONS

Venkateswaran V, Balaji, Saini, Devender K., and Sharma, Madhu, "Approaches for Optimal Planning of Energy Storage Units in Distribution Network and Their Impacts on System Resiliency," CSEE Journal of Power and Energy Systems, vol. 6, No. 4, Dec. 2020, pp. 816-833.*

* cited by examiner

RISK-CONSTRAINED OPTIMIZATION OF VIRTUAL POWER PLANTS IN POOL AND FUTURE MARKETS

FIELD

The present disclosure relates generally to electric power systems, and more particularly to Optimization of virtual power plant scheduling and trading in electricity pool and future markets.

BACKGROUND

Global energy markets are facing major changes including moving from a model with centralized electricity generation in power plants operated by large utilities towards a decentralized power grid that includes renewable energy production. Due to the further penetration of renewable energy generation into the energy markets, the renewable energy generation has challenged the conventional way of operating power systems. Business models need to be reinvented and conventional aging power grids need to be redesigned. The multitude of different types of renewable sources like, solar, wind, hydropower, biomass plants do not necessarily endanger todays conventional power system balance, if these renewable sources are dealt with appropriately, which is exactly where a Virtual Power Plant (VPP) fits in.

VPPs are decentralized units in a power network linked and operated by a centralized control system. These decentralized units can be either power producers (e.g. solar, wind, biogas, CHP, or hydro power plants), power storage units, power consumers or power-to-X plants (such as power-to-heat and power-to-gas). When integrated into a VPP, the power and flexibility of the aggregated assets of the VPP can be traded collectively. Thus, the VPPs get access to the lucrative power markets that they would not be able to enter individually, such that any decentralized unit that consumes, stores, or produces electricity can become a part of a VPP. Typically, the VPP uses a central control system to operate every individual asset in the VPP, such that the central control system can use an algorithm. However, VPPs cannot adopt the same bidding and offering strategies and models as large conventional electricity market participants use to diversify its bidding or offering to both pool and future markets that reduces their financial risks and increase expected profits.

For example, VPPs can reach a total capacity equal to one or several nuclear power plants, though due to the volatility of renewable energy sources the total capacity can change constantly and not be reliable. If the wind isn't blowing or the sun isn't shining, solar and wind assets contribute less to the Virtual Power Plant. Combining a variety of energy sources in the VPP's portfolio is vital in order to prevent uneven power balance. Due to the grid's limited storage capacity, only about the same amount of power as is being consumed can be fed into the grid (within a certain tolerance). Assets integrated into a VPP can be power producers, power storage units, power consumers, and power-to-X plants, such as power-to-heat and power-to-gas. Some of these units are due to their flexibility especially valuable to the portfolio, these flexible assets compensate for variations in power feed-in caused by a lack of wind or a set of clouds for in both negative as well as positive directions. Thus, due to the VPPs constant changing of total power capacity and unreliable generation, new bidding and offering strategies and models need to be created for the VPPs to diversify their bidding or offering for both pool and future markets that reduce their financial risks and increase expected profits, of which, there are no such strategies and models in today's energy markets for VPPs.

There are many challenges for the Virtual Power Plants (VPPs) to overcome despite the intermittent and unreliable renewable source generation, that convention power systems do not face to meet high demands at peak operating demand periods. Some of these challenges for VPPs include predicting amounts of generated powers for the pool and future markets, since power production is not guaranteed, as with conventional power systems. Further, the renewable source generation systems are much different in terms of operation, including start-up and shut-down cycles, maintenance, generating energy capacity and natural volatility to environmental events, when compared with conventional power systems such as coal, natural gas and nuclear power systems. Other challenges for the renewable sources include time-restrictions in terms of time-specific power generation of power during daytime hours or for specific season of the year, due to each specific renewable source, i.e. solar systems generate power during the day, wind typically generates power at times during the day and seasons of the year that doesn't correlate with demand, etc., which is different from peak demand time schedules. Another challenge is that renewable sources don't have the amount of back up energy storage supply, i.e. battery storage, required to meet the power grid specific peak demands at specific times of the day. Because of the volatility problems providing reliable power with inadequate power reserves, creates huge challenges for VPPs that do not have access and will need to create Optimization models and strategies to Optimize distribution of produced renewable energy, energy storage and local demand loads. A lack of battery storage for VPPs is at least one main reason why renewable sources have not gained momentum in past years. Today's energy markets failed to address VPPs Optimization not only for VPPs bidding or offering for both the pool and future markets but also failed to address power storage Optimization for VPPs operating in both the short-term and long-term markets. The lack of VPP power storage optimization consequently restricts VPPs from achieving a minimum market participant competitive level to achieve energy-efficiency investments in both the short- and long-term energy markets.

There are several existing bidding Optimization efforts for VPPs in only short-term energy market, but there is lack of work on virtual power plants' bidding or offering Optimization within both the short-term and long-term markets, i.e. the pool markets and future market. For example, US patent application U.S. Pat. No. 8,849,687 B2 disclosed method dispatching energy from a plurality of distributed storage resources in a discharge event so that the energy stored in each of the plurality of distributed resources is levelized. However, the U.S. Pat. No. 8,849,687 B2 patent failed to address VPPs Optimization for VPPs bidding or offering in both the pool and future markets. Further, these methods also failed to address the VPPs Optimization for power storage Optimization for VPPs operating in both the short-term and long-term markets.

Therefore, there is a need for developing VPP Optimization models and strategies for Optimizing distribution of produced renewable energy, energy storage and local demand loads for VPPs for both the pool and future markets.

SUMMARY

The present disclosure relates generally to electric power systems, and more particularly to Optimization of virtual power plant scheduling and trading in electricity pool and future markets.

The present disclosure includes systems and methods for virtual power plants or virtual power producers (VPPs) to derive self-scheduling of energy production, storing and consumption, that uniquely selects future forward contracts, along with obtaining offering strategies for pool markets. These systems and methods Optimize the distribution of generated electrical energy to energy storage and to local load demands as well as Optimize storage charging and discharging. The Optimized solution provides for maximizing a total pool market revenue and a total future market revenue, while minimizing a total energy cost for the VPPs. Presently, there is no known methods that address the problem for VPP's wanting to enter both the pool the futures markets. In particular, VPP's do not have access to method strategies for VPPs to be market participants in the futures market, where the VPP's needs to sign future forward contracts up to a mid-, or long-term horizon in advance, while also formulating pool market strategies. For example, without the VPP knowing an Optimization strategy for the VPPs energy storage & discharging for both the short- and long-term energy markets, it is difficult for the VPP's to determine a bidding & offering strategy. Also, without the VPP's knowing an Optimized VPPs bidding & offering strategy for both markets, it is difficult for the VPPs to maximize its profits (in both the pool and futures markets), while controlling the risk of variability of those profits, which is required to be a competitive market participant. This especially true because the before the beginning of each market scheduling time period, the VPP needs to determine the best production and consumption scheduling of its generation and storage units and load demands for the whole period. Further, any VPP decisions pertaining to the signing of these forward (or bilateral) contracts need to be made just before the beginning of the scheduling time period.

Further still, at least one realization gained from test approaches during experimentation is that the VPPs need to develop a coordinated energy storage & discharging Optimization strategy for both the short- and long-term energy markets, that include estimating amounts of storing & discharging to be able to determine a bidding & selling strategy. Another realization is that because estimating pool market prices is highly volatile, VPPs need to have a coordinated bidding & selling strategy in both markets, the futures market has less volatility, so VPPs can sign future forward contracts to protect them against the high pool pricing volatility in the pool market. Thus, at least one goal to achieve for the embodiments of the present disclosure is wanting to Optimize VPPs energy storage & discharging for both the short- and long-term energy markets, while addressing the problem of the VPPs having to sign future forward contracts up to a mid-, or long-term horizon in advance.

So, how to solve the VPP's decision making problem of being a participant in both the pool and futures market with a coordinated Optimization strategy, among some aspects. The systems and methods of the embodiments of the present disclosure are formulated as a risk-constrained Optimization problem which renders a mixed-integer linear programming problem that is solvable using commercially available software. The risk-constrained Optimization problem is based on using: (1) an information gap decision theory (IGDT) to model non-stochastic uncertainties relating to future market prices. In the IGDT model, a forecasted amount can be presumed for each uncertain variable, and the sensitivity of objective functions is analyzed according to the deviation of each of these uncertain parameters from their forecasted value. Thus, the IGDT can be used to model the uncertainty pertaining to future market prices; and (2) using a stochastic dominance concept can be for risk management of the formulated problem by maximizing expected total profits with added additional Stochastic Dominance constraints (SDCs), such that the problem's feasible region is modified to ensure the problem's Optimal distribution outperforms a minimum distribution imposed by the VPP. For example, these SDCs impose a minimum tolerable "reference" distribution, which is called "benchmark distribution" or simply "benchmark". In which, the SDCs modify the problem's feasible region such that the problem's Optimal distribution outperforms or dominates the benchmark imposed by the decision maker. Of which, a second-order SDC can be added that is most applicable to describe preferences of rational and risk-averse decision-makers. Thus, the SDCs along with expected total profit maximization can be used to model the uncertainty of pool market prices, renewable generations and local load demands.

Initially, to better understand the context of the problem, the pool and futures markets are explained. For example, the pool market and for the sake of simplicity, can be considered a day-ahead market which is a combination of actual day-ahead market and real-time market. The electricity pool prices are highly volatile. The futures market presents a higher average price for the buyer, and a lower average price for the seller than the pool market but involves less volatility. Therefore, from an electricity seller point of view, future contracts protect against pool price volatility but at the cost of lower expected profit. The decision horizon includes a set of pool bidding time periods. Future contracting decisions are made at the beginning of the horizon and affect the whole horizon. The set of decisions pertaining to the pool market are made throughout the horizon. Note that decisions related to the futures market are made before knowing the realizations of the stochastic variables, while decisions related to pool market are made using a rolling horizon approach. A VPP may decide to buy electric energy in the futures market to sell it in the pool market in order to increase its profit but at the cost of a higher risk, or can sell its produced energy in the futures market which decreases the risk inherent to pool price volatility at the cost of a lower profit.

Some embodiments of the present disclosure use the methodology for the VPP to schedule its energy production and consumption, that selects forward contracts from the future electricity market, and obtains offering strategies for the pool market. Strips and Options are used to represent the contract formats in future markets. A strip is a contract of purchasing or selling a fixed amount of power at a fixed price before the operating day. Another contract in the future market is an Option, which is the right to purchase or sell a fixed amount of power at a fixed price months before the operating day. A certain amount of premium will be paid, and the decision to execute the Option or not is made on the operating day/hour. The Option can be executed as a whole, or partially, i.e. independently for each time period. There are two types of Options, call Options (to purchase) and put Options (to sell).

The virtual power plant (VPP) can consist of a set of wind power plants, solar power plants, energy storage systems, and a set of local flexible loads. The flexible loads can sell their rights for power consumption. The VPP can be a virtual energy plant, an energy hub, a multi-generation system or multi-energy systems. Other aspect about the VPP's can include renewable generation systems and energy systems having one of electrical, kinetic, mechanical, electrochemical, fluidic and thermal systems, along with energy storage systems with varying energy storage capacities at one or more locations, and of different types including flywheels, capacitors, etc. Still other aspects associated with VPP renewable sources can include environmental that can be related to one of air temperature, day/night temperature differential, length of daylight, humidity, precipitation, air pressure, cloud cover, wind speed, wind direction and type of season. Other aspects can include storage temperature, storage pressure & time, and tidal conditions. Further aspects can be operational & maintenance associated with an estimated component performance level at each location, etc.

The embodiments of the present disclosure formulate the decision making for the VPP as a risk-constrained Optimization problem based on an information gap decision theory (IGDT) and a stochastic dominance (SD) concept. The risk caused by statistical uncertainties pertaining to pool market prices, renewable generations and local loads can be modeled using sampled stochastic scenarios and second-order stochastic dominance constraints, and the risk caused by non-statistical uncertainty pertaining to future market prices can be modeled using constraints described by applying information gap decision theory. Such formulation can allow the VPP to maximize its expected profit while controlling the risk of profit variability. This risk-constrained Optimization model renders a mixed-integer linear programming problem that is solvable using commercially available software.

How to Decide which Forward Contracts to Sign for the Futures Market?

Deciding which forward contracts to sign is thus a complex decision-making problem involving significant uncertainty over a mid-term, or long-term horizon. This problem can be addressed through a stochastic programming framework. The price for future market is treated as deterministic, but the impacts of its possible uncertain variation can be modeled using information gap decision theory. The pool price, renewable generations, and local demands are treated as stochastic variables, and associated uncertainty is described through a set of scenarios which can be created by using Monte-Carlo simulation.

For example, the scenario generation approach is used based on the Monte Carlo simulation to generate a set of scenarios, and each scenario contains a plausible realization of pool prices, generation resources and load demands, solve a first Optimal solution to decide pool and future market trading decisions. Wherein the uncertainties or variable's include Renewable Generation, Load Demands, Pool Price, and assumed these variables follow truncated normal distribution; wherein an objective function is calculated based on values of energy market values, electricity rates and/or the local electrical load that includes determining expected total profits, and apply constraints that enforce energy balance for each time period and each scenario. To be discussed later, a next step may use a second-order stochastic dominance constraints to regulate the profit distribution upon the first Optimal solution, then get a second Optimal solution. Also to be discussed later, another step can be using the IGDT (information gap decision theory) model to model the uncertainties relating to the future market pricing, and the variables are within a range with lower and upper bounds, then a third Optimal solution for final future and pool market trading decisions.

Some embodiments include systems and methods having steps that can include identifying a risk tolerance level for the energy system, wherein the risk tolerance level have objectives prioritized relative to one another. The objectives can include one or more objectives associated with uncertainties of future market prices for a future market, which is prioritized relative to one or more other objectives associated with uncertainties of pool market prices, renewable generation and local load demand for a pool market. The VPP's uncertainties of pool market prices are some statistically independent sources of uncertainties: 1) wind generation, 2) solar generation, 3) local demand, and 4) pool market clearing price. These random variables follow truncated normal distribution, i.e. the variables are within a range with lower and upper bounds but follow a normal distribution. A scenario generation methodology can be used to generate an appropriate set of scenarios. Since the number of scenarios increases the size of the stochastic programming model, the number of considered scenarios should be a size enough to guarantee tractability of the problem, and large enough to properly model the pool uncertainty.

These above embodiments include an objective function calculated based on values including at least one of energy market values, electricity rates, and power producing, storing and consumption; Wherein an Optimized solution can be identified for charging or discharging the energy storage device based on the objective function. Wherein controlling the distribution of electrical energy to the energy storage device for charging can be accomplished according to the Optimized solution based on the objective function. Further, controlling the distribution of electrical energy from the energy storage device for discharging is according to the Optimized solution. The objective function can be first Optimized using feasibility constraints generated from a lower bound and an upper bound of an information gap region in the risk tolerance level of the VPP. Wherein the feasibility constraints are information gap constraints associated with uncertainties of future market prices, and generated from a selling price for the upper bound of the information gap region, and a buying price for the lower bound of the buying information gap region for a risk-averse VPP. Similarly, a risk-seeking VPP generates its information gap constraints from a selling price for the lower bound of the information gap region, and a buying price for the upper bound of the buying information gap region for a risk-averse VPP. Then, a second Optimization can use technical constraints along with additional constraints that is generated from a lower boundary for a profit distribution. Wherein the technical constraints are second-order stochastic dominance constraints associated with uncertainty of pool market prices, renewable generation and the local load demand for a pool market. The additional constraints include trading related constraints, and scheduling related constraints; wherein trading related constraints include power balance equations between traded power and produced and consumed power for each time period and stochastic scenario, block-wise non-decreasing/non-increasing characteristics for biding/offering curves of future Option contracts and future strip contacts, non-increasing characteristics for offering curves of pool market, relationships between execution of trading block and trading rights for block of future Option contacts for each time period and stochastic scenario, mutual exclusivity for selling and buying Option and strip contracts, maximum allowed selling and buying powers for future Option and strip contracts at each time period, maximum allowed selling powers for pool market at each time period; wherein scheduling related constraints include energy balance equation for storages, minimum and maximum stored energies for storages, maximum charging and discharging capacities for storages, maximum generated powers for wind and solar power plants, maximum load curtailments for loads. Which provides for the Optimized solution that maximizes the total expected pool market revenue and the total expected future market revenue, while minimizing the total expected energy cost for the energy system. In other words, the Optimized solution distributes electrical energy for the VPP utilizes values that can include energy market values, electricity rates, and power producing, storing and consumption; as well as includes stochastic programming analysis based on information gap decision theory (IGDT) and stochastic dominance concept (SD). Such formulation for the VPP decision making allows the VPP to maximize expected profits, while controlling the risk of profit variability. This stochastic programming model renders a mixed-integer linear programming problem that can be solvable using commercially available software.

For example, the stochastic dominance (SD) concept can be used for risk management of the formulated stochastic programming problem against stochastic uncertainties. SD constraints (SDCs) are added to the problem's set of constraints to impose a minimum tolerable "reference" distribution, which can be called "benchmark distribution" or simply "benchmark". Those SDCs modify the problem's feasible region such that the problem's Optimal distribution can outperform or dominate the benchmark imposed by the decision maker. The second-order SDC can be most applicable to describe preferences of rational and risk-averse decision-makers. Meanwhile, the information-gap decision theory (IGDT) can be one of a robust Optimization approach, or one of a opportunistic Optimization approach for solving stochastic programming problems according the risk altitude adopted by the VPP. In an IGDT model, a forecasted amount is presumed for each uncertain variable, and the sensitivity of objective functions is analyzed according to the deviation of each of these uncertain parameters from their forecasted value. In the present disclosure, the SDC along with stochastic scenario sampling can be used to model the uncertainty of pool market prices, renewable generations and local load demands, and IGDT is used to model the uncertainty pertaining to future market prices. Such that the strips and Options are used to represent the contract formats in future markets. An aspect of an overall goal(s) for some embodiments of the present disclosure is for Optimize VPP's offering & bidding strategies to allow for self-schedule energy production and consumption, select future forward contracts, and to obtain offering strategies for the pool market, that results in maximizing expected profit while controlling the risk of profit variability. Such formulation allows the virtual power plant to maximize its expected profit while controlling the risk of profit variability. This stochastic programming model renders a mixed-integer linear programming problem that is solvable using commercially available software.

Some System & Method Implementation Steps by VPP CC System

A step for some embodiments of the present disclosure using a VPP centralized control (CC) system or management processing platform (or some other systems) connected a network cloud and a communication network can include the step of receiving real-time data, including networking data from VPP energy related systems. Some of the network data can be from generated renewable energy system(s), renewable energy storage system(s), etc., associated with the VPP. Other data is also received including accessing historical data, weather related data including weather forecasts, component historical data can be accessed, historical pool and future markets data, etc.

A next step can be obtaining a risk tolerance level for the VPP, such that each risk tolerance level includes specific objectives prioritized relative to one or more another objectives. The risk attitude or risk tolerance level of the VPP, i.e. decision maker, affects the bidding strategies and revenues. For example, a risk-averse (RA) decision maker prefers a conservative strategy to a risky one wishing to be immune to unfavorable uncertainties, whereas a risk-seeking (RS) decision maker prefers an opportunistic strategy to a conservative one by taking uncertainties as opportunity. In Information gap decision theory, the robust and opportunistic models are prescribed respectively for the risk-averse and risk-seeking decision makers to hedge the performance risk of the concerned problem against severe non-stochastic uncertainties.

Another step can be analyzing the received data while considering the VPP's risk tolerance level. Some aspects can include calculating an objective function of stochastic Optimization based on values including one or more of energy market values, electricity rates, and power producing, storing and consumption. As noted above, the objectives include objectives associated with uncertainties of future market prices for a future market, which is prioritized relative to other objectives associated with uncertainties of pool market prices, renewable generation and the VPP local load demand for a pool market. For example, the objection function can include the expected total profits of the VPP, which can be computed as (1) revenue from selling energy minus the cost derived from buying energy through future Option contracts in the future market;
(2) revenue from selling energy minus the cost derived from buying energy through future strip contracts in the future market;
(3) expected revenues obtained from selling energy in the pool; and
(4) minus the expected wear cost for production of renewables and storages and purchasing cost for customer rights for power consumption.

A next step upon calculating the objective function can be identifying an Optimized solution for charging or discharging the energy storage devices based on the objective function. A step can be controlling the distribution of electrical energy to the energy storage device for charging according to the Optimized solution based on the objective function. Another step can be controlling the distribution of electrical energy from the energy storage device for discharging according to the Optimized solution. Still another step may be, that the objective function is first Optimized using feasibility constraints generated from a lower bound and an upper bound of an information gap region in the risk tolerance level. Wherein the feasibility constraints can be information gap constraints associated with uncertainties of future market prices and generated from a selling price for the lower bound of the information gap region and a buying price for the upper bound of the information gap region for a risk-averse VPP, or generated from a selling price for the upper bound of the information gap region and a buying price for the lower bound of the information gap region for a risk-seeking VPP.

A step can be a second Optimization using technical constraints along with additional constraints that generates a lower boundary for a profit distribution. Wherein the technical constraints can be second-order stochastic dominance constraints associated with uncertainty of pool market prices, renewable generation and the local load demand for a pool markets. Further, the additional constraints additional constraints include trading related constraints, and scheduling related constraints; wherein trading related constraints include power balance equations between traded power and produced and consumed power for each time period and stochastic scenario, block-wise non-decreasing/non-increasing characteristics for biding/offering curves of future Option contracts and future strip contacts, non-increasing characteristics for offering curves of pool market, relationships between execution of trading block and trading rights for block of future Option contacts for each time period and stochastic scenario, mutual exclusivity for selling and buying Option and strip contracts, maximum allowed selling and buying powers for future Option and strip contracts at each time period, maximum allowed selling powers for pool market at each time period; wherein scheduling related constraints include energy balance equation for storages, minimum and maximum stored energies for storages, maximum charging and discharging capacities for storages, maximum generated powers for wind and solar power plants, maximum load curtailments for loads.

The Optimized solution is performed to maximize an expected total pool market revenue and an expected total future market revenue, while minimizing an expected total energy cost for the VPP. For example, the VPP CC system can respond to pricing signals and accommodate market requirements within the identified risk tolerance level in real-time. For example, the embodiments of the present disclosure can: (1) maximize the expected total pool revenue by adjusting storage discharging and charging with respect to the variation of renewable and load demands to offer sustaining powers for favorable pool price periods; (2) maximize the total future market revenue by strategically mixing selling and buying decisions for future Option and strip contracts and coordinating with pool offerings; and (3) while minimizing a total energy cost for the energy system by considering wear costs for power producing and storing for renewable plants and energy storages, and the purchasing costs for customer power consumptions. Thus, the systems and methods of the present disclosure consider in the Optimized solution some VPP aspects for each time period including: (1) forecasting of total power generation; (2) forecasting of total local power load, (3) identifying energy storage current level and maintenance schedule; (4) forecasting selling price(s) for pool market; (5) forecasting buying and selling strip price(s) in future market; and (6) forecasting buying and selling Option premium and execution price(s) in future market.

Some advantages and benefits for the VPP's utilizing the systems and methods of the present disclosure can include providing the VPP with an individualized power distribution and cost savings during operation and real-time pricing environments, based upon a specific VPP scenario for a specific time period. For example, some renewable power sources such as wind power systems generate power at times during the day and seasons of the year that doesn't correlate with demand, etc., which is different from peak demand time schedules, when the pool market price of electricity is generally higher than the flat rate. Solar power systems generate power during the day, and like wind power systems, generate power when the pool market price of electricity is generally higher than the flat rate. As market participants, VPP's are faced with making decisions of whether to switch from a flat-rate plan to a time of use or real time pricing plan, in order to try and save money or earn more money. However, without having any strategy in place to provide Optimized solutions for each specific VPP scenario for a specific time period, VPP's will not make any switch from flat-rate plan to a time-of-use or real-time pricing plan, even though the time of use or real time pricing plans are less expensive or more profitable. At least some reasons why the VPP will not make such a decision to switch is that VPP's have no control over wholesale electricity prices, the volatility of this market in combination with high peak demand rates make the guaranteed flat rate plan a risk adverse or safer Option, even though such a decision is more expensive or less profitable. In contrast, a VPP using the embodiments of the present disclosure can have a strategy tailored specifically for each VPP scenario for a specific time period that provides Optimized solutions incorporating the VPP's specific risk tolerance level for the time period.

Some other advantages and benefits for the VPP's utilizing the systems and methods of the present disclosure can include providing the VPP with individualized local demand load maximization and Optimization resulting in cost savings during operation and real-time pricing environments. Because each local demand load is connected in real-time to the VPP centralized control (CC) system, the VPP CC system receives operational data from all of the VPP power generation systems. The systems and methods of the embodiments of the present disclosure provide VPP's with updated Optimization shortly after receiving the data resulting in delivering to the VPP's Optimized solutions specific to their risk tolerance level, in order for the VPP's to make decisions within the allocated market participant decision making industry time-frame. Wherein the VPP's can make the decisions that can allocate economic benefits for the VPP, i.e. by lowering peak consumption and maximize power generation.

Yet another advantages and benefits for the VPP's utilizing the systems and methods of the present disclosure can include enabling the VPP trading for both short- and long-term markets by making full usage of energy storages. The VPP is conventionally designed to aggregate distributed renewable generations serving local loads and feeding surplus into power grid. Due to the intermittence of renewable generation, the VPP can participate in short-term market at the moments the power surplus occurs with the amount that the power grid can absorbs. Therefore, considered the investment cost of storages and poor capability for profit earning, the conventional methods for VPP fail to be considered storages for determining its trading strategy in power markets. With the cost dropping for storages, and the increasing installations of renewables, the VPP equipping with storages becomes feasible and necessary. With the storages, the VPP has capable of adjusting generation profiles, and then enable the VPP to be an active participant in both short-term market and long-term market. The present disclosure has provided methods and systems for meeting the business need for managing the operation and trading of VPP with storages for the power industry. Although, the concept the present disclosure for distributing of electricity are demonstrated by configuring the VPP as a combination of solar power plant, wind power plant, and power storage, the method and system included in the present disclosure can be applied to other configurations as well. For example, it can be used for different types of renewable and storage sources configurations, for example, (1) solar plant and wind plant and battery storage, (2) solar plant and hydropower plant and battery storage, (3) solar plant, biomass plant and battery storage, etc.

Practical Applications

The embodiments of the present disclosure addressed a need within the VPP industry for VPP's to be an active competitive participate in both the pool and futures market, by providing Optimized solutions specific to the VPPs scenario at a specific time period. Some aspects of the Optimized solutions include maximizing VPP energy storage (mobile and stationary at one or more locations) that allow VPPs to honor trading commitments to satisfy base-load contracts in both the pool and future markets. Specifically, the VPP Optimize solutions of the present disclosure create energy market opportunities for the VPP to be a market participant just as the large utility market players, and even better due to their flexibility, not like the large utilities.

For example, the VPPs can now achieve additional financial profiting opportunities resulting in additional profits increasing the VPPs overall return on investment. This can be because the Optimized solution customizes the VPP risk tolerance levels, updates in real-time (updated with real-time data within energy market participants trading decision timelines) for each time period. The VPP customization incorporates real-time many aspect of the VPP including one or real-time operational limitations, weather, energy market trading, third party data, etc. Some of additional available opportunities that the customized VVP solution provides can include: (a) load shifting or peak shaving; (b) provide additional services such as demand loads or power grid demands either expected or unexpected; (c) schedule maintenance and upgrades to VPP's components without loss of operation or profits; (d) provide services for unexpected or expected, transmission, supply or some other issues based on the normal VPP operation, customer requests and power grid requests; (e) allow transition time to add additional power generation or energy storage (i.e. possible newer renewable energy sources or upgrading, or due to growth or cycling out old components), which requires transition/additional type action services or a certain types of power; and (f) time shifting of energy buying or selling at a cost saving or some settling purposes. But for, Optimized solutions that maximize an expected total pool market revenue and an expected total future market revenue, while minimizing an expected total energy cost for the VPP's system, the VPPs could not operate in both the pool and future markets, at a level of an effective competitor as to a level of an effective competitor of the large long-standing power utilities market participants in the energy short and long-term markets.

The customized Optimized solution considers many aspects using the information gap decision theory (IGDT) to model uncertainties relating to future market prices, along with using the stochastic dominance concept (SD) for risk management of the formulated problem, and adds additional SD constraints that modify the problem's feasible region to ensure the problem's Optimal distribution outperforms a minimum distribution imposed by the VPP. In particular, these aspects can include considering one of a location of energy storage (mobile or stationary) and their location (i.e. environments, landscaping, local tariffs & tax costs, additional operational or maintenance costs, etc). Other aspects considered can include risks corresponding to potential benefits, financial returns in view of the VPPs given risk tolerance level as a market participant in the pool and future markets. These factors can include an amount of capacity of energy stored (measured by kW and/or kWh), a cost of storing energy (measured by $/kW and/or $/kWh), operational costs including maintenance costs, an estimated operating cycle life and a comparison of an amount of power generation vs energy stored. Other factors are considered, all of which depends upon a user requirement.

Some other benefits of the systems and methods of the present disclosure is improved battery storage, and can generate value for VPP's by adding energy storage capacity, increase shifting loads, and/or improving power quality, to result in balancing power to the grid for VPPs. The systems of the present disclosure address a current need in the Energy storage industry, the industry is experiencing declining costs and improved performance, particularly relating to lithium-ion batteries, since expanding electric vehicle markets are promoting manufacturing economies of scale. For example, Lithium-Ion battery prices fell 80% from 2010-2017 ($/kWh). As an example, Florida Power & Light Company has a DC-coupled battery system (Citrus Solar Energy Center), captures energy that exceeds inverter capacity when the sun's rays are strongest, the battery system has the potential to harness millions of kilowatt-hours of surplus solar energy a year that would normally be lost, thus improving both the quantity and predictability of the plant's output. With an increased renewable energy power generation predictability, in turn, provides, the utility to more efficiently dispatch other power plants, helping customers to save on energy costs. However, because there are no known VPP Optimization models and strategies for Optimizing distribution of produced renewable energy, energy storage and local demand loads for VPPs in both the pool and future markets, in today's Energy Industries. The systems and methods of the present disclosure are designed to fill that void in today's Energy Industries, along with filling other aspects.

According to an embodiment of the present disclosure, a method for distributing energy for an energy system having an energy generation source, an energy storage system and a demand load. The method comprising identifying a risk tolerance level for the energy system, the risk tolerance level having objectives prioritized relative to one another. Calculating an objective function based on values including one or more of energy market values, electricity rates, and power producing, storing and consumption. Identifying an Optimized solution for charging or discharging the energy storage system based on the objective function. Controlling the distribution of energy to the energy storage system for charging according to the Optimized solution based on the objective function. Controlling the distribution of energy from the energy storage system for discharging according to the Optimized solution. Wherein the objective function is Optimized using feasibility constraints generated from a lower bound and an upper bound of an information gap region in the risk tolerance level. Then, Optimized using both technical constraints and additional constraints generated from a lower boundary for a profit distribution. Wherein the Optimized solution is performed to maximize an expected total pool market revenue and an expected total future market revenue, while minimizing an expected total energy cost for the energy system.

According to another embodiment of the present disclosure, a system for distributing energy for an energy system including a renewable generating source, an energy storage system and a conversion system. Wherein the energy storage system stores energy from the renewable generating source and a grid, and supplies energy to the demand load and the grid. Wherein the conversion system directs a flow of energy between the energy storage system, the renewable generating source and the grid. The system comprising a centralized control (CC) system is configured to identify a risk tolerance level for the energy system, the risk tolerance level having objectives prioritized relative to one another. Calculate an objective function based on values including one or more of energy market values, electricity rates, power production and consumption. Identify an Optimized solution for determining (a) when energy from the renewable generating source and the grid are to be authorized to flow to the energy storage system or the demand load, according to the Optimized solution based on the objective function, and (b) when energy from the energy storage system are to be authorized to flow to the demand load and the grid, according to the Optimized solution. Wherein the objective function is Optimized using feasibility constraints generated from a lower bound and an upper bound of an information gap region in the risk tolerance level. Wherein another Optimization using both technical constraints and additional constraints generated from a lower boundary for a profit distribution. Wherein the Optimized solution is performed to maximize an expected total pool market revenue and an expected total future market revenue, while minimizing an expected total energy cost for the energy system.

According to another embodiment of the present disclosure, a system for distributing energy for a virtual power plant (VPP). The VPP including a renewable generating source and an energy storage device, and a conversion system. Wherein the energy storage device is to store energy from the renewable generating source and a grid, and supply energy to a local demand load and the grid. Wherein the conversion system is to direct a flow of energy between the energy storage device, the renewable generating source and the grid. The system comprising a centralized control (CC) system in communication with the renewable generating source, the energy storage device, the grid and the conversion system. The system is configured to identify a risk tolerance level for the energy system, the risk tolerance level having objectives prioritized relative to one another. Calculate an objective function based on values including one or more of energy market values, electricity rates, power production and consumption. Identify an Optimized solution formulated as a risk-constrained Optimization problem for determining: (a) when energy is to be authorized to flow from the renewable generating source and the grid to the energy storage device or the demand load, according to the Optimized solution based on the objective function, and (b) when energy is to be authorized to flow from the energy storage device to the demand load and the grid, according to the Optimized solution. Wherein the objective function is Optimized using feasibility constraints generated from a lower bound and an upper bound of an information gap region in the risk tolerance level. Then, another Optimization using both technical constraints and additional constraints generated from a lower boundary for a profit distribution. Wherein the Optimized solution is performed to maximize an expected total pool market revenue and an expected total future market revenue, while minimizing an expected total energy cost for the energy system.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates to virtual power plant (VPP) Optimization models and strategies for distribution of produced renewable energy, energy storage and local demand loads for VPPs for both the pool and future markets.

Figure 1A:
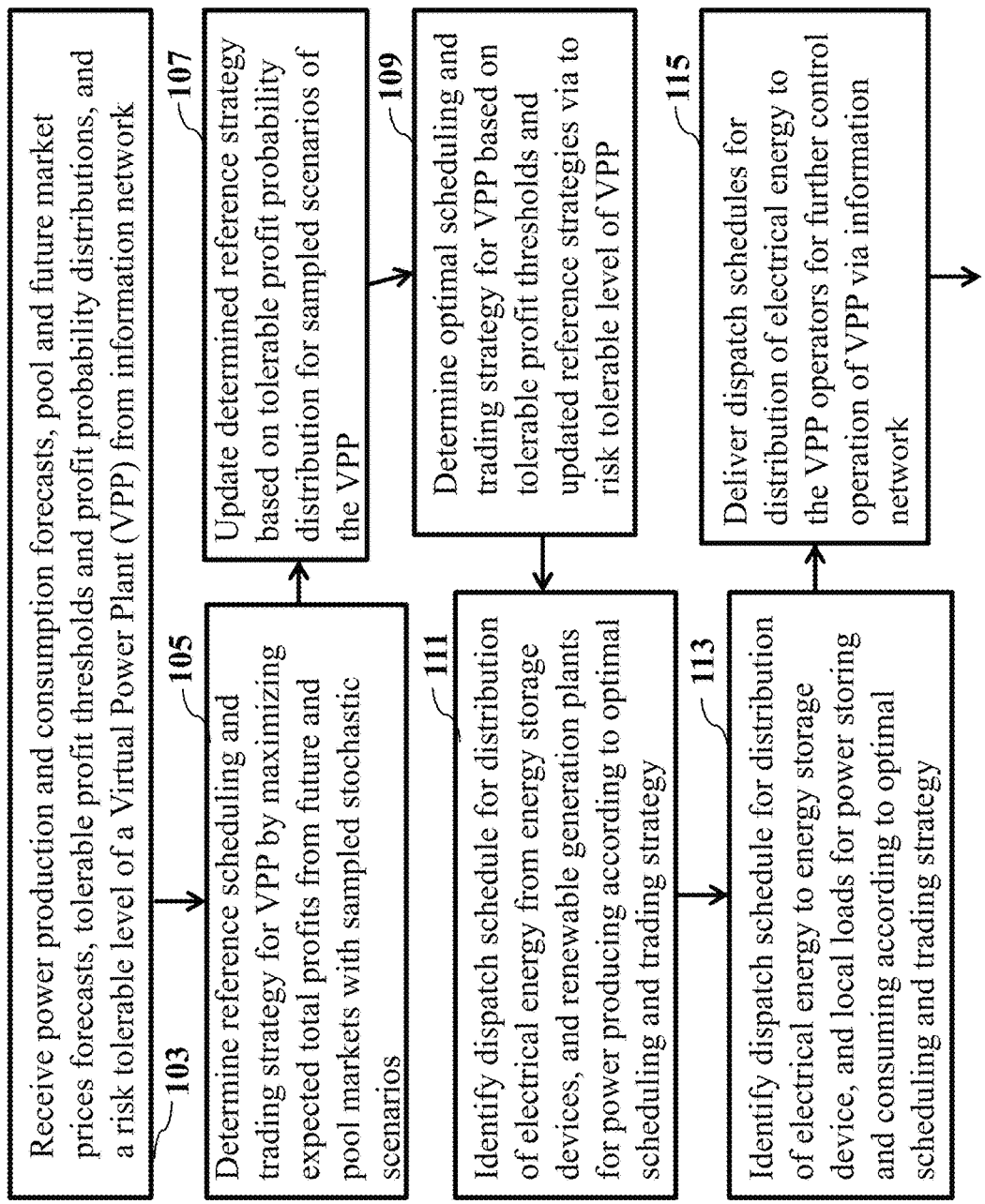
FIG. 1A is a block diagram illustrating some steps for a method for distributing electrical energy for a Virtual Power Plant (VPP), according to embodiments of the present disclosure.

FIG. 1A is a block diagram illustrating some steps for a method 100A for distributing electrical energy for an energy system such as a Virtual Power Plant (VPP) that includes an energy storage device, a distributed generation plant, and a local electrical load, according to embodiments of the present disclosure. Step 103 of FIG. 1A, includes receiving power production and consumption forecasts, pool and future market prices forecasts, tolerable profit thresholds and profit probability distributions and a risk tolerable level of a Virtual Power Plant (VPP) from information network. The tolerable profit thresholds give a set of scale factors to determine the profit thresholds according to the risk tolerable level of the VPP for managing financial risks caused by future market price uncertainty. The tolerable profit probability distribution give a set of scale factors and associated probabilities to determine the benchmark cumulative distribution for VPP profits to hedge the risks for undesirable profit distribution for stochastic scenarios caused by pool market price, renewable generation and local load demands.

Step 105 of FIG. 1A, includes determining a reference scheduling and trading strategy for the VPP by maximizing expected total profits from future and pool markets with sampled stochastic scenarios. Step 107 of FIG. 1A, includes updating the determined reference strategy based on tolerable probability distribution of profits of the VPP. Step 109 of FIG. 1A, includes determining an Optimal scheduling and trading strategy for the VPP based on tolerable profit thresholds and updated reference strategy according to the risk tolerable level of the VPP. Step 111 of FIG. 1A, includes identifying the dispatch schedule for distribution of electrical energy from the energy storage devices, and renewable generation plants for power producing according to the Optimal scheduling and trading strategy. Step 113 of FIG. 1A, includes then, identifying the dispatch schedule for distribution of electrical energy to the energy storage device, and local loads for power storing and consuming according to the Optimal scheduling and trading strategy. Step 115 of FIG. 1A, includes delivering the dispatch schedules for the distribution of electrical energy to the VPP operators for further control the operation of the VPP vis information network.

The systems and methods of the embodiments of the present disclosure provide can be designed for VPPs as an apparatus or as add-on software to existing VPP system to self-schedule the VPPs energy production and consumption, select future forward contracts, and to obtain offering strategies for the pool markets. Specifically, the systems and methods can manage, monitor, and control electrical power generation via the DERs, charge/discharge stored energy, supply demand loads, monitor demand load information, monitor energy rate information, monitor weather information, monitor VPP component information, etc., and analyze all the gathered data to determine an Optimized solution for a specific time period within the year having specific weather conditions along with other considerations.

Figure 1B:
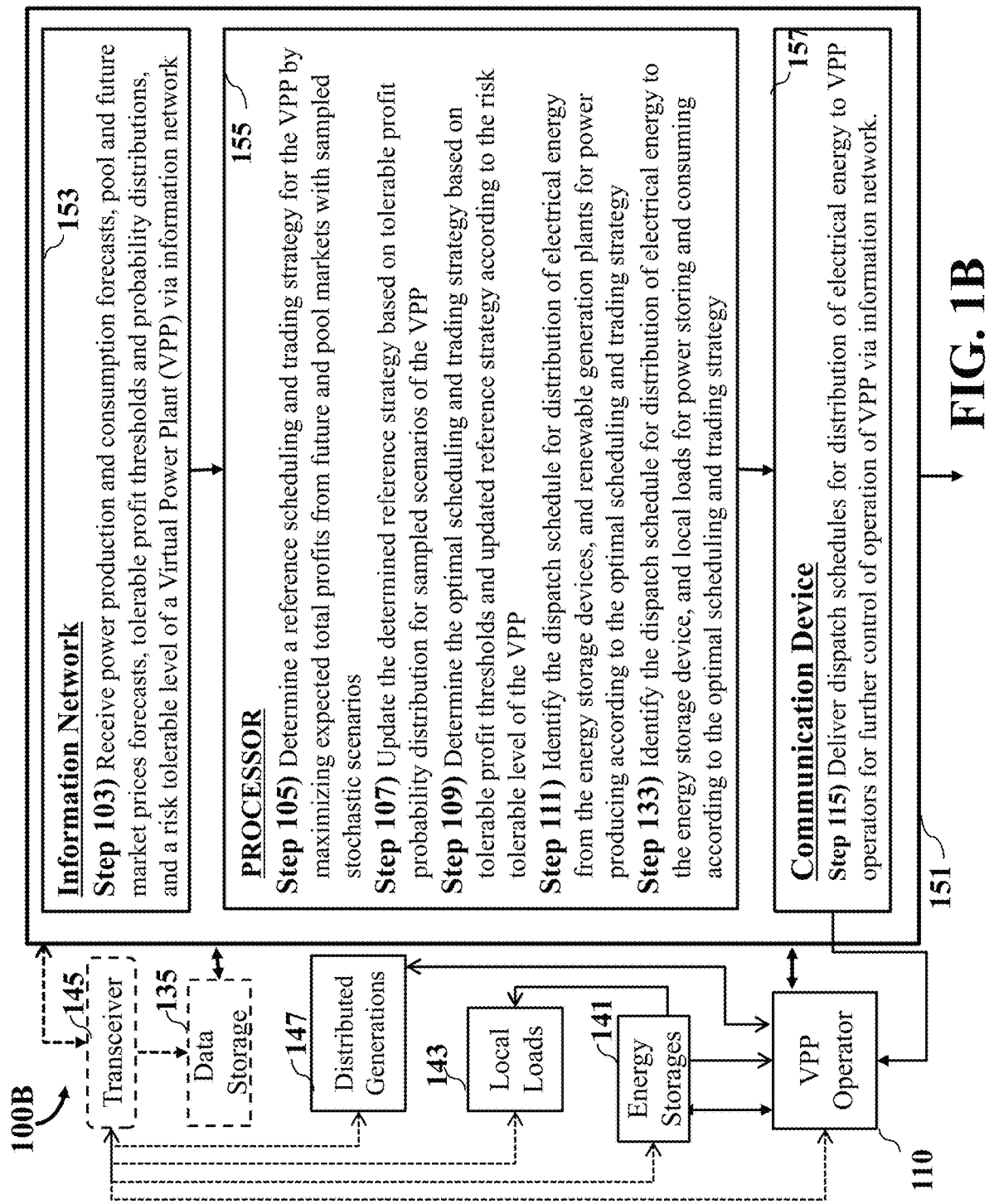
FIG. 1B is a schematic illustrating some method process flow steps for distributing electrical energy for the VPP, according to embodiments of the present disclosure.

FIG. 1B is a schematic illustrating some method process flow steps 100B for distributing electrical energy for the VPP, according to embodiments of the present disclosure.

Referring to FIG. 1B can include the computer or a computer system 151, which consists of a hardware processor 155 in communication with an input interface 145, a memory 135, an information network 153, a communication device 157. The communication device 157 can be communicated with the operators of VPP 110, and VPP operators can communicate and control of electrical devices included in the VPP, such as an energy storage device 141, a local load 143, a distributed generator 147. The computer 151 can send and receive information from and to VPP operators. It is contemplated the hardware processor 155 can include two or more hardware processors depending upon the requires of the specific application. Certainly, other components may be incorporated with method 100A and system 100B including input interfaces, output interfaces and transceivers. Step 103 of FIG. 1B receives power production and consumption forecasts, pool and future market prices forecasts, tolerable profit thresholds and profit probability distributions, and a risk tolerable level of a Virtual Power Plant (VPP) from information network 153. Step 105 use the hardware processor 155 of a computer 151 to determine a reference scheduling and trading strategy for the VPP by maximizing expected total profits from future and pool markets with sampled stochastic scenarios. Step 107 uses the hardware processor 155 to update the determined reference strategy based on tolerable profit probability distribution for sampled scenarios of the VPP. Step 109 determines a Optimal scheduling and trading strategy for the VPP based on tolerable profit thresholds and updated reference strategy according to the risk tolerable level of the VPP. Step 111 identifies the dispatch schedule for distribution of electrical energy from the energy storage devices, and renewable generation plants for power producing according to the Optimal scheduling and trading strategy, and step 113 identifies the dispatch schedule for distribution of electrical energy to the energy storage device, and local loads for power storing and consuming according to the Optimal scheduling and trading strategy. Step 115 uses a communication device 157 to the dispatch schedules for the distribution of electrical energy to the VPP operators for further control the operation of the VPP vis information network 153.

Figure 1C:
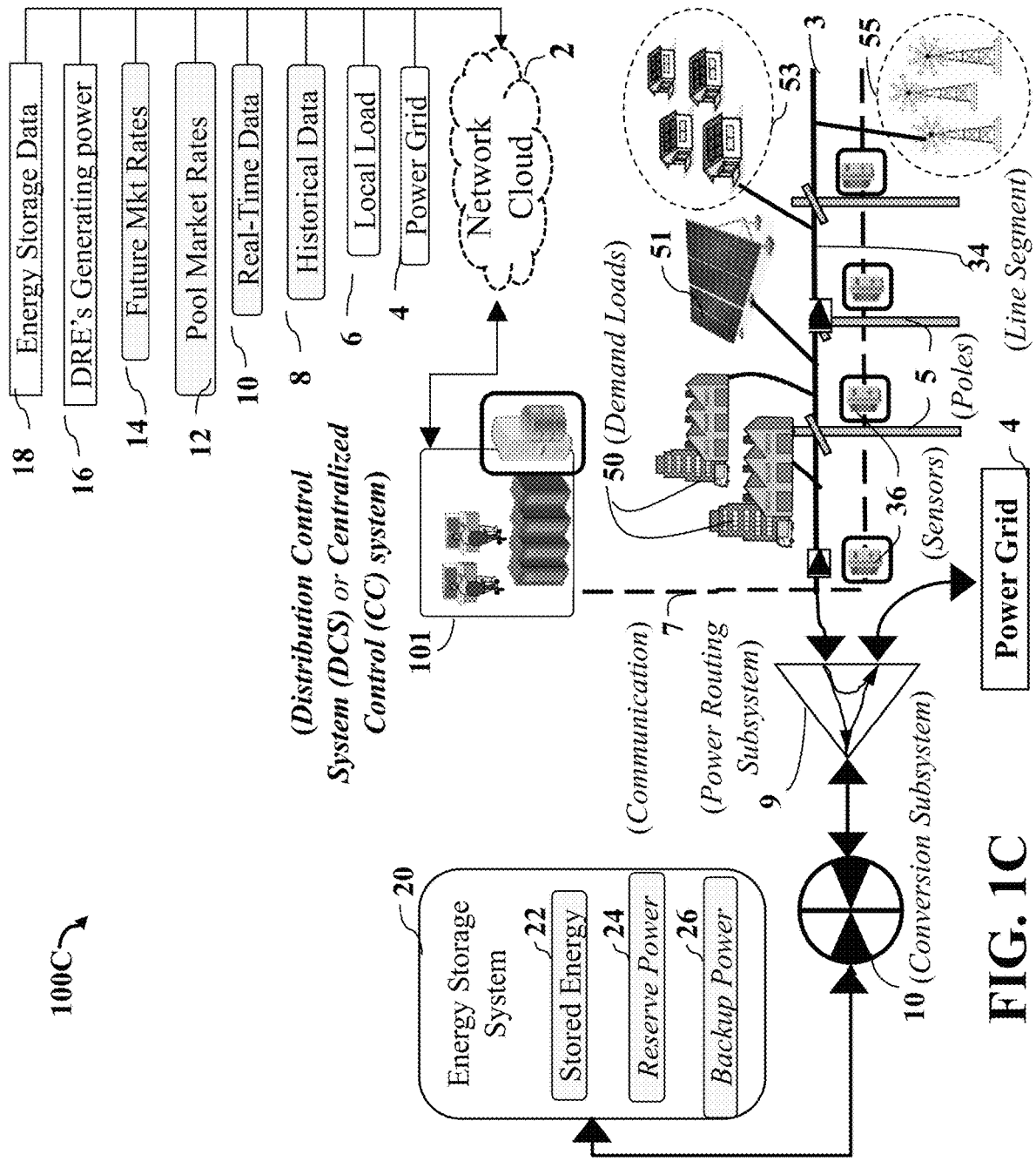
FIG. 1C is a schematic illustrating some components for distributing electrical energy for the VPP, according to embodiments of the present disclosure.

FIG. 1C is a schematic illustrating some components for distributing electrical energy for a Virtual Power Plant (VPP), according to embodiments of the present disclosure. The VPP system 100C includes many components to operate including a distribution control system (DCS) or a centralized control (CC) system 101. Because the VPP is a cloud-based distributed power plant that aggregates capacities of heterogeneous distributed energy resources (DER) for the purposes of enhancing power generation, as well as trading or selling power on the electricity market, the VPP system 100C can include a network cloud 2. The network cloud 2 is in communication with the CC system 101, such that the network cloud 2 receives data from some entities that is communicated back to the DCS 101. Some of the entities can include a power grid 4, local demand load(s) 6, historical data storage 8, real-time data 10, pool market real-time rates 12, future markets rates 14, distributed energy resources (DERs) 16 and energy storage systems 18. Each of the entities send data wirelessly to the network cloud 2 or may be directly wired to the network cloud, depending upon a user set of requirements. Contemplated is that the entities could be connected wirelessly or wired to the DCS 100, or may be in communication with some other type of gateway system or hardware configuration configured to communication with the DCS, all of which depends upon each user set of requirements. Demand loads 50 such as local demand loads are also connected to the power lines 3.

The VPP system integrates several types of power sources or DERs that can include renewable energy systems that generate a reliable overall power supply. The DERs form a group of different types of dispatchable and non-dispatchable, controllable or flexible load distributed generation systems that are controlled by the CC system 101. The DERs can include photovoltaics (PVs) 51, solar systems mounted on structures 53, small-scale wind power plants (WPP)s 55, run-of-river hydroelectricity plants (not shown), small hydro (not shown), biomass (not shown), micro combined heat and power (i.e., micro-CHP, which can be referred to as pCHP or mCHP, is associated with cogeneration to residential homes/commercial buildings in a range of up to 50 kW), micro gas turbines (not shown), Stirling engines (not shown), fuel cells (not shown) or natural gas-fired reciprocating engines (not shown). The generated powers from the DERs are connected to power lines 3, the power lines can be above ground via poles 5, the poles can include sensors 36 connected to a communication line 7, such that the power lines 3 can include line segments 34. The power lines 3 are connected to a power routing subsystem 9 that is connected to the power grid 4 and a conversion system 10. The conversion system 10 can be connected to energy storage systems (ESSs) 20, that store energy 22 from the power grid 4, other energy storage systems (mobile or stationary) and/or from the DERs. The ESSs 20 can also include reserve power 24, backup power 26 or other power for some specific user purpose (not shown).

Some benefits of the VPP system 100C capabilities can include an ability to accommodate via delivering peak load electricity or load-following power generation on short notice, similar to that of conventional large utilities capabilities. In fact, with the systems and methods of the present disclosure, the VPP system 100C may eventually replace the conventional large utilities due to providing higher efficiency and more flexibility when compare to the conventional large utilities. More flexibility allows the VPP system 100C to react better to demand fluctuations, however, such attributes comes with a complexity that requires complicated Optimization, control, and secure communications. Such that the systems and methods of the present disclosure have been able to overcome these challenges to deliver a comprehensive approach, i.e. an Optimized solution that maximizes a total pool market revenue and a total future market revenue, while minimizing a total energy cost for the energy system (see step 115 of FIG. 1A).

Figure 2A:
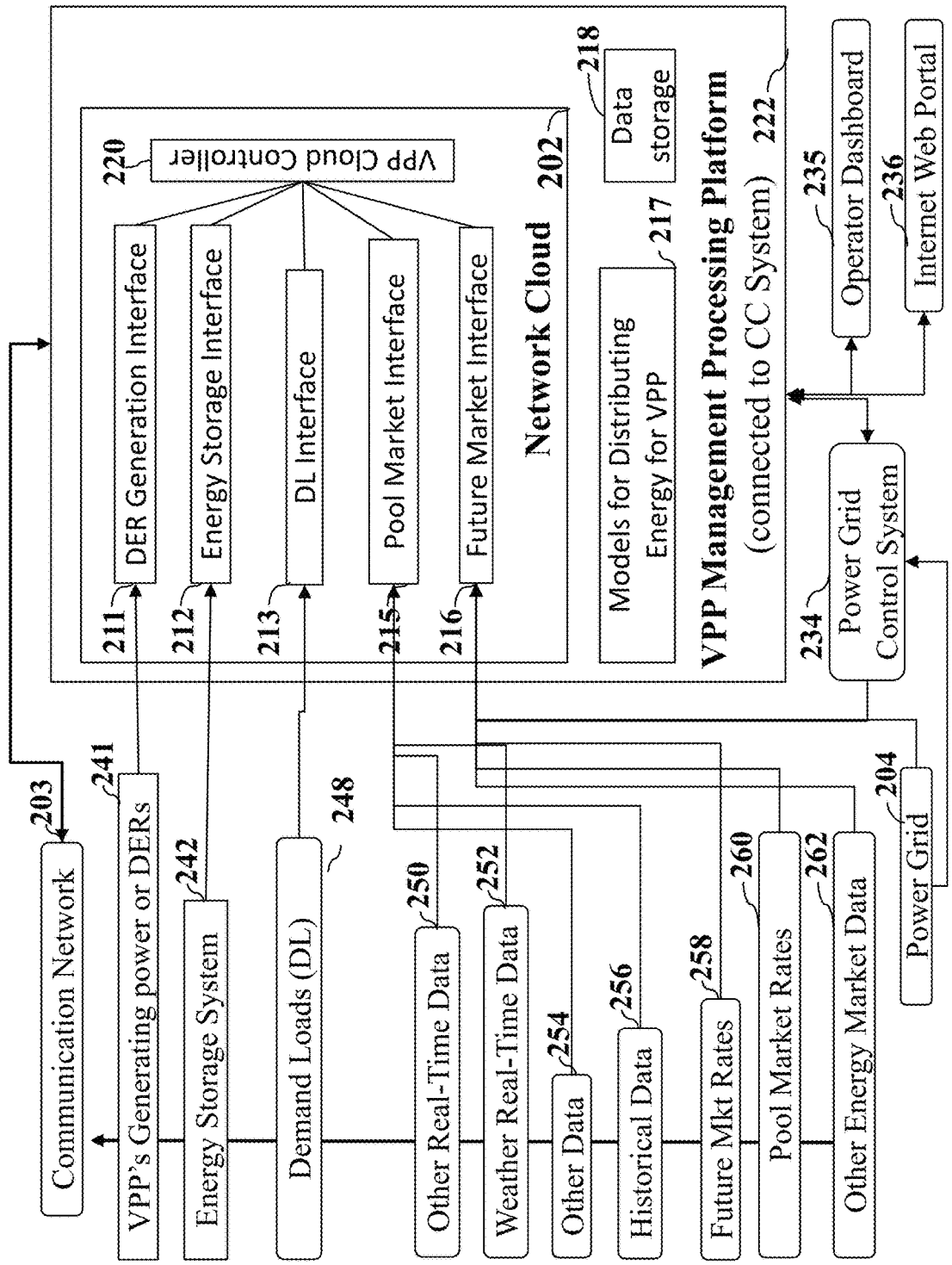
FIG. 2A is a block diagram illustrating some data flow steps for a method for distributing electrical energy for the VPP, according to some embodiments of the present disclosure.

FIG. 2A is a block diagram illustrating some data flow steps for a method for distributing electrical energy for the VPP, according to some embodiments of the present disclosure.

Figure 2B:
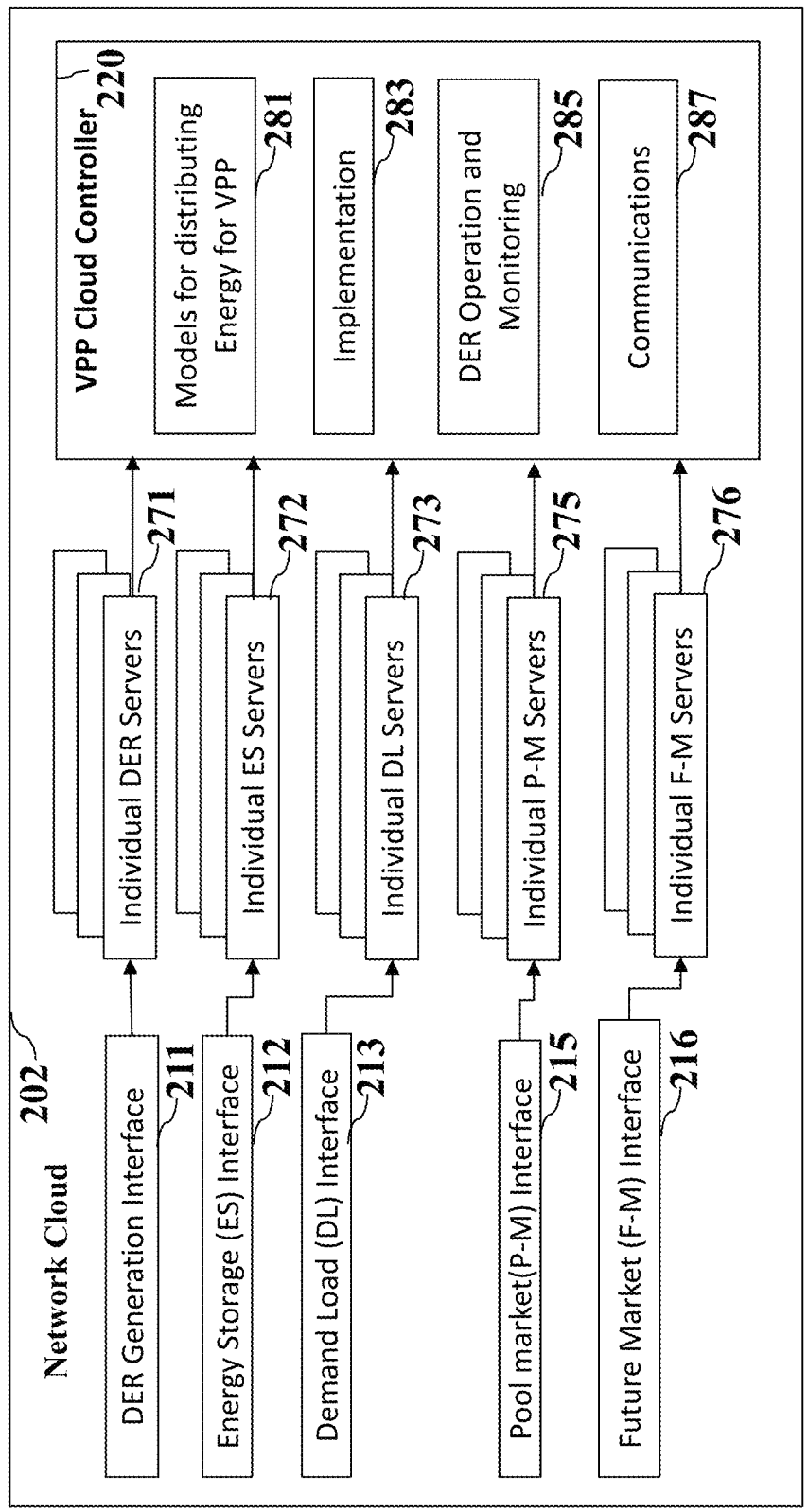
FIG. 2B is a block diagram illustrating some aspects of the network cloud and the VPP cloud controller for distributing electrical energy for the VPP, according to some embodiments of the present disclosure.

FIG. 2B is a block diagram illustrating some aspects of the network cloud and the VPP cloud controller for distributing electrical energy for the VPP, according to some embodiments of the present disclosure Referring to FIG. 2A and FIG. 2B, a VPP Management Processing Platform (VPP-MPP) 222 can be connected to the centralized control system (see 101 of FIG. 1C) configured similar as an energy cloud controller 220 of a network cloud 202 which links interface or gateway controllers with VPP systems to gather data to construct and determine an Optimize solution for the VPP for a specific time period and in view of a specific given VPP risk tolerance level. In particular, the network cloud 202 can obtain real-time operation information and other information for: (a) the DERs 241 (via DERs Generation Interface/Gateway controller 211); (b) energy storage system information 242 (via Energy storage Interface/Gateway controller 212); (c) the Demand Load (DL) information 248 via DL Interface/Gateway controller 213). Also, the network cloud 202 can obtain via a pool market real-time Interface/Gateway controller 215 information including: (a) other real-time data 250; (b) weather real-time data 252; (c) other data 254; and (d) historical data 256. Further, the network cloud 202 can obtain via a future Energy Market Interface/Gateway controller 216 information including: (a) future market rates 258; (b) pool markets real-time rates 260; (c) other Energy Market related data 262; (d) power grid information 204; and (e) power grid control system information 234. The VPP-MPP 222 connected to the centralized control system (see 101 of FIG. 1C) can also include data storage 218 having databases, files, etc., and models for distributing energy for the VPP 217, wherein the models are associated with the systems and methods of the present disclosure. The VPP-MPP 222 can be connected to: (1) a power grid control system 234; the power grid 204; (3) an operator dashboard 235; and an internet Web portal 236. The VPP-MPP 222 collects information through a communication network 203.

Still referring to FIG. 2A and FIG. 2B, the VPP-MPP 222 can use the Optimize solution to seamlessly implement the aspects of the Optimize solution with the VPP-MPP that is connected to the centralized control system of the VPP system. Wherein the VPP system can manage such aspects as: (1) how much power each DER is to generate and when; (2) how much energy is stored in each energy storage system/component; (3) how much energy is being provided to the power grid and to each demand load; etc. These implementations by the VPP happens in real-time and the data can be stored for real-time analytics. The analytics can include updating models, data storage, etc. Other aspects the VPP system can provide in real-time can include: (1) providing offset demand and peak reduction solutions; (2) respond to one or more pricing, demand, and ancillary services signals for input to load shaping services; and (3) orchestrate one or more distributed resources to simultaneously serve site and needs in the VPP. Contemplated for some user requested configurations can include linking the VPP cloud controller with the power grid control system to update, reconfigure or develop the VPPs power generation schedule and load shaping service instructions to DERs. For example, if the VPP has mobile energy storage (MES) systems, some MES systems may be deployed to a specific location to supply energy to demand load or for charging some stationary energy storage systems, based upon the determined Optimized solution determined from the systems and methods on the present disclosure.

The VPP-MPP connected to the centralized control system (see 101 of FIG. 1C) can include individual servers 271, 272, 273, 275, 276 that can be configured to receive individualized data generated by: (1) each component of the DER 271; (2) each energy storage system 272; (3) each demand load 273; (4) each pool market real-time information 275; and (5) each future energy market information 276. Wherein the pricing data can in some scenarios have actual real-time rates for energy usage on a price per unit of energy basis. Other types of pricing data can be obtained such as day-ahead time varying rates or other time-varying electrical rates that may be used by a particular power source.

Still referring to FIG. 2A and FIG. 2B, contemplated is that the VPP cloud controller 220 can process a wide range of information. Depending upon a user set of requirements, the models for distributing energy for the VPP 217 of FIG. 2A, may be incorporated in the VPP cloud controller as the models for distributing energy for the VPP 281 of FIG. 2B, or both, all of which depends on the user configurations. Either models for distributing energy for the VPP (see 217 of FIG. 2A for 281 of FIG. 2B) can obtain data for: (1) all DERs via the individual DER servers 271; (2) energy storage systems via the individual energy storage servers 272; (3) demand loads via the individual demand load servers 273; (4) pool market real-time information via the individual pool market real-time servers 275; and (5) future energy market information via individual future market servers, for the VPP system operators. An implementation module 283 can be used to implement an Optimized solution determined for a specific time period via the VPP given risk tolerance level. Such that the implementation module 283 can include scheduling DERs and energy to be provided to the load demand customers that correspond to the Optimized solution. So as to ensure that the VPP DERs production meets demand, resulting in higher revenues for the VPP. An aspect of implementing the Optimized solution via the implementation module 283, can include scheduling flexible power generators (mobile or stationary) of the VPP that can be ramped up and down when requested, via power grid requests and/or load demand requests. The flexible power load demands of the VPP customer may be scheduled to operate in order to Optimized price schedules in accordance to with the Optimized solution of the systems and methods of the present disclosure. For example, the scheduling the VPP customers flexible power generators to consume their generated electricity, may be when the price of energy is inexpensive, and demand is low, which would be in accordance with the Optimized solution for that time period. Thus, some aspects of the centralized control system (see 101 of FIG. 1C) connected to the VPP-MPP 222, can help stabilize the power grid 204 even before balancing services may become necessary. For example, if an imbalance of the power grid 204 is forthcoming, signals from the VPP system operators can be processed in the centralized control system (see 101 of FIG. 1C) and directly converted into control instructions for the DERs or energy storage systems, if necessary. Resulting in the VPP effectively helping to keep the power grid 204 in balance by providing VPP reserved energy. Other aspects is that the load demand customers of VPP can be connected to the VPP's centralized control system via the network cloud. This way, all assets can be efficiently monitored, coordinated, and controlled by the centralized control system (see 101 of FIG. 1C), is such requirements are needed by a user. There is bidirectional data exchange between the individual DERs and the VPP which not only ensures transmission of control commands, but also provides real-time data on the capacity utilization of the DERs. For example, energy generated from wind energy and solar plants, as well as consumption data and electricity storage charge levels, can be used to generate precise forecasts for electricity trading and scheduling of the DERs. Another example, may be directing energy, in accordance to the determined Optimized solution, which may have been influence by some market factor somehow in the determining the Optimized solution, could include directing energy thru the conversion subsystem (see 10 of FIG. 1C) and the power routing subsystem (see 9 of FIG. 1C) to utilize energy available from a DER source, an energy storage system (see 20 of FIG. 1C), to fulfill a contracted energy service requirement for that time period. Contemplated is that there can be a DER operation and monitoring module 285 and a communication module 287, that can be used by the VPP operators.

Formulation of Stochastic Optimization of VPP Scheduling and Trading

Figure 3:
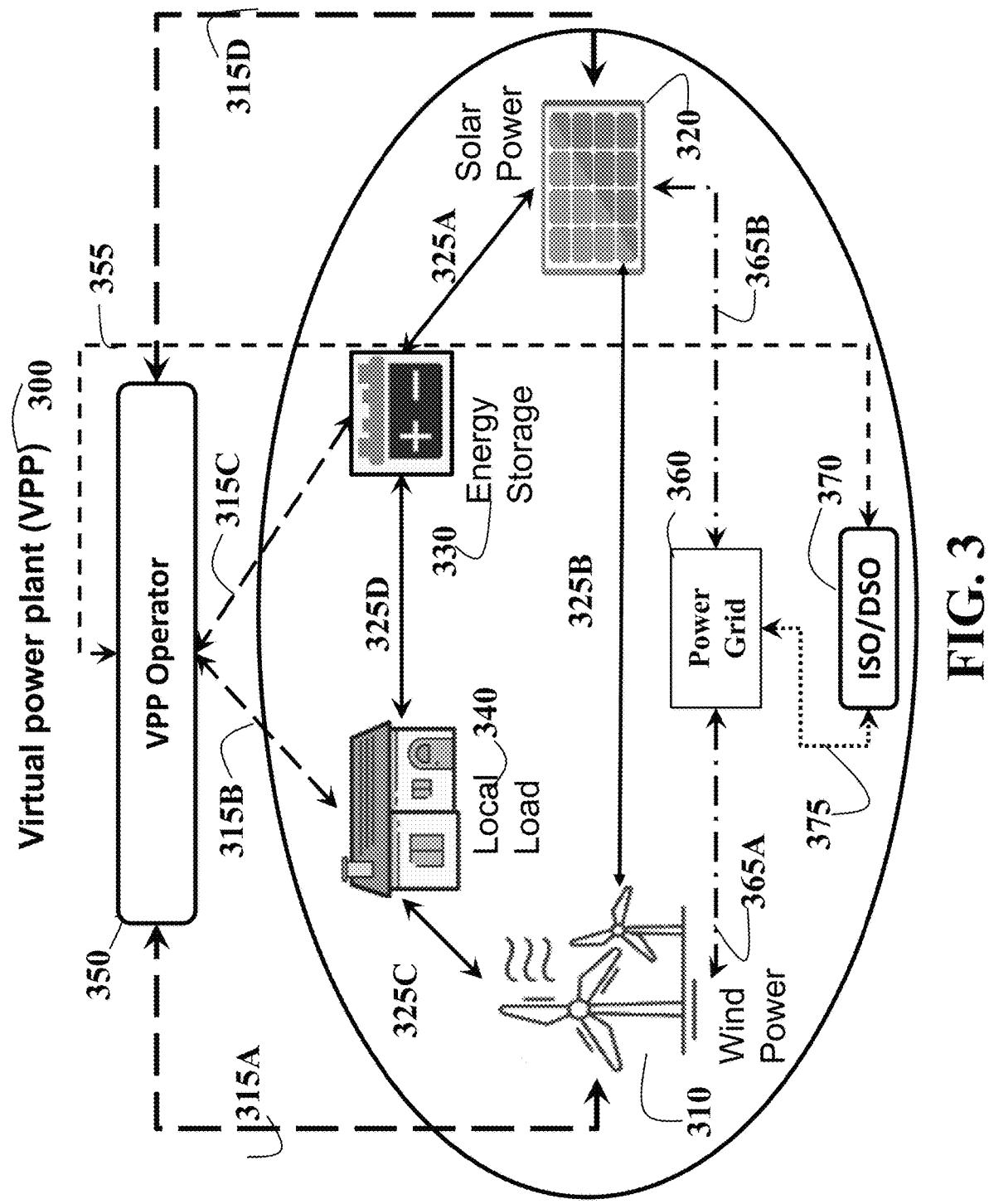
FIG. 3 is a schematic illustrating a virtual power plant (VPP) and information flows between its operator and components, according to some embodiments of the present disclosure.

FIG. 3 is a schematic illustrating a virtual power plant (VPP) and information flows between its operator and components, according to some embodiments of the present disclosure. The VPP 300 includes a set of components for generating and consuming electric powers, such as wind power plant 310, solar power plants 320, energy storages 330, and local loads 340. Those components may be connected to each other through electrical wires 325A-325D. The VPP can connects with external power grid 360 through connection paths 365A-365B. The power grid is operated by an ISO/DSO 370 through bi-way communications 375. ISO is an independent system operator for managing a power grid if it is a power transmission system. DSO is a distribution system operator for managing a power grid if it is a power distribution system. The VPP is managed and controlled by a VPP operator 350, and the operator can have bi-way communications 315A-315D with VPP components. The VPP operator 350 can exchange information through bi-way communications 355.

Based on its power generating and storing capacities, a VPP can trade its generation in a short-term electricity market, and also sign forward contracts up to a mid-, or long-term horizon in advance. The embodiments of the present disclosure are considering the VPP participating in two markets, one is a pool market, and the other is a futures market. Due to lack of capability for altering the electricity prices in that markets, the virtual power plant is a price-taker in the markets. In the pool market and for the sake of simplicity, we consider a day-ahead market which is a combination of actual day-ahead market and real-time market. The electricity pool prices are highly volatile. Futures market presents a higher/lower average price for the buyer/seller than the pool but involves less volatility. Therefore, from an electricity seller point of view, forward contracts protect against pool price volatility but at the cost of lower expected profit. Deciding which forward contracts to sign is thus a complex decision-making problem involving significant uncertainty and information vagueness over a mid-term, or long-term horizon. We address this problem through a risk-constrained stochastic Optimization framework. The price for future market is treated as deterministic, but the impacts of its possible uncertain variation is modeled using information gap decision theory. The pool price, renewable generations, and local demands are treated as stochastic variables, and associated uncertainty is described through a set of scenarios created by using Monte-Carlo simulation, and each scenario contains a plausible realization of pool prices, generation resources and load demands.

Figure 4:
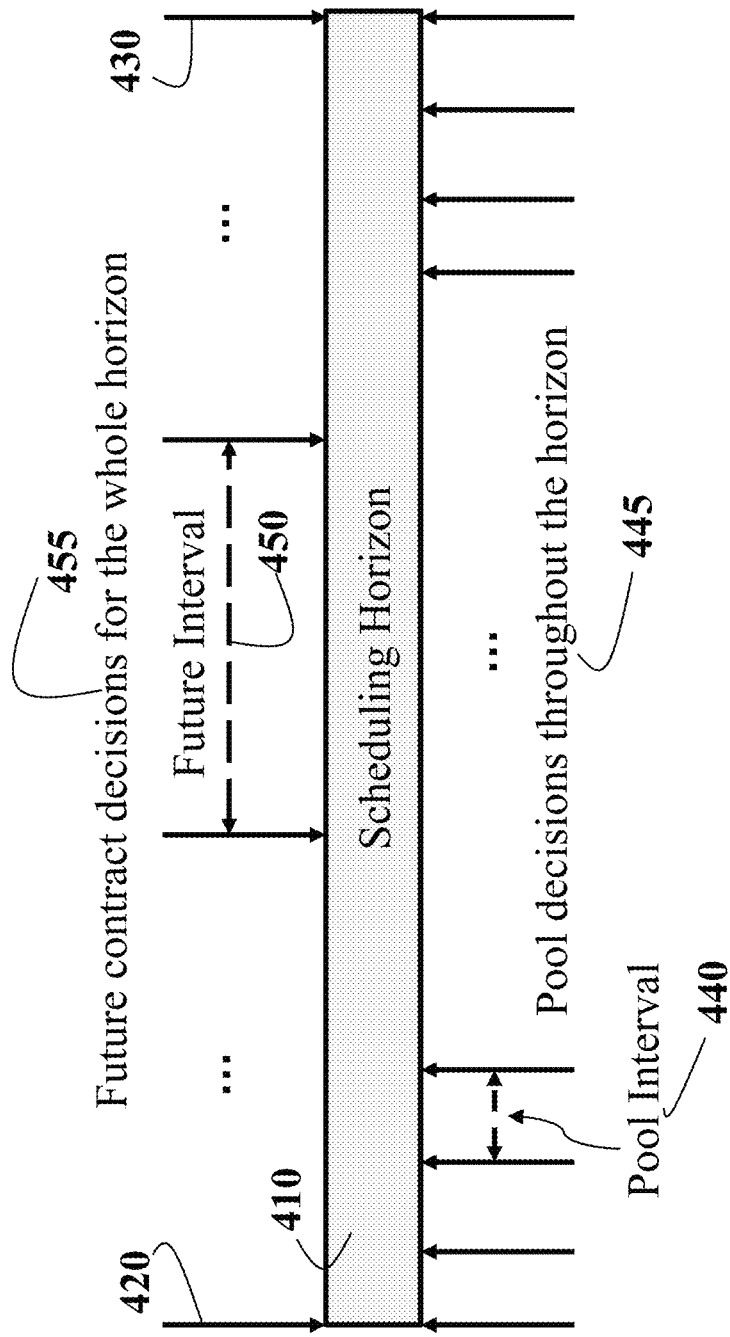
FIG. 4 is a schematic illustrating some VPP decision making within pool and future markets, according to some embodiments of the present disclosure.

FIG. 4 is a schematic illustrating some VPP decision making within pool and future markets, according to some embodiments of the present disclosure. The trading activities covers a long period of time, i.e. a scheduling horizon 410, from a beginning interval, 420 to an ending interval 430. The horizon 410 includes a set of pool intervals 440 with shorter lengths, and a set of future intervals 445 with longer lengths, and a future interval can include multiple pool intervals. Forward contracting decisions 455 are made at the beginning of the horizon and affect the whole horizon. The set of decisions pertaining to the pool 445 are made throughout the horizon. Note that decisions related to the futures market are made before knowing the realizations of the stochastic variables, while decisions related to pool market can be made using a rolling horizon approach. If the market rules are allowed, the decisions for future markets can also be updated using a rolling horizon strategy.

The virtual power plant may decide to buy electric energy in the futures market to sell it in the pool in order to increase its profit but at the cost of a higher risk, or can sell its produced energy in the futures market which decreases the risk inherent to pool price volatility at the cost of a lower profit. For example, we consider a scheduling horizon with a season (i.e. 91 days), and its pool interval is one hour, and future interval is one week. The forward contracts are defined on weekly biases, and pool trading is defined hourly.

At the beginning of the horizon, the VPP has obligation to determine the future contracts to be signed for the coming 13 weeks. The VPP also needs to plan the day-ahead trading activities for the upcoming 91 days if the pool market is a day-ahead market. The plan for the first day can be used for actual bidding/offering at the market, and others can be updated daily when more real-time data arrives.

Figure 5:
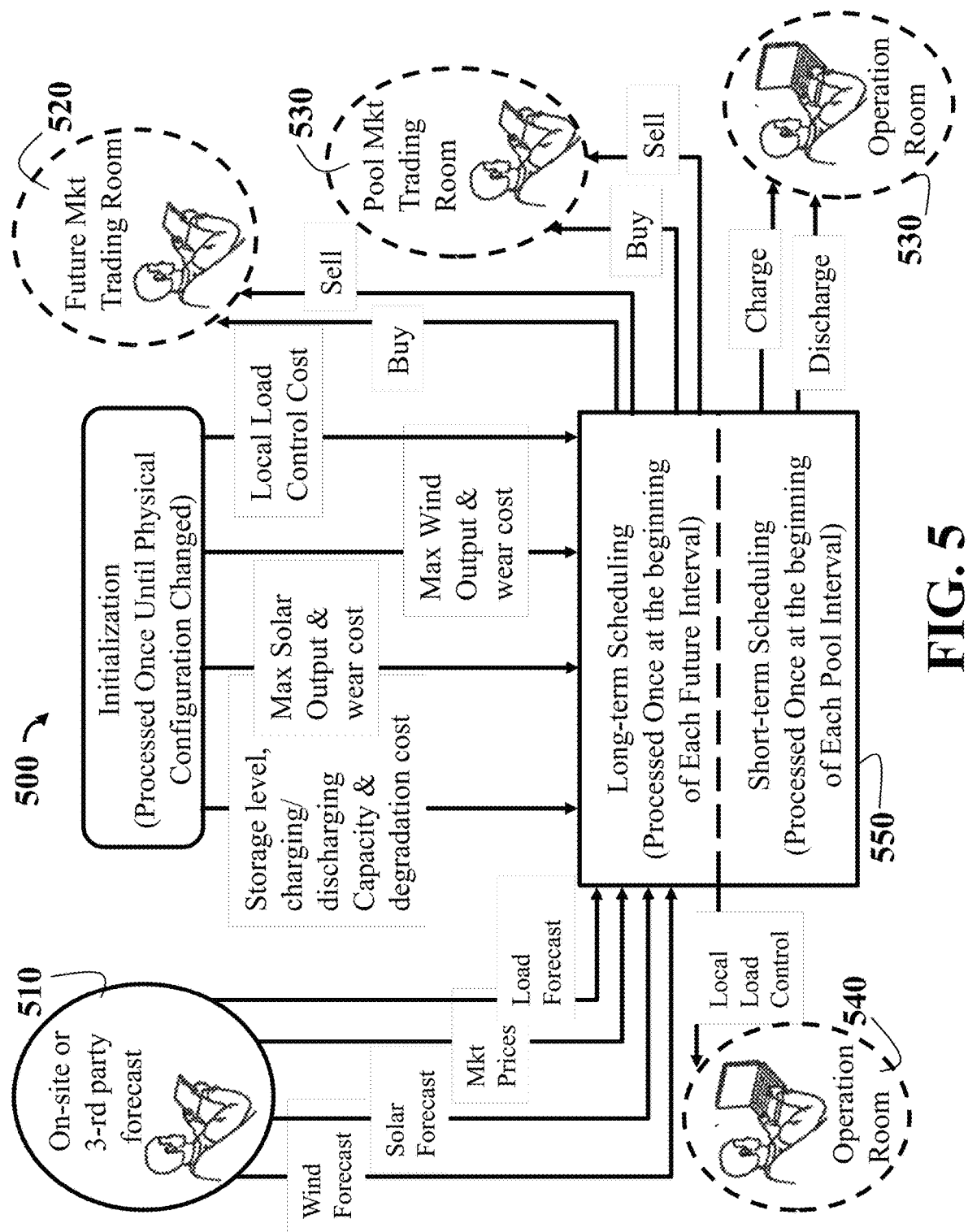
FIG. 5 is a schematic illustrating some inputs that may be incorporated into a scheduling and trading Optimization model, and possible outputs of the model, according to some embodiments of the present disclosure.

FIG. 5 is a schematic illustrating some inputs that may be incorporated into a model for VPP trading and scheduling Optimization model, and possible outputs of the model, according to some embodiments of the present disclosure. The model 500 implements the trading and scheduling using the method described in the present disclosure 550, receives input data and information from a one-site or third party forecaster 510, and outputs Optimized results to future market trading room 520, pool market trading room 530, energy storage operation room 530, and local load operation room 540. The trading and scheduling algorithm 550 may be a module of the Optimization system used to Optimize the energy trading and scheduling of the virtual power plant. First, the algorithm is initialized using a set of configuration parameters (e.g., storage level, charging/discharging capacities, unit degradation/wear cost, maximum wind power plant output and unit wear cost, maximum solar power plant output and unit wear cost, local load control cost. Following initialization, at the beginning of a time horizon on the region the VPP located (e.g., one season, one month, one week, or any other period based on the regional market), the algorithm considers the forecasted future and pool market prices, wind data, solar data and local loads for a predictive time period (e.g., one season, one month, one week, or any suitable time period), and runs the Optimization methodology to come up with the Optimal solution for both the operation rooms and the trading rooms for all time intervals within the given horizon. Specifically, the algorithm outputs the amount of energy that should be charged or discharged, the amount of power consumption that should be curtailed, as well as how much powers should be bought or sold at the pool or future markets during the time horizon to maximize total revenue for energy reading while minimizing total cost for production. This process or portions thereof may be repeated at the beginning of each future/pool time interval to maximize profits while satisfying the constraints such as keeping the storage level within its minimum and maximum capacity at all times.

The joint scheduling and trading Optimization of virtual power plants can be formulated as a stochastic Optimization problem, in which the objective is to maximize the expected total profits over all plausible scenarios for environmental factors that may affect the Optimization results, such as market prices, maximum wind and solar generations, and local load demands. The profits can be determined by deducting the costs from the revenues. The revenues are gained from selling energy in future and pool markets, and the costs may include purchasing costs for buying energy from future markets, incentive payments for buying local loads consuming rights, and wear costs for energy storages and renewable generations for considering life cycle cost. Note we assumed there is no production (i.e. fuel) cost related to wind and solar power plants.

Assumed the future market prices are deterministic, the virtual power plant is subjected to four statistically independent sources of uncertainties: 1) wind generation, 2) solar generation, 3) local demand, and 4) pool market clearing price. We assumed those random variables follow truncated normal distribution, i.e. the variables are within a range with lower and upper bounds but follow a normal distribution.

Based on Monte Carlo simulation, an appropriate set of scenarios can be generated to represent the stochastic environmental scenarios for VPP scheduling and trading Optimization. Since the number of scenarios increases the size of the stochastic programming model, the number of considered scenarios has to be small enough to guarantee tractability of the problem, and large enough to properly model the pool uncertainty. A scenario reduction technique is used to reduce the number of scenarios maintaining as much as possible the properties of the original scenario tree, in which those scenarios with probability less than a predetermined threshold are eliminated, and close scenarios are bundled together as one scenario.

Assumed $\Omega$ is the set of random scenarios used to describe the uncertainties residing in solar generation, wind generation, load demand and pool market prices. Each scenario $\omega \in \Omega$ represents a combination of a set of load profiles for each local load, a set of generation profiles for each solar power plant, a set of generation profiles for each wind power plant, and a set of pool market clearing price profile, and each profile corresponds to all time intervals within the scheduling horizon. In addition, each scenario $\omega$ corresponds to an occurrence probability for the scenario, $\beta_\omega$. We use T to represent the set of time intervals within the schedule horizon, and the interval is a pool interval. $\Delta t$ is the duration of time interval t.

Two contract formats in future markets are considered, strips and Options. A strip is a contract of purchasing or selling a fixed amount of power at a fixed price before the operating day. Usually, strips are purchased or sold at multiples of a discrete block. An Option is the right to purchase or sell a fixed amount of power at a fixed price months before the operating day. A certain amount of premium will be paid, and the decision to execute the Option (as a whole, or partially) or not is made on the operating day/hour. Option is purchased or sold at multiples of a discrete block. The VPP can trade produced power to gain revenues from future market through selling Option contracts and selling strip contracts. It can also purchase power from future market with costs through buying Option contracts and buying strip contracts for Optimizing its storage usage and generation trading profiles. The contracts considered in this disclosure are multi-block and span the whole future interval within the scheduling period.

Figure 6A:
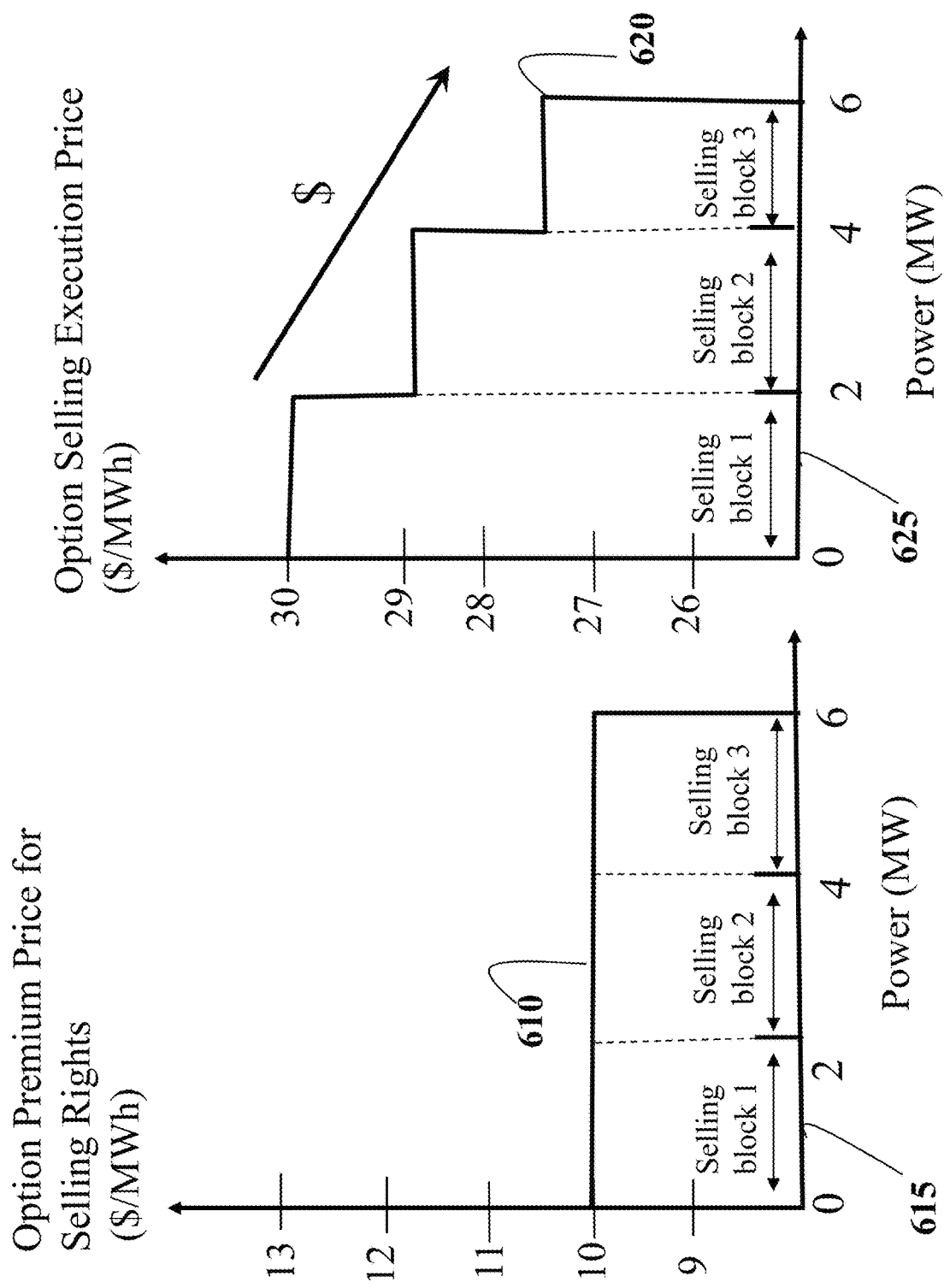
FIG. 6A is a graph illustrating an offering curve for a selling Option contract in a future market, according to some embodiments of the present disclosure.

FIG. 6A is a schematic illustrating offering curves for a selling Option contract, according to some embodiments of the present disclosure. The selling contract consist of blocks of constant power spanning a specified period of time with associated two price components. The left portion is the curve of premium price component 610 for selling rights with respect to the amount of power sold, and the shape of curve is a flat line. For instance, the premium for selling 2 MW, 615 is $10/MWh, additional 2 MW and another 2 MW during the same period are also at the same price $10/MWh. The right portion is the curve of execution price component for selling power 620 with respect to the amount of power sold, and the curve is a non-increasing step-wise curve. For instance, selling 2 MW, 625 at $30/MWh, additional 2 MW during the same period at $29/MWh and additional 2 MW at $28.5/MWh. That is if the producer sells energy in the futures market, the energy price decreases with the amount of the energy sold. This stepwise price form reflects both the generally high volatility that affects electricity futures markets and the limited amount of energy available for trading, i.e. market liquidity.

Assumed $F^{Opt-S}$ is the set of available selling Option future contracts, the expected revenue that we can collect from selling Option contracts, $f_{reve}^{Opt-S}$ can be derived by deducting the premium payments $f_{cost}^{Opt-S-prem}$ from expected incomes gained after execution, in which the expected income is calculated as a sum of incomes obtained for each scenario ω, $f_{reve-\omega}^{Opt-S-exec}$ weighted with its probability $\beta_\omega$ for all possible scenarios:

$$f_{reve}^{Opt-S} = -f_{cost}^{Opt-S-prem} + \Sigma_{\omega \in \Omega} f_{reve-\omega}^{Opt-S-exec} \quad (1)$$

The premium cost is calculated as:

$$f_{cost}^{Opt-S-prem} = \Sigma_{i \in F^{Opt-S}} \Sigma_{b=1}^{B_i^{Opt-S}} \Sigma_{t \in T_i^{Opt-S}} x_{ib}^{Opt-S} \lambda_{ib}^{Opt-S-prem} \overline{P}_{ib}^{Opt-S} \Delta t, \quad (2)$$

where $B_i^{Opt-S}$ is the number of blocks for selling Option contract i. $T_i^{Opt-S}$ is the set of time intervals included in selling Option contract i. $x_{ib}^{Opt-S}$ is a binary variable that is equal to 1 if future Option contract i is signed to purchase selling energy rights for block b and 0 otherwise. $\lambda_{ib}^{Opt-S-prem}$ is the premium price for purchasing selling rights for block b of buying Option contract i. $\overline{P}_{ib}^{Opt-S}$ is the power capacity of block b of selling Option contract i.

The revenue for individual scenario is calculated differently if different execution strategy is adopted. Equation (3a) represents a scenario for applying a partial-execution strategy, in which the signed contract can be executed at some of intervals for the given contracting period. Equation (3b) represents a scenario for applying a whole-execution strategy, in which the same decision for execution is applied to all intervals for the constricting period.

$$f_{reve-\omega}^{Opt-S-exec} = \sum_{i \in F^{Opt-S}} \sum_{b=1}^{B_i^{Opt-S}} \sum_{t \in T_i^{Opt-S}} y_{ib t\omega}^{Opt-S} \lambda_{ib}^{Opt-S-exec} \overline{P}_{ib}^{Opt-S} \Delta t, \quad (3a)$$

$$\forall \omega \in \Omega$$

$$f_{reve-\omega}^{Opt-S-exec} = \sum_{i \in F^{Opt-S}} \sum_{b=1}^{B_i^{Opt-S}} \sum_{t \in T_i^{Opt-S}} y_{ib\omega}^{Opt-S} \lambda_{ib}^{Opt-S-exec} \overline{P}_{ib}^{Opt-S} \Delta t, \quad (3b)$$

$$\forall \omega \in \Omega$$

where $y_{ib t\omega}^{Opt-S}$ is a binary variable used for partial-execution strategy that is equal to 1 if future Option contract i is executed to sell energy to block b during time interval t under scenario ω. $y_{ib\omega}^{Opt-S}$ is a binary variable used for whole-execution strategy that is equal to 1 if future Option contract i is executed to sell energy to block b under scenario ω. $\lambda_{ib}^{Opt-S-exec}$ is the execution price for selling energy to block b of selling Option contract i.

The actual power sold from those selling Option contracts are depended on how the VPP executed the signed contracts. The power sold through selling Option contracts during time interval t under scenario ω, $P_{t\omega}^{Opt-S}$ is bounded by a maximum allowed selling amount, $\overline{P}_t^{Opt-S}$ as described by equation (4a) for using partial-execution strategy, and (4b) for whole-execution strategy:

$$0 \leq P_{t\omega}^{Opt-S} = \Sigma_{i \in F^{Opt-S}} \Sigma_{b=1}^{B_i^{Opt-S}} \Sigma_{t:t \in T_i^{Opt-S}} y_{ib t\omega}^{Opt-S} \overline{P}_{ib}^{Opt-S} \leq \overline{P}_t^{Opt-S} \quad (4a)$$

$$0 \leq P_{t\omega}^{Opt-S} = \Sigma_{i \in F^{Opt-S}} \Sigma_{b=1}^{B_i^{Opt-S}} \Sigma_{t:t \in T_i^{Opt-S}} y_{ib\omega}^{Opt-S} \overline{P}_{ib}^{Opt-S} \leq \overline{P}_t^{Opt-S} \quad (4b)$$

where $t:t \in T_i^{Opt-S}$ denotes that $y_{ib t\omega}^{Opt-S}$ or $y_{ib\omega}^{Opt-S} \overline{P}_{ib}^{Opt-S}$ is not zero only when t belongs to the set $T_i^{Opt-S}$.

The trading decisions for selling Option contracts are fully described by two decision variables, $x_{ib}^{Opt-S}$ and $y_{ib t\omega}^{Opt-S}$ or $y_{ib\omega}^{Opt-S}$. $x_{ib}^{Opt-S}$ denotes if the selling rights for a block in a selling Option contract is purchased, and $y_{ib t\omega}^{Opt-S}$ or $y_{ib\omega}^{Opt-S}$ denotes if the selling block in the signed contract is sold for all or some interval of contracting period under a given scenario. Those decisions are subject to the following constraints:

$$x_{ib}^{Opt-S} = \{0,1\}, \forall i \in F^{Opt-S}, b = \{1, \ldots, B_i^{Opt-S}\} \quad (5)$$

$$y_{ib t\omega}^{Opt-S} = \{0,1\}, \forall i \in F^{Opt-S}, b = \{1, \ldots, B_i^{Opt-S}\}, t \in T_i^{Opt-S}, \omega \in \Omega \quad (6a)$$

$$y_{ib\omega}^{Opt-S} = \{0,1\}, \forall i \in F^{Opt-S}, b = \{1, \ldots, B_i^{Opt-S}\}, \omega \in \Omega \quad (6b)$$

$$x_{ib}^{Opt-S} \leq x_{i(b-1)}^{Opt-S}, \forall i \in F^{Opt-S}, b = \{2, \ldots, B_i^{Opt-S}\} \quad (7)$$

$$y_{ib t\omega}^{Opt-S} \leq x_{ib}^{Opt-S}, \forall i \in F^{Opt-S}, b = \{1, \ldots, B_i^{Opt-S}\}, t \in T_i^{Opt-S}, \omega \in \Omega \quad (8a)$$

$$y_{ib\omega}^{Opt-S} \leq x_{ib}^{Opt-S}, \forall i \in F^{Opt-S}, b = \{1, \ldots, B_i^{Opt-S}\}, \omega \in \Omega \quad (8b)$$

$$y_{ib t\omega}^{Opt-S} \leq y_{i(b-1)t\omega}^{Opt-S}, \forall i \in F^{Opt-S}, b = \{2, \ldots, B_i^{Opt-S}\}, t \in T_i^{Opt-S}, \omega \in \Omega \quad (9a)$$

$$y_{ib\omega}^{Opt-S} \leq y_{i(b-1)\omega}^{Opt-S}, \forall i \in F^{Opt-S}, b = \{2, \ldots, B_i^{Opt-S}\}, \omega \in \Omega \quad (9b)$$

Constraints (5), (6) are binary constraints to force decision variables for each block of selling Option contracts taking values either 0 or 1. (6a) and (6b) are used for partial and whole execution strategies, respectively. Constraint (7) ensures a selling block of a selling Option contract can be executed only when the selling rights for the block of the selling Option contract is purchased. Constraints (8) and (9) impose the non-increasing requirements for offering curves of selling Option contracts, that is the lower price block can be committed or executed only when the higher price blocks have been committed or executed already. (8a) and (9a), (8b) and (9b) are used for partial and whole execution strategies, respectively.

Considering joint Optimization for scheduling and trading implemented using rolling horizon approach, we may have previously signed selling contracts, $F^{Opt-S0}$ that still be valid for some time intervals, i.e. $T_i^{Opt-S} \cap T \neq \emptyset, \forall i \in F^{Opt-S0}$. The incurred revenue for executing those contracts if a partial execution strategy was applied, $f_{reve}^{Opt-S0}$ has to be considered as part of the total revenues of the VPP. The power sold by executing the contracts, $P_{t\omega}^{Opt-S0}$ also affects the power production and consumption balance for the VPP no matter what execution strategy was applied. The power to be sold during period t and scenario ω from selling Option contracts previously signed with paid selling rights, $P_{t\omega}^{Opt-S0}$ is calculated using (10a) for partial-execution strategy with a variable $y_{ib t\omega}^{Opt-S}$ to be determined, and (10b) for whole-execution strategy with a fixed $y_{ib\omega}^{Opt-S}$, $\hat{y}_{ib\omega}^{Opt-S}$ determined previously:

$$P_{t\omega}^{Opt-S0} = \sum_{i \in F^{Opt-S0}} \sum_{b=1}^{B_i^{Opt-S}} \sum_{t:t \in T_i^{Opt-S} \cap T} y_{ib t\omega}^{Opt-S} \overline{P}_{ib}^{Opt-S},$$

$$\forall t \in T, \omega \in \Omega$$

$$P_{t\omega}^{Opt-S0} = \sum_{i \in F^{Opt-S0}} \sum_{b=1}^{B_i^{Opt-S}} \sum_{t:t \in T_i^{Opt-S} \cap T} \hat{y}_{ib\omega}^{Opt-S} \overline{P}_{ib}^{Opt-S},$$

$$\forall t \in T, \omega \in \Omega$$

where t:t∈$T_i^{Opt-S}$∩T ensures $y_{ibt\omega}^{Opt-S}\overline{P}_{ib}^{Opt-S}$ or taking non-zero value when t∈$T_i^{Opt-S}$∩T. If partially execution strategy was applied, the expected revenue for those previously contracts is determined as:

$$f_{reve}^{Opt-S0} = \Sigma_{\omega \in \Omega} \beta_\omega f_{reve-\omega}^{Opt-S-exec0}, \quad (11)$$

$$f_{reve-\omega}^{Opt-S-exec0} = \Sigma_{i \in F^{Opt-S0}} \Sigma_{b=1}^{B_i^{Opt-S}}$$
$$\Sigma_{t \in T^i_{Opt-S} \cap T} y_{ibt\omega}^{Opt-S} \lambda_{ib}^{Opt-S-exec} \overline{P}_{ib}^{Opt-S} \Delta t, \quad (12)$$

The constraints for decision Opt-S for previously signed contracts include:

$$y_{ibt\omega}^{Opt-S} = \{0,1\}, \forall i \in F^{Opt-S0}, b=\{1, \ldots,$$
$$B_i^{Opt-S}\}, t \in T_i^{Opt-S} \cap T, \omega \in \Omega \quad (13)$$

$$y_{ibt\omega}^{Opt-S} \leq \hat{x}_{ib}^{Opt-S}, \forall i \in F^{Opt-S0}, b=\{1, \ldots,$$
$$B_i^{Opt-S}\}, t \in T_i^{Opt-S} \cap T, \omega \in \Omega \quad (14)$$

$$y_{ibt\omega}^{Opt-S} \leq \hat{y}_{i(b-1)t\omega}^{Opt-S}, \forall i \in F^{Opt-S0}, b=\{2, \ldots,$$
$$B_i^{Opt-S}\}, t \in T_i^{Opt-S} \cap T, \omega \in \Omega \quad (15)$$

$\hat{x}_{ib}^{Opt-S}$ is a fixed $x_{ib}^{Opt-S}$ determined previously.

Figure 6B:
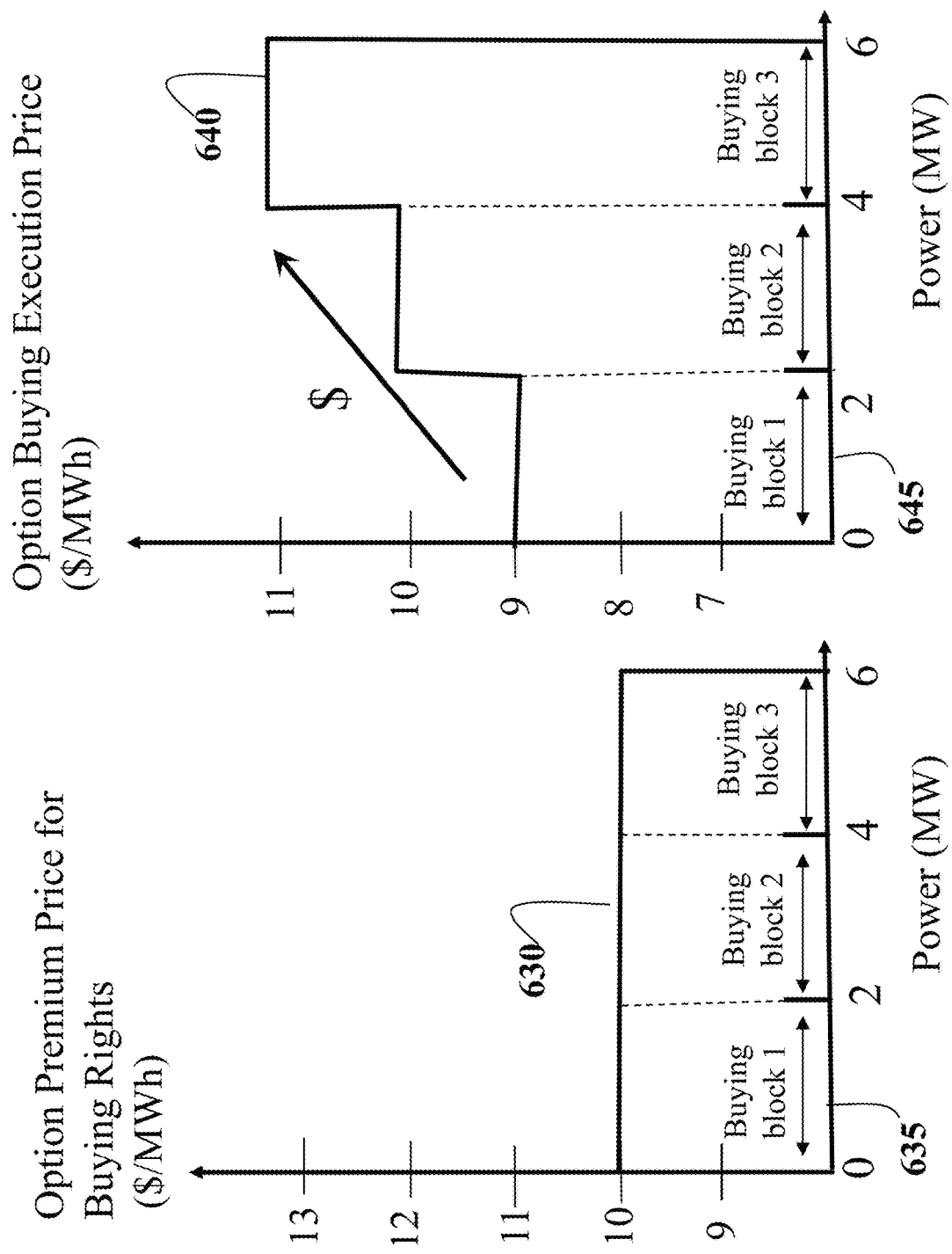
FIG. 6B is a graph illustrating a bidding curve for a buying Option contract in a future market, according to some embodiments of the present disclosure.

FIG. 6B is a schematic illustrating bidding curves for buying Option contracts for future market, according to some embodiments of the present disclosure. Buying Option contracts also consist of blocks of power spanning a specified period of time with associated two price components. The left portion is the curve of premium price component 630 for buying rights with respect to the amount of power bought, and the shape of curve is a flat line. For instance, the premium for buying 2 MW, 635 is $10/MWh, additional 2 MW and another 2 MW during the same period are also at the same price $10/MWh. The right portion is the curve of execution price component for buying power 640 with respect to the amount of power bought, and the curve is a non-decreasing step-wise curve. For instance, buying 2 MW, 645 in each period at $9/MWh, additional 2 MW during the same period at $10/MWh and additional 2 MW at $11/MWh. If the VPP buys energy through buying Option contracts, the energy price increases with the amount of the energy bought.

Similarly, assumed there are a set of buying Option contracts available for the scheduling horizon. The VPP needs to decide which buying Option contracts should be traded by first acquiring the buying rights with premium prices, and then decide whether executing the contracts partially or as a whole by paying the buying execution price. The expected cost for buying Option contracts, $f^{Opt-B}$ can be determined by summing up the premiums paid for purchasing buying rights, $f_{cost}^{Opt-B-Prem}$ and the expected paid amount after actually execution which calculated as a sum of execution cost for each individual scenario ω, $f_{cost-\omega}^{Opt-B-exec}$ weighted with its probability, $\beta_\omega$, according to:

$$f_{cost}^{Opt-B} = f_{cost}^{Opt-B-prem} + \Sigma_{\omega \in \Omega} \beta_\omega f_{cost-\omega}^{Opt-B-exec}, \quad (16)$$

The premium cost for buying Option contracts is calculated as:

$$f_{cost}^{Opt-B-prem} = \Sigma_{i \in F^{Opt-B}} \Sigma_{b=1}^{B_i^{Opt-B}} \Sigma_{t \in T_i Opt-B}$$
$$\Sigma_{t \in T_i Opt-B} x_{ib}^{Opt-B} \lambda_{ib}^{Opt-B-prem} \overline{P}_{ib}^{Opt-B} \Delta t \quad (17)$$

wherein, $F^{Opt-B}$ is the set of available buying Option future contracts. $B_i^{Opt-B}$ is the number of blocks for buying Option contract i. $T_i^{Opt-B}$ is the set of time intervals included in buying Option contract i. $x_{ib}^{Opt-B}$ is a binary variable that is equal to 1 if future Option contract i is signed to purchase buying energy rights for block b and 0 otherwise. $\lambda_{ib}^{Opt-B-prem}$ is the premium price for purchasing buying rights for block b of buying Option contract i. $\overline{P}_{ib}^{Opt-B}$ is the power capacity of block b of buying Option contract i.

The execution cost for individual scenario ω is calculated using equation (18a) for partially execution strategy is applied, equation (18b) if whole execution strategy is applied.

$$f_{cost-\omega}^{Opt-B-exec} = \Sigma_{i \in F^{Opt-B}} \Sigma_{b=1}^{B_i^{Opt-B}}$$
$$\Sigma_{t \in T_i Opt-B} y_{ibt\omega}^{Opt-B} \lambda_{ib}^{Opt-B-exec} \overline{P}_{ib}^{Opt-B} \Delta t, \forall \omega \in \Omega \quad (18a)$$

$$f_{cost-\omega}^{Opt-B-exec} = \Sigma_{i \in F^{Opt-B}} \Sigma_{b=1}^{B_i^{Opt-B}}$$
$$\Sigma_{t \in T_i Opt-B} y_{ib\omega}^{Opt-B} \lambda_{ib}^{Opt-B-exec} \overline{P}_{ib}^{Opt-B} \Delta t, \forall \omega \in \Omega \quad (18b)$$

where $y_{ibt\omega}^{Opt-B}$ is a binary variable that is equal to 1 if future Option contract i is executed to buy energy from block b during time interval t under scenario ω. $y_{ib\omega}^{Opt-B}$ is a binary variable that is equal to 1 if future Option contract i is executed to buy energy from block b under scenario ω. $\lambda_{ibhu\ Opt-B-exec}$ is the execution price for buying energy from block b of buying Option contract i.

The powers bought from those buying Option contracts are determined based on the execution statuses for buying Option contracts. The actual power purchased through buying Option contracts during time interval t under scenario ω, $P_{t\omega}^{Opt-B}$ is bounded by a maximum allowed buying amount, $\overline{P}_t^{Opt-B}$ as described by (19a) for partial-execution strategy, and (19b) for whole-execution strategy:

$$0 \leq P_{t\omega}^{Opt-B} = \Sigma_{i \in F^{Opt-B}} \Sigma_{b=1}^{B_i^{Opt-B}} \Sigma_{t:t \in T_i Opt-B} y_{ibt\omega}^{Opt-B}$$
$$\overline{P}_{ib}^{Opt-B} \leq \overline{P}_t^{Opt-B} \quad (19a)$$

$$0 \leq P_{t\omega}^{Opt-B} = \Sigma_{i \in F^{Opt-B}} \Sigma_{b=1}^{B_i^{Opt-B}} \Sigma_{t:t \in T_i Opt-B} y_{ib\omega}^{Opt-B}$$
$$\overline{P}_{ib}^{Opt-B} \leq \overline{P}_t^{Opt-B} \quad (19b)$$

where t:t∈$T_i^{Opt-B}$ denotes that $y_{ibt\omega}^{Opt-B}\overline{P}_{ib}^{Opt-B}$ or $y_{ib\omega}^{Opt-B}\overline{P}_{ib}^{Opt-B}$ can have non-zero value when i∈$T_i^{Opt-B}$ is true.

The trading decisions related to buying Option contracts are fully described by a binary variable, $x_{ib}^{Opt-B}$ indicating which contract is signed and which blocks of the contract are chosen, and another binary variable, $y_{ibt\omega}^{Opt-B}$ or $y_{ib\omega}^{Opt-B}$ indicating how the chosen blocks of the signed contracts are actually executed. Those variables are subject to the following constraints:

$$x_{ib}^{Opt-B} = \{0,1\}, \forall i \in F^{Opt-B}, b=\{1, \ldots, B_i^{Opt-B}\} \quad (20)$$

$$y_{ibt\omega}^{Opt-B} = \{0,1\}, \forall i \in F^{Opt-B}, b=\{1, \ldots,$$
$$B_i^{Opt-B}\}, t \in T_i^{Opt-B}, \omega \in \Omega \quad (21a)$$

$$y_{ib\omega}^{Opt-B} = \{0,1\}, \forall i \in F^{Opt-B}, b=\{1, \ldots, B_i^{Opt-B}\}, \omega \in \Omega \quad (21b)$$

$$y_{ibt\omega}^{Opt-B} \leq x_{ib}^{Opt-B}, \forall i \in F^{Opt-B}, b=\{1, \ldots,$$
$$B_i^{Opt-B}\}, t \in T_i^{Opt-B}, \omega \in \Omega \quad (22a)$$

$$y_{ib\omega}^{Opt-B} \leq x_{ib}^{Opt-B}, \forall i \in F^{Opt-B}, b=\{1, \ldots, B_i^{Opt-B}\},$$
$$\omega \in \Omega \quad (22b)$$

$$x_{ib}^{Opt-B} \leq x_{i(b-1)}^{Opt-B}, \forall i \in F^{Opt-B}, b=\{2, \ldots,$$
$$B_i^{Opt-B}\}, t \in T_i^{Opt-B}, \omega \in \Omega \quad (23)$$

$$y_{ibt\omega}^{Opt-B} \leq y_{i(b-1)t\omega}^{Opt-B}, \forall i \in F^{Opt-B}, b=\{2, \ldots,$$
$$B_i^{Opt-B}\}, t \in T_i^{Opt-B}, \omega \in \Omega \quad (24a)$$

$$y_{ib\omega}^{Opt-B} \leq y_{i(b-1)\omega}^{Opt-B}, \forall i \in F^{Opt-B}, b=\{2, \ldots,$$
$$B_i^{Opt-B}\}, \omega \in \Omega \quad (24b)$$

Constraints (20) and (21) are binary constraints to force decision variables for each block of buying Option contracts taking values either 0 or 1. (21a) and (21b) are used for partial and whole execution strategies, respectively. Constraint (22) ensures a buying block of a buying Option contract can be executed only when the buying rights for the block of the buying Option contract is purchased. (22a) and (22b) are used for partial and whole execution strategies, respectively. Constraints (23) and (24) impose the non-decreasing requirements for bidding curves of buying Option contracts, that is the higher price block can be committed or executed only when the lower price blocks have been committed or executed already. (24a) and (24b) are used for partial and whole execution strategies, respectively.

For previously signed buying Option contracts, the power to be bought during period t and scenario ω, $P_{t\omega}^{Opt-B0}$ is calculated using (25a) for partial-execution strategy with a variable $y_{ibt\omega}^{Opt-B}$ to be determined, and (25b) for whole-execution strategy with a fixed $y_{ib\omega}^{Opt-B}$, $\hat{y}_{ib\omega}^{Opt-B}$ determined previously:

$$P_{t\omega}^{Opt-B0} = \sum_{i \in F^{Opt-B0}} \sum_{b=1}^{B_i^{Opt-B}} \sum_{t:t \in T_i^{Opt-B} \cap T} y_{ibt\omega}^{Opt-B} \overline{P}_{ib}^{Opt-B}, \quad (25a)$$

$$\forall t \in T, \omega \in \Omega$$

$$P_{t\omega}^{Opt-B0} = \sum_{i \in F^{Opt-B0}} \sum_{b=1}^{B_i^{Opt-B}} \sum_{t:t \in T_i^{Opt-B} \cap T} \hat{y}_{ib\omega}^{Opt-B} \overline{P}_{ib}^{Opt-B}, \quad (25b)$$

$$\forall t \in T, \omega \in \Omega$$

where t:t∈$T_i^{Opt-B} \cap T$ ensures $y_{ibt\omega}^{Opt-B} \overline{P}_{ib}^{Opt-B}$ or $\hat{y}_{ib\omega}^{Opt-B} \overline{P}_{ib}^{Opt-B}$ taking non-zero value when t∈$T_i^{Opt-B} \cap T$. If partially execution strategy was applied, the expected cost for those previously contracts is determined as:

$$f_{cost}^{Opt-B0} = \sum_{\omega \in \Omega} \beta_\omega f_{cost-\omega}^{Opt-B-exec0}, \quad (26)$$

$$f_{cost-\omega}^{Opt-B-exec0} = \sum_{i \in F^{Opt-B0}} \sum_{b=1}^{B_i^{Opt-B}} \sum_{t \in T_i^{Opt-B} \cap T} y_{ibt\omega}^{Opt-B} \lambda_{ib}^{Opt-B} \lambda_{ib}^{Opt-B-exec} \overline{P}_{ib}^{Opt-B} \Delta t, \quad (27)$$

The constraints for decision $y_{ibt\omega}^{Opt-B}$ for previous contracts include:

$$y_{ibt\omega}^{Opt-B} = \{0,1\} \forall i \in F^{Opt-B0}, b = \{1, \ldots, B_i^{Opt-B}\}, t \in T_i^{Opt-B} \cap T, \omega \in \Omega \quad (28)$$

$$y_{ibt\omega}^{Opt-B} \leq \hat{x}_{ib}^{Opt-B}, \forall i \in F^{Opt-B0}, b = \{1, \ldots, B_i^{Opt-B}\}, t \in T_i^{Opt-B} \cap T, \omega \in \Omega \quad (29)$$

$$y_{ibt\omega}^{Opt-B} \leq y_{i(b-1)t\omega}^{Opt-B}, \forall i \in F^{Opt-B0}, b = \{2, \ldots, B_i^{Opt-B}\}, t \in T_i^{Opt-B} \cap T, \omega \in \Omega \quad (30)$$

$\hat{x}_{ib}^{Opt-B}$ is a fixed $x_{ib}^{Opt-B}$ determined previously.

It is required that for any time interval, the VPP should only sign one type of Option contracts, either buying or selling, not both. Therefore, a mutual exclusivity constraint is imposed to selling and buying Option contracts for any time interval, and expressed as:

$$\max_{i \in F^{Opt-S}} x_{i1}^{Opt-S} + \max_{j \in F^{Opt-B}} x_{j1}^{Opt-B} \leq 1, \quad (31)$$

$$\forall t = T_i^{Opt-S} \cap T_j^{Opt-S}, i \in F^{Opt-S}, j \in F^{Opt-B}$$

Figure 6C:
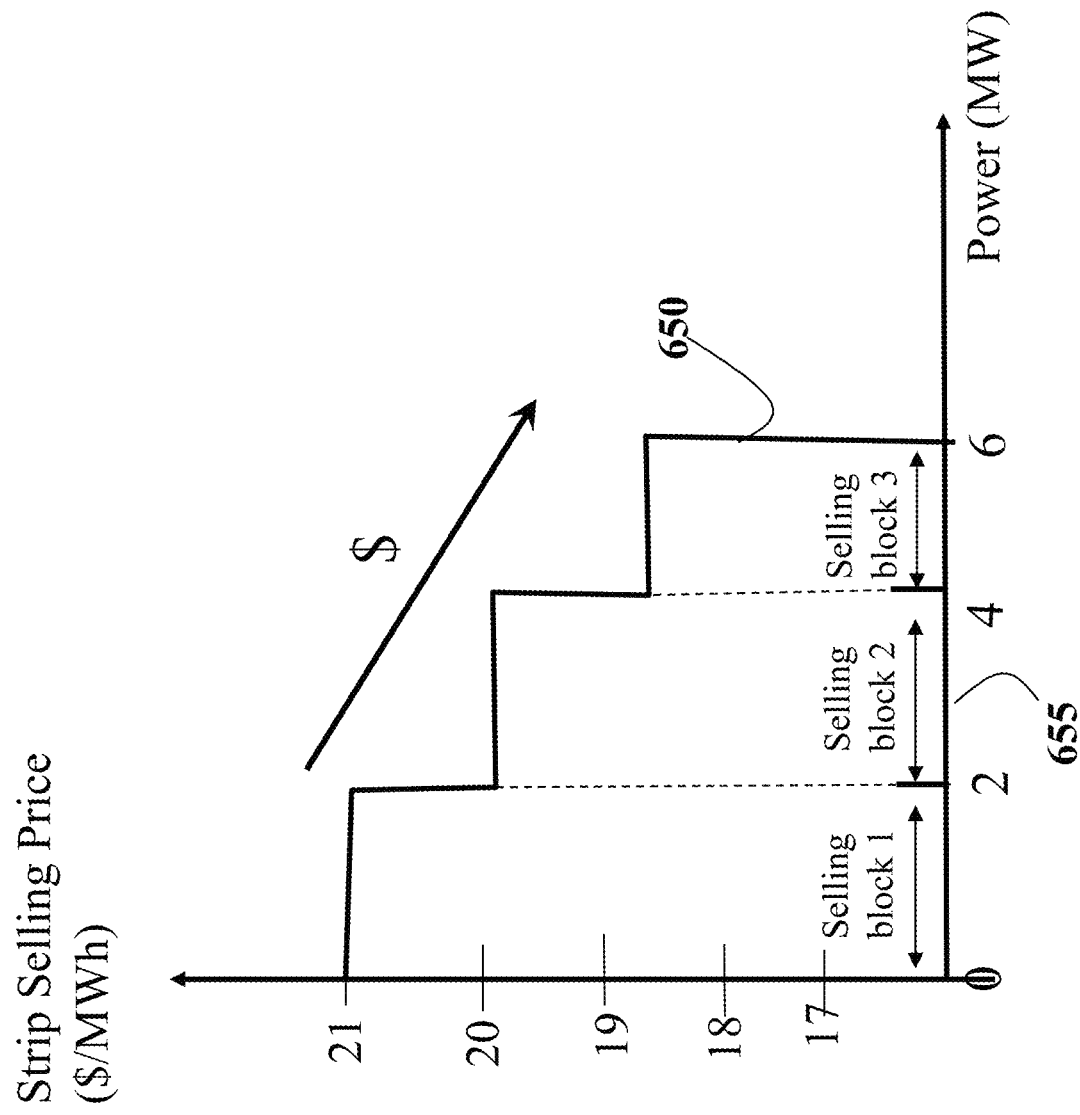
FIG. 6C is a graph illustrating an offering curve for a selling strip contract in a future market, according to some embodiments of the present disclosure.

FIG. 6C is a schematic illustrating offering curve for a selling strip contract, according to some embodiments of the present disclosure. The selling strip contract consist of blocks 655 of constant power spanning a specified period of time with associated decreasing prices 650. For instance, selling 2 MW at $21/MWh, additional 2 MW during the same period at $20/MWh and additional 2 MW at $18.5/MWh. That is if the VPP sells energy in the futures market, the energy price decreases with the amount of the energy sold. There is no premium fee for strip contracts, but the strip contracts must be executed if the contract is signed no matter what the environmental scenario the VPP may faces.

The total revenues for the VPP to gain from selling strip contracts can be determined according to the commitments made by the VPP for selling blocks of each selling strip contract:

$$f_{reve}^{Str-S} = \sum_{i \in F^{Str-S}} \sum_{b=1}^{B_i^{Str-S}} \sum_{t \in T_i^{Str-S}} x_{ib}^{Str-S} \lambda_{ib}^{Str-S} \overline{P}_{ib}^{Str-S} \Delta t, \quad (32)$$

wherein, $f_{reve}^{Str-S}$ denotes the revenue collecting from selling strip contracts. $F^{Str-S}$ is the set of available selling future strip contract s. $B_i^{Str-S}$ is the number of blocks for selling strip contract i. $T_i^{Str-S}$ is the set of time intervals included in selling strip contract i. $T_i^{Str-S}$ is a binary variable that is equal to 1 if future strip contract i is signed to sell energy to block b and 0 otherwise. $\lambda_{ib}^{Str-S}$ is the selling price for selling energy to block b of selling strip contract i. $\overline{P}_{ib}^{Str-S}$ is the power capacity of block b of selling strip contract i. The actual power sold through selling strip contracts during time interval t under scenario ω, $P_{t\omega}^{Str-S}$ is bounded by a maximum allowed selling amount, $\overline{P}_t^{Str-S}$ as described by:

$$0 \leq P_{t\omega}^{Str-S} = \sum_{i \in F^{Str-S}} \sum_{b=1}^{B_i^{Str-S}} \sum_{t:t \in T_i^{Str-S}} x_{ib}^{Str-S} \overline{P}_{ib}^{Str-S} \leq \overline{P}_t^{Str-S} \quad (33)$$

The trading decision for selling strip contracts is fully described by the decision variable $x_{ib}^{Str-S}$ and the variable is subject to the following constraints:

$$x_{ib}^{Str-S} = \{0,1\}, \forall i \in F^{Str-S}, b = \{1, \ldots, B_i^{Str-S}\} \quad (34)$$

$$x_{ib}^{Str-S} \leq x_{i(b-1)}^{Str-S}, \forall i \in F^{Str-S}, b = \{2, \ldots, B_i^{Str-S}\} \quad (35)$$

Constraints (34) are binary constraints to ensure decision variables for each block of selling strip contracts taking values either 0 or 1. Constraint (35) imposes the non-increasing requirements for offering curves of selling strip contracts, i.e. the higher quantity the lower price.

For selling strip contracts previously signed $F^{Str-S0}$, there is no new revenue incurred, but the sold power has to take into account for power balancing. The available power sold during period t and scenario ω from selling strip contracts previously signed, $P_{t\omega}^{Str-S0}$ is calculated as:

$$P_{t\omega}^{Str-S0} = \sum_{i \in F^{Str-S0}} \sum_{b=1}^{B_i^{Str-S}} \sum_{t:t \in T_i^{Str-S} \cap T} \hat{x}_{ib}^{Str-S} \overline{P}_{ib}^{Str-S}, \quad (36)$$

$$\forall t \in T, \omega \in \Omega$$

t:t∈$T_i^{Str-S} \cap T$ ensures $\hat{x}_{ib}^{Str-S} \overline{P}_{ib}^{Str-S}$ taking non-zero value when t∈$T_i^{Str-S} \cap T$. $\hat{x}_{ib}^{Str-S}$ is previously determined for $x_{ib}^{Str-S}$.

Figure 6D:
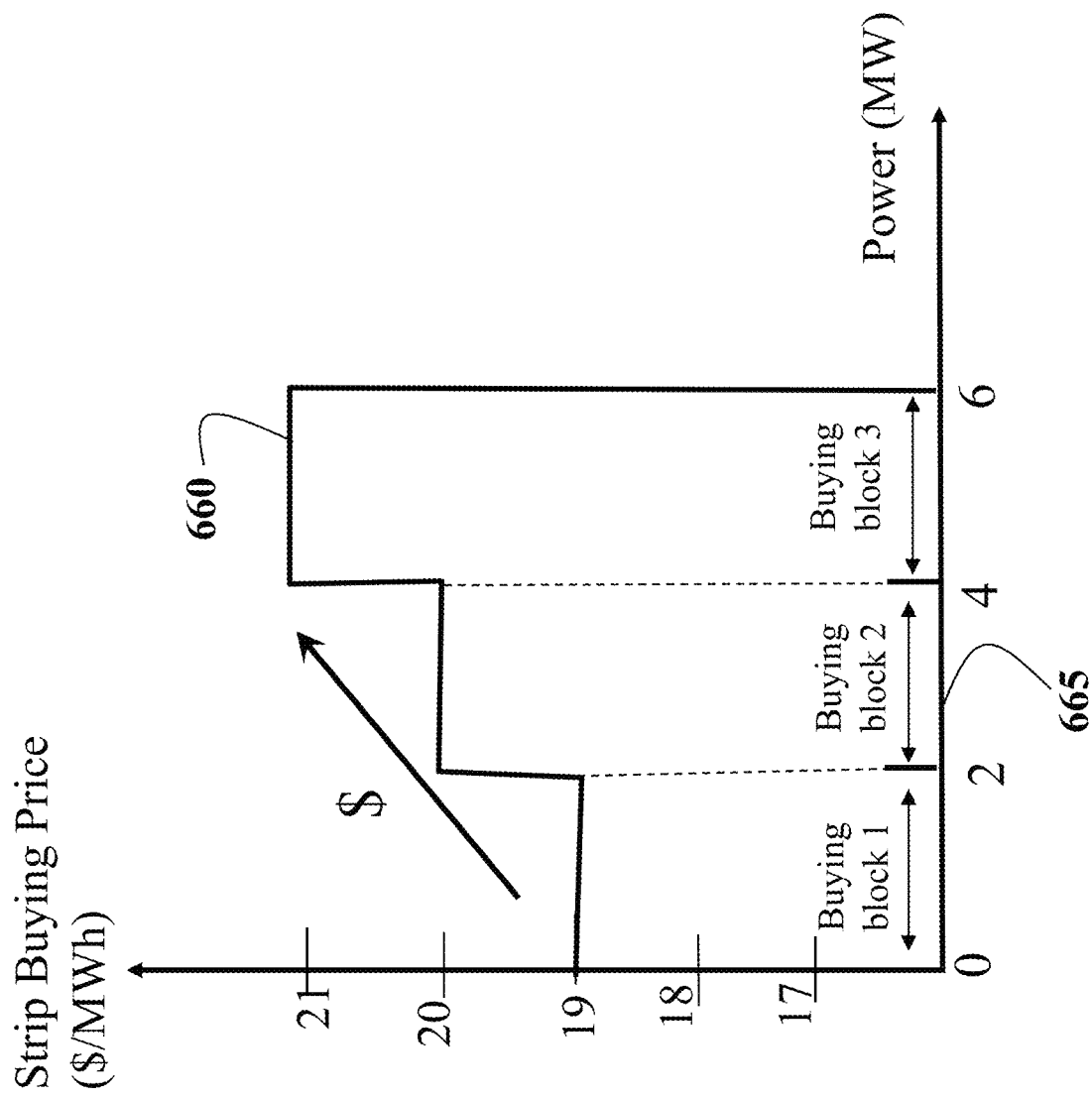
FIG. 6D is a graph illustrating a bidding curve for a buying strip contract in a future market, according to some embodiments of the present disclosure.

FIG. 6D is a schematic illustrating bidding curve for a buying strip contract, according to some embodiments of the present disclosure. The buying strip contract consist of blocks 665 of constant power spanning a specified period of time with associated increasing prices 660. For instance, buying 2 MW at $19/MWh, additional 2 MW during the same period at $20/MWh and another additional 2 MW at $21/MWh. That is if the VPP buys energy in the futures market, the energy price increases with the amount of the energy purchased.

The total cost for purchasing buying strip contracts, $f_{cost}^{Str-B}$ can be given as:

$$f_{cost}^{Str-B} = \sum_{i \in F^{Str-B}} \sum_{b=1}^{B_i^{Str-B}} \sum_{t \in T_i^{Str-B}} x_{ib}^{Str-B} \lambda_{ib}^{Str-B} \overline{P}_{ib}^{Str-B} \Delta t, \quad (37)$$

Where $F^{Str-B}$ is the set of available buying future strip contract s. $B_i^{Str-B}$ is the number of blocks for buying strip contract i. $T_i^{Str-B}$ is the set of time intervals included in buying strip contract i. $x_{ib}^{Str-B}$ is a binary variable that is equal to 1 if future strip contract i is signed to purchase energy from block b and 0 otherwise. $\lambda_{ib}^{Str-B}$ is the buying price for purchasing energy from block b of buying strip contract i. $\overline{P}_{ib}^{Str-S}$ is the power capacity of block b of buying strip contract i.

For time interval t and scenario w, the actual power purchased, $P_{t\omega}^{Str-B}$ is bounded by a maximum allowed buying amount, $\overline{P}_t^{Str-B}$ as described by:

$$0 \leq P_{t\omega}^{Str-B} = \Sigma_{i \in F^{Str-B}} \Sigma_{b=1}^{B_i^{Str-B}} \Sigma_{t:t \in T_i^{Str-B}} x_{ib}^{Str-B} \overline{P}_{ib}^{Str-B} \leq \overline{P}_t^{Str-B} \quad (38)$$

The feasibility constraints for the decision variable, $x_{ib}^{Str-B}$ describing the trading decisions on buying strip contracts include:

$$x_{ib}^{Str-B} = \{0,1\}, \forall i \in F^{Str-B}, b = \{1, \ldots, B_i^{Str-B}\} \quad (39)$$

$$x_{ib}^{Str-B} \leq x_{i(b-1)}^{Str-B}, \forall i \in F^{Str-B}, b = \{2, \ldots, B_i^{Str-B}\} \quad (40)$$

Constraint (39) is a binary constraint to ensure decision variables for each block of buying strip contracts taking values either 0 or 1. Constraint (40) imposes the non-decreasing requirements for bidding curves of buying strip contracts, i.e. the higher quantity the higher price.

For buying strip contracts previously signed, there is no new cost incurred, but the bought power has to be considered for power balancing. The available power sold during period t and scenario (o from buying strip contracts previously signed, $P_{t\omega}^{Str-B0}$ is calculated as:

$$P_{t\omega}^{Str-B0} = \sum_{i \in F^{Str-B0}} \sum_{b=1}^{B_i^{str-B}} \sum_{t:t \in T_i^{Str-B} \cap T} \hat{x}_{ib}^{Str-B} \overline{P}_{ib}^{Str-B}, \quad (41)$$

$$\forall t \in T, \omega \in \Omega$$

$t:t \in T_i^{Str-B} \cap T$ ensures $\hat{x}_{ib}^{Str-B} \overline{P}_{ib}^{Str-B}$ taking non-zero value when $t \in T_i^{Str-B} \cap T$. $\hat{x}_{ib}^{Str-B} \overline{P}_{ib}^{Str-B}$ is previously determined for $x_{ib}^{Str-B}$.

The mutual exclusivity constraint is also applied to strip contracts. That is, for any time interval, the VPP should only sign one type of strip contracts, either buying or selling, not both:

$$\max_{i \in F^{Str-S}} x_{i1}^{Str-S} + \max_{j \in F^{Str-B}} x_{j1}^{Str-B} \leq 1, \quad (42)$$

$$\forall t = T_i^{Str-S} \cap T_j^{Str-S}, i \in F^{Str-S}, j \in F^{Str-B}$$

Besides future market, the VPP is expected to trade its produced energy in pool market as well. That is the VPP is only allowed to sell its energy into the pool market.

Figure 6E:
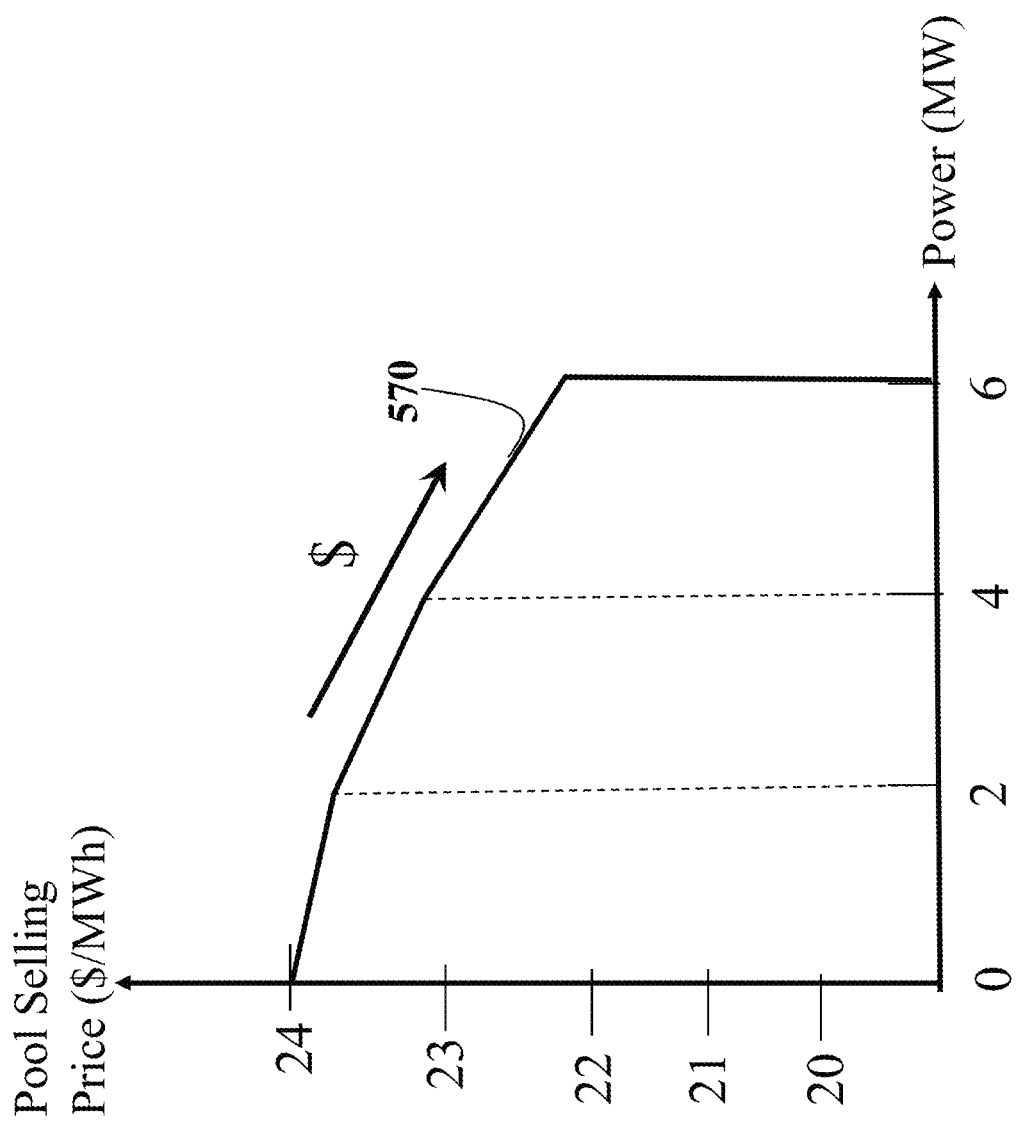
FIG. 6E is a graph illustrating a non-increasing offering curve for pool market, according to some embodiments of the present disclosure.

FIG. 6E is a schematic illustrating the non-increasing offering curve for pool market, according to some embodiments of the present disclosure. As shown in FIG. 6-E, the offerings of the virtual power plant follow a monotonically decreasing price curve 670 with the increasing of power supplied.

The expected revenue collected from the pool market, $f_{reve}^{Pool}$ is determined as a summation of revenues for each individual scenario ω, $f_{reve-\omega}^{Pool}$ weighted by the probability of the scenario, $\beta_\omega$:

$$f_{reve}^{Pool} = \Sigma_{\omega \in \Omega} \beta_\omega f_{reve-\omega}^{Pool}, \quad (43)$$

The individual revenue, $f_{reve-\omega}^{Pool}$ is determined by the power sold to the pool market during period t under scenario ω, $f_{t\omega}^{Pool}$ as:

$$f_{reve-\omega}^{Pool} = \Sigma_{t \in T} \lambda_{t\omega}^{Pool} P_{t\omega}^{Pool} \Delta t, \forall \omega \in \Omega \quad (44)$$

wherein, $\lambda_{t\omega}^{Pool}$ is the clearing price charged by the pool market during period t under scenario ω. The trading decision variable $P_{t\omega}^{Pool}$ is subject to the following constraints:

$$0 \leq P_{t\omega}^{Pool} \leq \overline{P}_t^{Pool}, \forall t \in T, \omega \in \Omega \quad (45)$$

$$(\lambda_{t\omega}^{Pool} - \lambda_{t\omega'}^{Pool})(P_{t\omega}^{Pool} - P_{t\omega'}^{Pool}) \leq 0, \forall t \in T, (\omega, \omega') \in \Omega \quad (46)$$

$$P_{t\omega}^{Pool} = P_{t\omega'}^{Pool}, \forall t \in T, (\omega, \omega') \in \Omega : \lambda_{t\omega'}^{Pool} \quad (47)$$

where this is bounded by a maximum allowed buying amount Constraints (45) bounds power offers to the pool within zero to a maximum allowed amount, $\overline{P}_t^{Pool}$. Constraints (46) impose that pool offer curves should be non-decreasing, i.e., the higher the price the higher the quantity offered. Constraints (47) are non-anticipativity constraints pertaining to pool offer curves.

The VPP determines its offering or bidding decisions based on its energy producing capacities and energy consumption demands. The energy can be produced from a wind power plant, a solar power plant, or discharging of an energy storage. The energy can be consumed by a local demand, charging of an energy storage. The offering and bidding decisions can also be Optimized according to related wear costs for energy production and incentive costs for load controls.

The expected wear cost for power generation of wind power plants, $f_{cost}^{Wind}$ is determined as:

$$F_{cost}^{Wind} = \Sigma_{\omega \in \Omega} \beta_\omega f_{cost-\omega}^{Wind}, \quad (48)$$

$$F_{cost-\omega}^{Wind} = \Sigma_{k=1}^{S^{Wind}} \Sigma_{t \in T} \gamma_k^{Wind} \Delta t, \forall \omega \in \Omega \quad (49)$$

wherein, $f_{cost-\omega}^{Wind}$ is the wear cost of wind power plant for scenario ω. $S^{wind}$ is the set of available wind power plants. $\gamma_k^{Wind}$ is the cost coefficient of wind farm k considering its life cycle cost. $P_{kt\omega}^{Wind}$ is the actual power generated by wind power plant k during period t and scenario ω. The power generated by the wind power plants is:

$$P_{t\omega}^{Wind} = \Sigma_{k=1}^{S^{Wind}} P_{kt\omega}^{Wind}, \forall t \in T, \omega \in \Omega \quad (50)$$

The decision variable for scheduling of power generation for each wind power plant, $P_{kt\omega}^{Wind}$ is subject to the following constraint:

$$0 \leq P_{kt\omega}^{Wind} \leq \overline{P}_{kt\omega}^{Wind}, \forall k = \{1, \ldots, S^{Wind}\}, t \in T, \omega \in \Omega \quad (51)$$

where $\overline{P}_{kt\omega}^{Wind}$, is the maximum power generated by wind power plant k during period t and scenario ω. Constraint (51) imposes lower and upper bounds on power production of wind power plants.

The expected wear cost for the solar power plants, $f_{cost}^{Solar}$ and total power generated from solar power plants, $P_{t\omega}^{Solar}$ are determined according to:

$$f_{cost}^{Solar} = \Sigma_{\omega \in \Omega} \beta_\omega f_{cost-\omega}^{Solar} \quad (52)$$

$$f_{cost-\omega}^{Solar} = \Sigma_{k=1}^{S^{Solar}} \Sigma_{t \in T} \gamma_k^{Solar} P_{kt\omega}^{Solar} \Delta t, \forall \omega \in \Omega \quad (53)$$

$$P_{t\omega}^{Solar} = \Sigma_{k=1}^{S^{Solar}} P_{kt\omega}^{Solar}, \forall t \in T, \omega \in \Omega \quad (54)$$

wherein, $S^{Solar}$ is the set of available solar power plants. $\gamma_k^{Solar}$ is the cost coefficient of solar power plant k considering its life cycle cost. $P_{kt\omega}^{Solar}$ is the actual power generated by solar power plant k during period t and scenario $\omega$.

The decision variable $P_{kt\omega}^{Solar}$ for the scheduling of power generation from each solar power plant is constrained by:

$$0 \leq P_{kt\omega}^{Solar} \leq \overline{P}_{kt\omega'}^{Solar} \forall k=\{1,\ldots,S^{Solar}\}, t \in T, \omega \in \Omega \quad (55)$$

where $\overline{P}_{kt\omega}^{Solar}$ is the maximum power generated by solar power plant k during period t and scenario $\omega$. Constraint (55) imposes lower and upper bounds on power production of solar power plants.

The expected wear cost for charging and discharging of the energy storages, $f_{cost}^{Stor}$ and total discharging and charging powers provided by the energy storages, $P_{t\omega}^{Dch}$ and $P_{t\omega}^{Ch}$ are determined as:

$$f_{cost}^{Stor} = \Sigma_{\omega \in \Omega} \beta_\omega f_{cost-\omega}^{Stor} \quad (56)$$

$$f_{cost-\omega}^{Stor} = \Sigma_{k=1}^{S^{Stor}} \Sigma_{t \in T} \gamma_k^{Stor}(P_{kt\omega}^{Dch} + P_{kt\omega}^{Ch})\Delta t, \forall \omega \in \Omega \quad (57)$$

$$P_{t\omega}^{Dch} = \Sigma_{k=1}^{S^{Stor}} P_{kt\omega'}^{Dch} \forall t \in T, \omega \in \Omega \quad (58)$$

$$P_{t\omega}^{Ch} = \Sigma_{k=1}^{S^{Stor}} P_{kt\omega'}^{Ch} \forall t \in T, \omega \in \Omega \quad (59)$$

where $f_{cost-\omega}^{Stor}$ is the wear cost for energy storages under scenario $\omega$. $S^{Stor}$ is the set of available energy storages. $\gamma_k^{Stor}$ is the wear cost coefficient of energy storage k for charging and discharging. $P_{kt\omega}^{Dch}$ and $P_{kt\omega}^{Ch}$ are the actual discharging and charging powers of energy storage k during period t and scenario $\omega$.

The scheduling of an energy storage can be described using its charging or discharging statues, its charging or discharging powers. Those decision variables are subject to the following constraints:

$$x_{kt\omega}^{Dch} = \{0,1\}, \forall k = \{1,\ldots,S^{Stor}\}, t \in T, \omega \in \Omega \quad (60)$$

$$x_{kt\omega}^{Ch} = \{0,1\}, \forall k = \{1,\ldots,S^{Stor}\}, t \in T, \omega \in \Omega \quad (61)$$

$$x_{kt\omega}^{Dch} + x_{kt\omega}^{Ch} \leq 1, \forall k = \{1,\ldots,S^{Stor}\}, t \in T, \omega \in \Omega \quad (62)$$

$$0 \leq P_{kt\omega}^{Dch} \leq x_{kt\omega}^{Dch} \overline{P}_k^{Dch}, \forall k = \{1,\ldots,S^{Stor}\}, t \in T, \omega \in \Omega \quad (63)$$

$$0 \leq P_{kt\omega}^{Ch} \leq x_{kt\omega}^{Ch} \overline{P}_k^{Ch}, \forall k = \{1,\ldots,S^{Stor}\}, t \in T, \omega \in \Omega \quad (64)$$

$$E_{kt\omega}^{Stor} = \epsilon_k^{Stor} E_{k(t-1)\omega}^{Stor} + \eta_k^{Ch} P_{kt\omega}^{Ch} \Delta t - \frac{P_{kt\omega}^{Dch} \Delta t}{\eta_k^{Dch}},$$

$$\forall k = \{1,\ldots,S^{Stor}\}, t \in T, \omega \in \Omega \quad (65)$$

$$\underline{E}_k^{Stor} \leq E_{kt\omega}^{Stor} \leq \overline{E}_k^{Stor}, \forall k = \{1,\ldots,S^{Stor}\}, t \in T, \omega \in \Omega \quad (66)$$

where $x_{kt\omega}^{Dch}$ is a binary variable that is equal to 1 if storage k is discharging energy from the storage during period t and scenario $\omega$ and 0 otherwise. $x_{kt\omega}^{Ch}$ is a binary variable that is equal to 1 if storage k is charging energy into the storage during period t and scenario $\omega$ and 0 otherwise. $\overline{P}_k^{Dch}$ and $\overline{P}_k^{Ch}$ are the discharging and charging capacities of energy storage k. $\epsilon_k^{Stor}$ is the self-consumption coefficient of storage k. $\underline{E}_k^{Stor}$ and $\overline{E}_k^{Stor}$ are the minimum and maximum stored energies of storage k. $E_{kt\omega}^{Stor}$ is the stored energy of storage k during period t and scenario $\omega$. $\eta_k^{Dch}$ and $\eta_k^{Ch}$ are the discharging and charging efficiencies of energy storage k. Constraints (60) and (61) are binary constraints for variables representing charging and discharging statues of energy storages. Constraint (62) ensures each energy storage can only hold either at a charging mode, or at a discharging mode, or at an idle mode. Constraints (63) and (64) bound the maximum discharging and charging powers of energy storages. Constraints (65) express energy balance of energy storages, and constraint (66) bounds the lower and upper limits of stored energy of energy storages.

The expected cost for controlling of local flexible loads is calculated as a sum of incentive cost for each individual scenario for selling consumption rights, $f_{cost-\omega}^{Load}$ weighted by the probability of individual scenario $\beta_\omega$ as:

$$f_{cost}^{Load} = \Sigma_{\omega \in \Omega} \beta_\omega f_{cost-\omega}^{Load} \quad (67)$$

$$f_{cost-\omega}^{Load} = \Sigma_{k=1}^{S^{Load}} \Sigma_{t \in T} \rho_k \|_{t\omega}^{pool} P_{kt\omega}^{Curt} \Delta t, \forall \omega \in \Omega \quad (68)$$

wherein, $f_{cost}^{Load}$ is the incentive cost given to local loads for giving up power consumption rights. $S^{Load}$ is the set of local flexible loads, $\rho_k$ is the incentive factor for a flexible load to sell its rights for power consumption, and represents a ratio of incentive rate for local customer selling his right for consuming power over pool price of load k. $P_{kt\omega}^{Curt}$ is the curtailed load demand of load k during period t and scenario $\omega$. The load curtailment, $P_{kt\omega}^{Curt}$ is bounded by. is the load demand of load k during period t and scenario $\omega$, $P_{kt\omega}^{Load}$:

$$0 \leq P_{kt\omega}^{Curt} \leq P_{kt\omega'}^{Load} \forall k=\{1,\ldots,S^{Load}\}, t \in T, \omega \in \Omega \quad (69)$$

The total load curtailment and load demand during period t and scenario $\omega$, $P_{t\omega}^{Curt}$ and $P_{t\omega}^{Load}$ are determined as:

$$P_{t\omega}^{Curt} = \Sigma_{k=1}^{S^{Load}} P_{kt\omega'}^{Curt} \forall t \in T, \omega \in \Omega \quad (70)$$

$$P_{t\omega}^{Load} = \Sigma_{k=1}^{S^{Load}} P_{kt\omega'}^{Load} \forall t \in T, \omega \in \Omega \quad (71)$$

The scheduling of power production and consumption is related to the trading of powers at future and pool markets through a power balance equation (72):

Power balance:

$$P_{t\omega}^{Opt-SO} - P_{t\omega}^{Opt-BO} + P_{t\omega}^{Str-SO} - P_{t\omega}^{Str-BO} + P_{t\omega}^{Opt-S} -$$
$$P_{t\omega}^{Opt-B} + P_{t\omega}^{Str-S} - P_{t\omega}^{Str-B} + P_{t\omega}^{Pool} = P_{t\omega}^{Solar} +$$
$$P_{t\omega}^{Wind} + P_{t\omega}^{Dch} - P_{t\omega}^{Ch} + P_{t\omega}^{Curt} - P_{t\omega}^{Load}, \forall t \in T,$$
$$\omega \in \Omega \quad (72)$$

Constraints (72) enforce power balance for each time period and each scenario, i.e., the amount of power sold in the pool market and in the future market in terms of Option and strip contracts, $(P_{t\omega}^{Opt-S} + P_{t\omega}^{Str-S} + P_{t\omega}^{Pool})$ should be equal to the energy bought through option and strip contracts, $(P_{t\omega}^{Opt-B} + P_{t\omega}^{Str-B})$ plus available net energy, $(-P_{t\omega}^{Opt-SO} + P_{t\omega}^{Opt-BO} - P_{t\omega}^{Str-SO} + P_{t\omega}^{Str-BO})$ from contracts signed before the beginning of the time horizon plus the net energy produced by all resources, $(P_{t\omega}^{Solar} + P_{t\omega}^{Wind} + P_{t\omega}^{Dch} - P_{t\omega}^{Ch} + P_{t\omega}^{Curt} - P_{t\omega}^{Load})$.

As discussed above, the virtual power plant can determine its scheduling and trading strategies using a stochastic Optimization model as described below:

Maximize $f_{reve}^{Opt-SO} - f_{cost}^{Opt-BO} + f_{reve}^{Opt-S} - f_{cost}^{Opt-B} +$
$f_{reve}^{Str-S} - f_{reve}^{Str-B} + f_{reve}^{Pool} - f_{cost}^{Wind} - f_{cost}^{Solar} -$
$f_{cost}^{Stor} - f_{cost}^{Load}$ (73)

Subject to:

Equations (4)-(9), (13)-(15), (19)-(24),(28)-(30),
(31),(33)-(35), (38)-(40), (42),(45)-(47),(51),
(55),(60)-(66),(69) and (72) (74)

The objective function (73) is to maximize the expected total profits of the virtual power plant over entire scheduling horizon. It is computed as 1) the revenue from selling energy minus the cost derived from buying energy through previous Option contracts in the future market 2) the revenue from selling energy minus the cost derived from buying energy through strip contracts in the future market 3) the revenue from selling energy minus the cost derived from buying energy through Option contracts in the future market, 4) the expected revenues obtained from selling energy in the pool market, 5) minus the expected wear cost of renewable generations and storages and purchasing customer rights for power consumption. The trading and scheduling problem is subject to a set of physical constraints for power production and consumption, power balance and offering/bidding feasibility constraints assembled in constraint (74). It includes equations (4)-(9) for selling Option contracts, (13)-(15) for previous selling Option contracts if applicable, (19)-(24) for buying Option contracts, (28)-(30) for previous buying Option contracts if applicable, (31) for multi-exclusiveness of Option contracts, (33)-(35) for selling strip contracts, (38)-(40) for buying strip contracts, (42) for multi-exclusiveness of strip contracts, (45)-(47) for pool market trading, (51) and (55) for wind and solar generations, (60)-(66) for energy storages, (69) for local flexible loads, and (72) for power balance between trading amounts and net power produced, The decision variables of this problem, u includes ones for production scheduling, $u^{Sch} = \{P_{kt\omega}^{Wind}, P_{kt\omega}^{Solar}, x_{kt\omega}^{Dch}, x_{kt\omega}^{Ch}, P_{kt\omega}^{Curt}\}$, ones for future market contracting, $$u_{master}^{Fut} = \{x_{ib}^{Opt-S}, x_{ib}^{Opt-B}, x_{ib}^{Str-S}, x_{ib}^{Str-B}\},$$

$$u_{slave}^{Fut} = \left\{\begin{matrix}y_{ibt\omega}^{Opt-S}\\y_{ib\omega}^{Opt-S}\end{matrix}, y_{ibt\omega}^{Opt-B} \text{ or } y_{ib\omega}^{Opt-B}\right\},$$

and ones for pool offering $u^{Pool} = \{P_{t\omega}^{pool}\}$, i.e., $u = \{u^{Sch}, u_{master}^{Fut}, u_{slave}^{Fut}, u^{Pool}\}$.

Accordingly, based on equations (1)-(3), (11)-(12), (16)-(18), (26)-(27), (32), (37), (43), (48)-(49), (52)-(53), (56)-(57), and (67)-(68), the objective function (73) can be re-arranged as:

$$f(u) = -f_{cost}^{Opt-S-prem}(u_{master}^{Fut}) - f_{cost}^{Opt-B-prem}(u_{master}^{Fut}) + f_{reve}^{Str-S}(u_{master}^{Fut}) - \quad (75)$$
$$f_{cost}^{Str-B}(u_{master}^{Fut}) + \sum_{\omega \in \Omega} \beta_\omega \left(f_{reve}^{Opt-S-exec}(u_{slave}^{Fut}) - \beta_\omega f_{cost}^{Opt-B-exec}(u_{slave}^{Fut})\right) +$$
$$\sum_{\omega \in \Omega} \beta_\omega f_{reve}^{Pool}(u^{Pool}) -$$
$$\sum_{\omega \in \Omega} \beta_\omega \left(f_{cost}^{Wind}(u^{Sch}) + f_{cost}^{Solar}(u^{Sch}) + f_{cost}^{Stor}(u^{Sch}) + f_{cost}^{Load}(u^{Sch})\right)$$

Then the problem given by (73) and (74) is reformulated by taking (75) as its objective, and (74) as its constraints. For a practical VPP, it is a large Mixed Integer Programming problem (MIP). Instead of solving the MIP problem that may be too large for standard solution methods all-in-one, Benders decomposition method can be used to solve the problem with iteratively solving a master problem to determine solutions for $u_{master}^{Fut}$, and set of slave problem for each scenario ω to determine solutions for $u_{slave}^{Fut}$, $u^{Pool}$ and $u^{Sch}$. Each slave problem is solved with given $u_{master}^{Fut}$. The master problem is solved by given the derivatives of objective functions of slave problems with the $u_{master}^{Fut}$ that derived from the solutions of the slave problems.

Stochastic-Dominance-Based Risk Management

To manage the financial risks, a VPP can tune the feasibility region for the scheduling and trading solutions using a stochastic dominance constraint, after an Optimal solution for the scheduling and trading problem described above has been obtained. When the Optimal solution for u, u* is obtained, we can determine the profit for each scenario ω, $f_\omega(u^*)$ as:

$$f_\omega(u^*) = -f_{cost}^{Opt-S-prem}(u_{master}^{Fut*}) - f_{cost}^{Opt-B-prem}(u_{master}^{Fut*}) + f_{reve}^{Str-S}(u_{master}^{Fut*}) -$$
$$f_{cost}^{Str-B}(u_{master}^{Fut*}) + f_{reve}^{Opt-S-exec}(u_{slave-\omega}^{Fut*}) - f_{cost}^{Opt-B-exec}(u_{slave-\omega}^{Fut*}) +$$
$$f_{reve}^{Pool}(u_\omega^{Pool*}) - f_{cost}^{Wind}(u_\omega^{Sch*}) + f_{cost}^{Solar}(u_\omega^{Sch*}) + f_{cost}^{Stor}(u_\omega^{Sch*}) + f_{cost}^{Load}(u_\omega^{Sch*})$$

where $u_{master}^{Fut*}$ is the Optimal master decision variable for future markets, $u_{slave-\omega}^{Fut*}$, $u_\omega^{Pool*}$ and $u_\omega^{Sch*}$ are the Optimal slave decision variables for future markets, decision variable for pool markets and VPP scheduling corresponding to scenario ω. Each scenario ω is related to a probability. Then based on the set of pairs $\{(f_\omega(u^*), \beta_\omega), \omega \in \Omega\}$, a cumulative distribution function of profits can be determined as shown in FIG. 7.

Figure 7:
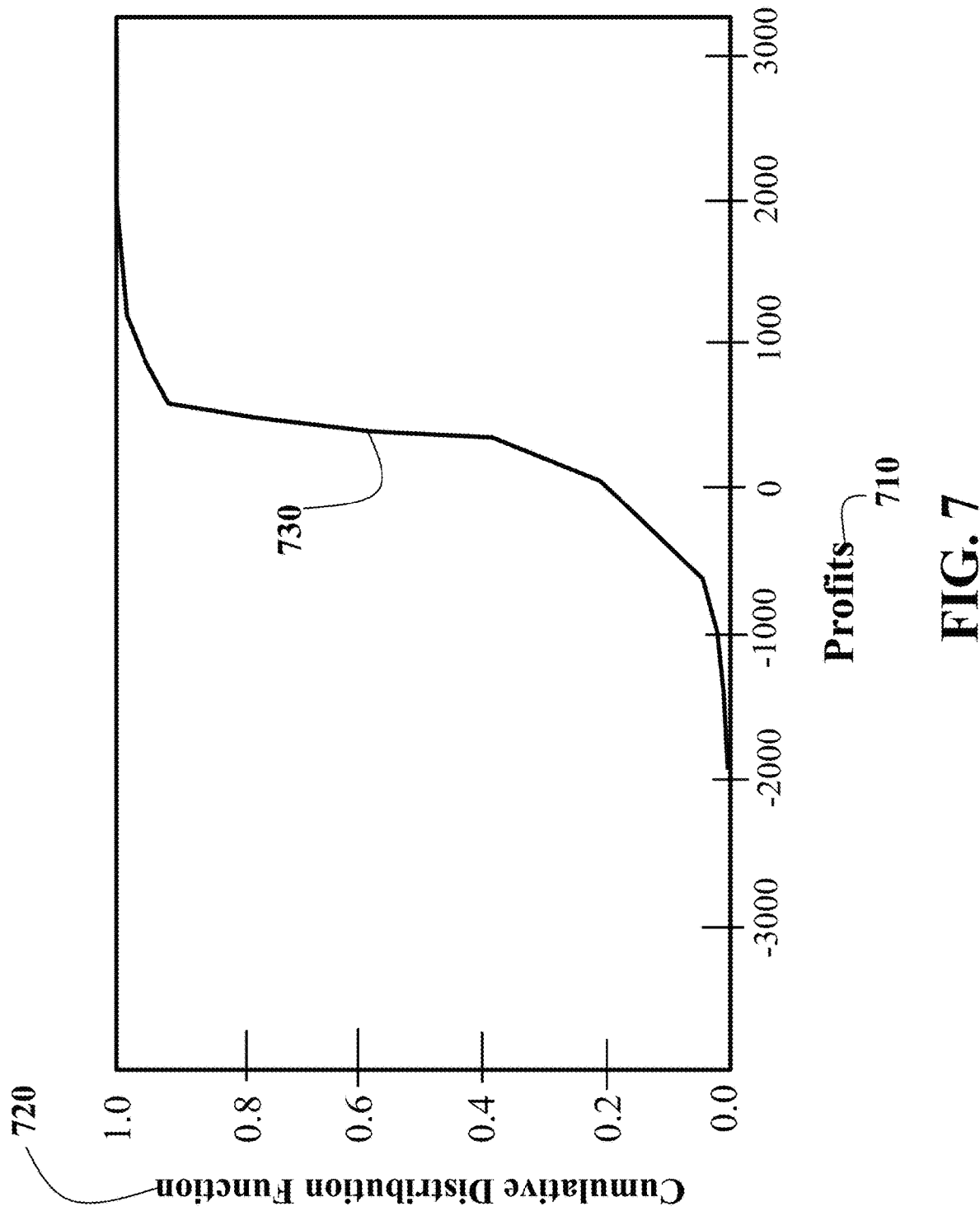
FIG. 7 is a graph illustrating a cumulative distribution function of profits for the virtual power plant (VPP), according to some embodiments of the present disclosure.

FIG. 7 is a schematic illustrating the cumulative distribution function of profits for the virtual power plant, according to some embodiments of the present disclosure. Specifically, FIG. 7 takes the profits 710 as its horizontal axis, and the cumulative probability distribution 720 of profits as its vertical axis. The curve for cumulative distribution function 730 is increasing with the growth of profits. The VPP can examine FIG. 7 to see if the profit distribution is satisfactory, for example if low profits for some scenarios are acceptable. Otherwise, necessary actions have to be taken to adjust the profit distribution matching the financial goals for the VPP. The usage of second-order stochastic dominance constraints is one of plausible actions to be taken by the VPP.

Figure 8:
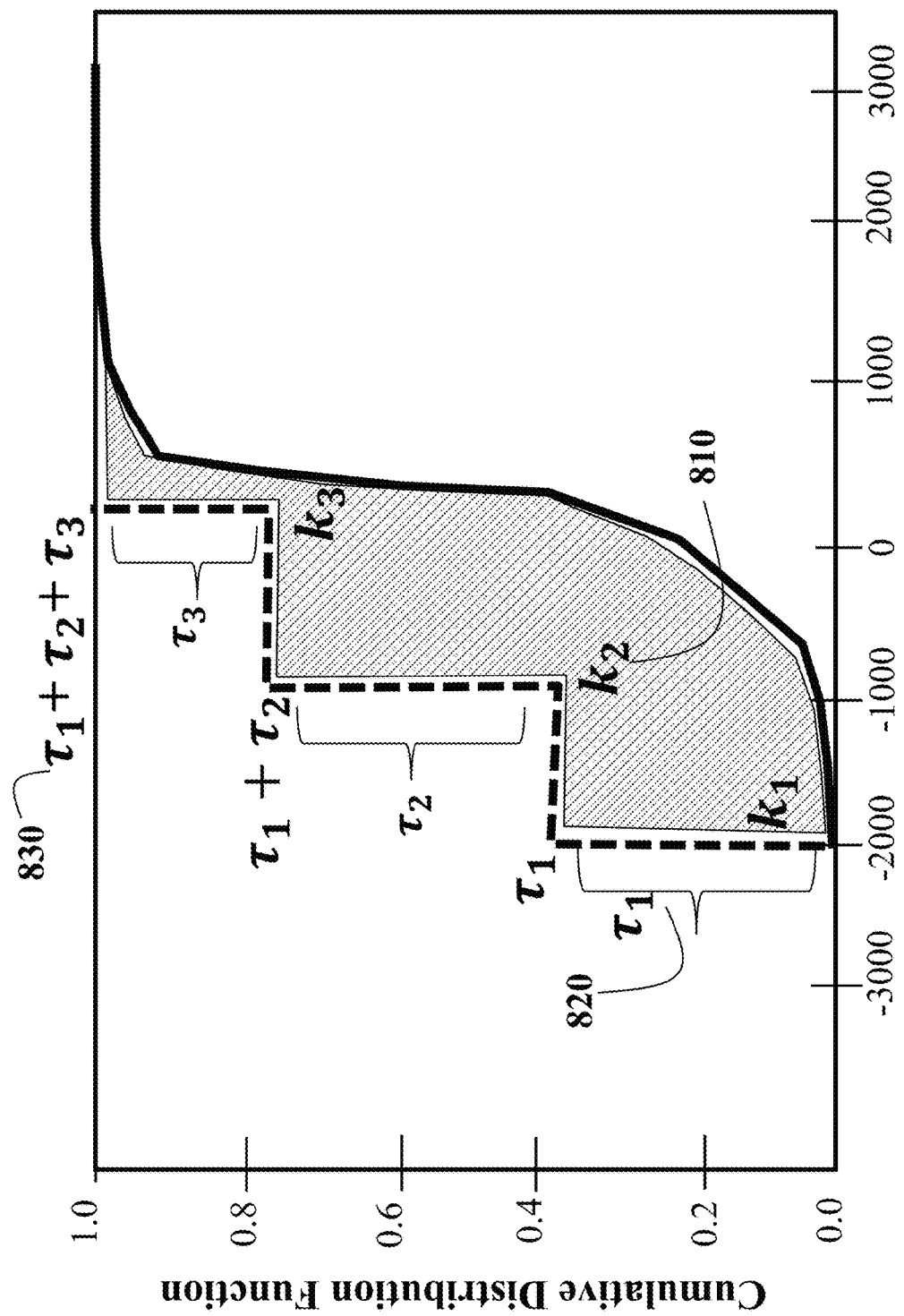
FIG. 8 is a graph illustrating a cumulative distribution function of profits and second-order stochastic dominance constraints for the virtual power plant (VPP), according to some embodiments of the present disclosure.

FIG. 8 is a schematic illustrating the cumulative distribution function of profits and second-order stochastic dominance constraints for the virtual power plant, according to some embodiments of the present disclosure. The second-order stochastic dominance constraints are represented as an ascending step-wise curve. The curve has a set of steps, each step corresponds to a profit value $k_v$ 810, and associated with a probability 820, $\tau_v$. $k_v$ 810 is the prefixed value of the benchmark scenario v, $\tau_v$ 820 is the probability of the benchmark scenario v. The sum of all $\tau_v$'s, 830 should be 1.0.

Although the cumulative distribution functions of a random variable provides complete information about its distribution, it may be too complicated to use it for risk management. That is why simple risk measures are commonly used to measure the risk levels of random variables. The stochastic dominance concept was used for risk management by adding stochastic dominance constraints to the set of constraints of a stochastic Optimization problem. The constraints impose a benchmark distribution that changes the feasible region of the Optimization problem. All undesirable solutions are excluded from the modified feasible region, and the Optimal portfolio obtained by solving the Optimization problem will outperform the imposed benchmark defined according to the risk manager's preference. Stochastic dominance constraints can be constructed in different orders; while the most commonly used are the first and second orders. The first-order stochastic dominance constraint makes the Optimization problem non-convex, while the problem with the second-order stochastic dominance constraints is convex. In both cases, a benchmark should be chosen carefully to avoid infeasibility of the problem. These constraints ensure that the Optimal objective function's distribution second-order stochastically dominates the predetermined benchmark distribution.

The benchmark can have any number of scenarios $N_V$. Each scenario has a probability $\tau_v$, $\Sigma_{v=1}^{N_V}=1$ and $\tau_v \geq 0$. It also has a prefixed value $k_v$, $k_v > k_{v'}$ when $v > v'$. The added second-order stochastic dominance constraints and the imposed benchmark will change the bidding and scheduling problem's feasible region to exclude the solutions that exceed the risk limits defined by the VPP or the risk manager behaving for the VPP. Hence, the Optimal profit distribution obtained by solving the problem will outperform (dominate) the predefined benchmark. The original Optimization, in which (75) is its objective function, and (74) is its constraint set can be converted to a new Optimization problem by adding second-order stochastic dominance constraints defined as follows:

$$\max_u f(u) = -f_{cost}^{Opt-S-prem}(u) - f_{cost}^{Opt-B-prem}(u) + f_{reve}^{Str-S}(u) - \quad (76)$$

$$f_{cost}^{Str-B}(u) + \sum_{\omega \in \Omega} \beta_\omega \left( f_{reve}^{Opt-S-exec}(u) - \beta_\omega f_{cost}^{Opt-B-exec}(u) \right) +$$

$$\sum_{\omega \in \Omega} \beta_\omega f_{reve}^{Pool}(u) - \sum_{\omega \in \Omega} \beta_\omega \left( f_{cost}^{Wind}(u) + f_{cost}^{Solar}(u) + f_{cost}^{Stor}(u) + f_{cost}^{Load}(u) \right)$$

Subject to:
Equation (74)

$$k_v - \{f_{reve}^{Str-S}(u) + f_{reve}^{Opt-S-exec}(u) + f_{reve}^{Pool}(u) - f_{cost}^{Opt-S-prem}(u) - f_{cost}^{Opt-B-prem}(u) - f_{cost}^{Str-B}(u) - f_{cost}^{Opt-B-exec}(u) - f_{cost}^{Wind}(u) - f_{cost}^{Solar}(u) - f_{cost}^{Stor}(u) - f_{cost}^{Load}(u)\} \leq s_{\omega v}, \forall \omega \in \Omega, v=\{1,\ldots,N_V\} \quad (77)$$

$$\Sigma_{\omega \in \Omega} \beta_\omega s_{\omega v} \leq \Sigma_{v'=1}^{N_V} \sigma_{v'} \max\{k_v - k_{v'}, 0\}, \forall v = \{1,\ldots,N_V\} \quad (78)$$

$$s_{\omega v} \geq 0, \forall \omega \in \Omega, v=\{1,\ldots,N_V\} \quad (79)$$

where $s_{\omega v}$ is an auxiliary decision variables related to the second-order stochastic dominance constraints.

The selection of the number of benchmark scenarios $N_V$ and their probabilities $\tau_v$ and prefixed values $k_v$, $v = \{1, \ldots, N_V\}$ is determined subjectively based on the risk manager's preference, within their predetermined ranges. A benchmark with more scenarios provides more flexible and, thus, better risk management. However, the computational cost of solving the problem described by (76)-(79) and (74) increases with the number of scenarios of the benchmark, because each scenario in the benchmark imposes $2\|\Omega\|+1$ constraints, where $|\Omega|$ is the number of scenarios of stochastic programming problem. As a tradeoff between risk management flexibility and computational cost, a benchmark with 1-3 scenarios would be enough for the virtual power plant scheduling and trading Optimization problem. The second-order SDCs guarantee that the Optimal objective's distribution outperforms the imposed benchmark. For instance, the worst scenario of the benchmark, imposed by the second-order SDCs is a minimum limit that can not be exceeded by the worst scenario of the Optimal objectives' distribution.

Information Gap Decision Theory-Based Risk Management

The trading and scheduling strategies are associated with both non-stochastic uncertainties and stochastic uncertainties. The inaccuracy of future market price forecast is deemed as the non-stochastic uncertainty, which is tackled using Information gap decision theory (IGDT).

Figure 9:
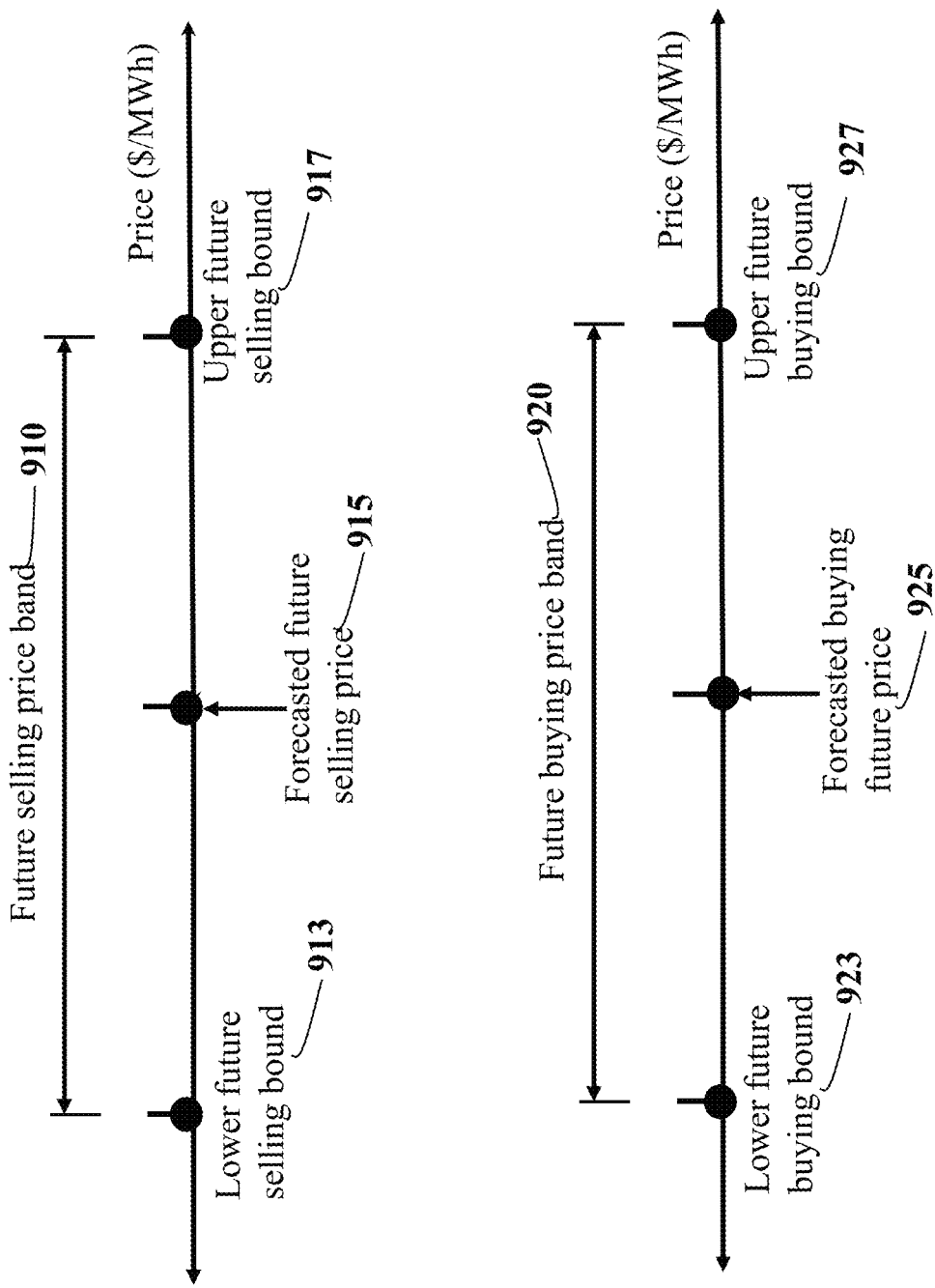
FIG. 9 is a schematic illustrating information gaps for buying and selling prices in future markets, according to some embodiments of the present disclosure.

FIG. 9 is a schematic illustrating the information gaps for future market prices, according to some embodiments of the present disclosure. The upper portion is used to demonstrate the variations of future selling prices. The forecasted future selling price 915 is within a selling price band 910 described by a lower selling price bound 913 and an upper selling price bound 917. The selling prices can be an execution price for a selling Option contract, or a price for a selling strip contract. The lower portion is used to demonstrate the variations of future buying prices. The forecasted future buying price 925 is within a buying price band 920 described by a lower buying price bound 923, and an upper buying price bound 927. The buying prices can be a premium or execution price for a buying Option contract, a premium price for a selling Option contract, or a price for a buying strip contract.

The fractional uncertainty model of information gap decision theory is utilized in this disclosure to represent the info gap region that restricts the predicted and actual future market prices, as denoted by:

$$\Lambda(\alpha, \bar{\lambda}) = \{\lambda : |\lambda - \bar{\lambda}| \leq \alpha \bar{\lambda}, \alpha \geq 0\} \quad (80)$$

where a represents the uncertainty horizon, $\lambda$ and $\bar{\lambda}$ are the vector of actual and predicted non-stochastic uncertainties. The risk attitude of the decision maker affects the trading strategies and revenues for a VPP. For example, a risk-averse (RA) decision maker of a VPP prefers a conservative strategy to a risky one wishing to be immune to unfavorable uncertainties, whereas a risk-seeking (RS) decision maker of a VPP prefers an opportunistic strategy to a conservative one by taking uncertainties as opportunity. In Information gap decision theory, the robust and opportunistic models are prescribed respectively for the risk-averse and risk-seeking decision makers to hedge the performance risk of the concerned problem against severe non-stochastic uncertainties.

The robust Information gap decision theory for Optimizing the future trading strategies of the risk-averse virtual power plant, i.e., risk-averse trading strategies, can be represented as the following bi-level model. $f^{RO}$ is the revenue determined by using predicted non-stochastic uncertainties.

$$\max_u \alpha \quad (81)$$

Subject to:

$$f_m^{RA} \geq f^{RD}(1 - \varepsilon_m) \quad (82)$$

$$f_m^{RA} = \min_{\lambda \in \Lambda(\alpha, \bar{\lambda})} f(u) \quad (83)$$

Subject to:
Eqs. (74)
Eqs. (77)-(79)

The upper-level model, described by (81)-(83) maximizes the uncertainty horizon α of the future market price, whereas the lower-level one, described by (83), (74), and (77)-(79) minimizes the risk-averse plant's revenue under the info gap region defined by α. The two models are connected by a user-set robust profit threshold, as in (82). By using the robust Information gap decision theory, the revenue of the risk-averse plant under non-stochastic uncertainties from the future market price would not be less than the robust profit threshold if the actual market price falls into the info gap region defined by (80). In the lower-level model, a can be regarded as a constant. So this model is actually an mixed integer linear programming problem, and the minimum can be attained only at the bound of the info gap region.

Since less future market selling price, or higher future market buying price will surely lead to less offering quantity and revenue, the solution of the lower-level model can be attained only at the lower bound of the info gap region for selling and the upper bound for buying. As a result, the bi-level model can be simplified as a single level one, i.e.

$$\max_u \alpha \quad (84)$$

Subject to:

$$f(u) \geq f^{R0}(1-\varepsilon_m) \quad (85)$$

$$\lambda = (1-\alpha)\bar{\lambda}, \forall \lambda \in \{\lambda_{ib}^{Opt\text{-}S\text{-}exec}, \lambda_{ib}^{Str\text{-}S}\} \quad (86)$$

$$\lambda = (1+\alpha)$$
$$\bar{\lambda}, \forall \lambda \in \{\lambda_{ib}^{Opt\text{-}S\text{-}prem}, \lambda_{ib}^{Opt\text{-}B\text{-}prem}, \lambda_{ib}^{Opt\text{-}B\text{-}exec}, \lambda_{ib}^{Str\text{-}B}\} \quad (87)$$

Eqs. (74)

Eqs. (77)-(79)

The opportunistic Information gap decision theory for optimizing the trading strategies of the risk-seeking virtual power plant, i.e., risk-seeking trading strategies, can be represented as the following bi-level model:

$$\min_u \alpha \quad (88)$$

Subject to:

$$f_m^{RS} \geq f^{R0}(1-\zeta_m) \quad (89)$$

$$f_m^{RS} = \max_{\lambda \in \Lambda(\alpha,\bar{\lambda})} f(u) \quad (90)$$

Subject to:

Eqs. (74)

Eqs. (77)-(79)

The upper-level model, described by (88)-(90) minimizes the uncertainty horizon α of future market prices, whereas the lower-level one, described by (90), (74), and (77)-(79) maximizes the risk-seeking virtual power plant's revenue based on the info gap region defined by α. The two models are connected by a user-set opportunistic profit threshold, as in (89). By using the opportunistic Information gap decision theory, the risk-seeking virtual power plant strives to achieve more revenues, if the actual future market price is favorable enough and beyond the info gap region defined by the Optimized uncertainty horizon. Less revenue than the threshold is acceptable, while larger revenue is possibly achieved only under favorable future market price. Since α can be regarded as a constant in the lower-level, it is easy to conclude that the maximum of the opportunistic model can be attained only at the upper bound of the info gap region for selling price and the lower bound for buying, i.e., the virtual power plant is with the highest selling price and the lowest buying price. As a result, the bi-level model can be simplified as the following single level one:

$$\min_u \alpha \quad (91)$$

Subject to:

$$f(u) \geq f^{R0}(1+\zeta_m) \quad (92)$$

$$\lambda = (1+\alpha)\bar{\lambda}, \forall \lambda \in \{\lambda_{ib}^{Opt\text{-}S\text{-}exec}, \lambda_{ib}^{Str\text{-}S}\} \quad (93)$$

$$\lambda = (1-\alpha)$$
$$\bar{\lambda}, \forall \lambda \in \{\lambda_{ib}^{Opt\text{-}S\text{-}prem}, \lambda_{ib}^{Opt\text{-}B\text{-}prem}, \lambda_{ib}^{Opt\text{-}B\text{-}exec}, \lambda_{ib}^{Str\text{-}S}\} \quad (94)$$

Eqs. (74)

Eqs. (77)-(79)

Figure 10A:
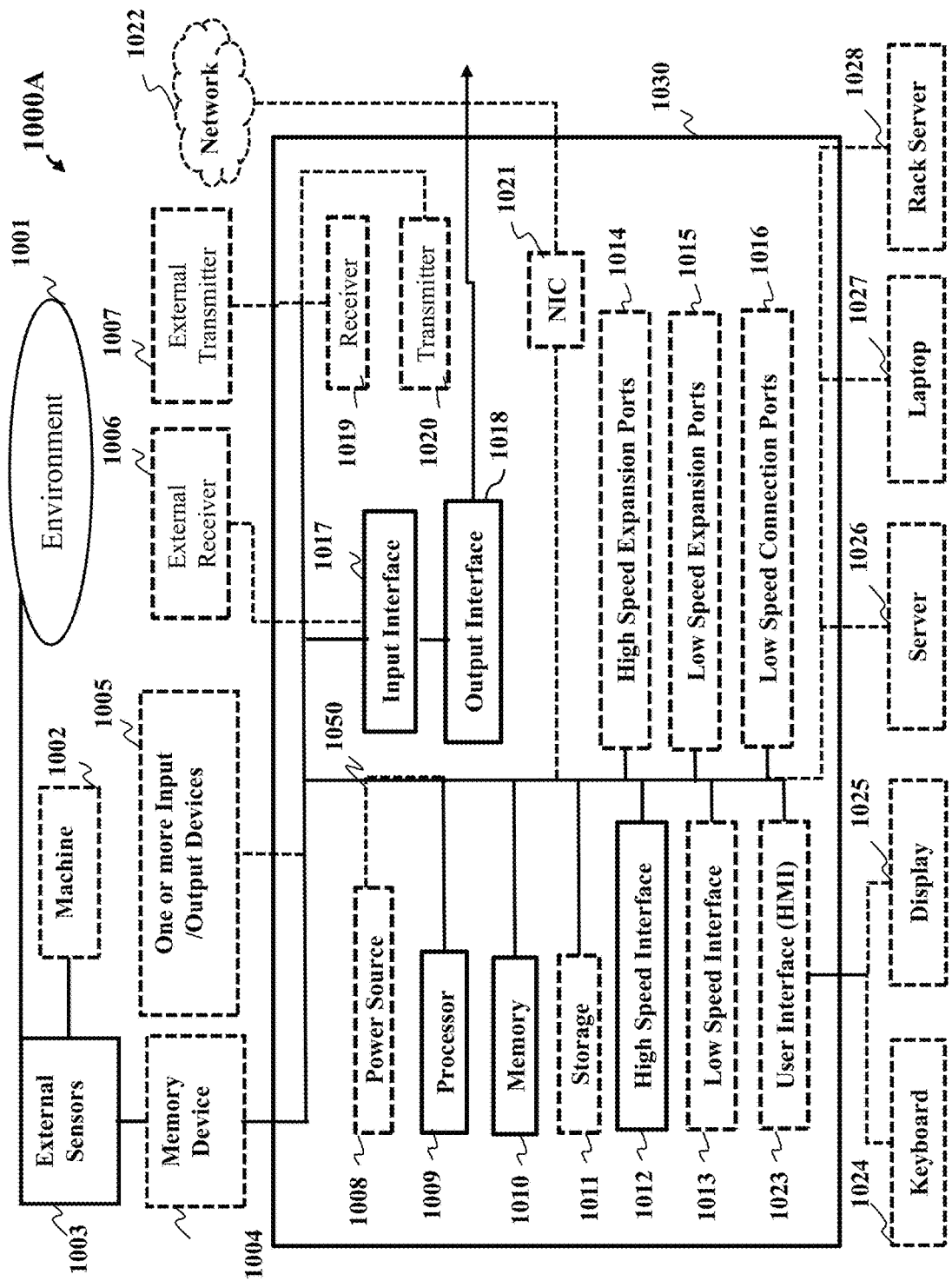
FIG. 10A is a schematic illustrating a computing apparatus that can be used to implement some techniques of the methods and systems, according to embodiments of the present disclosure.

FIG. 10A is a schematic illustrating by non-limiting example a computing apparatus 1000A that can be used to implement some techniques of the methods and systems, according to embodiments of the present disclosure. The computing apparatus or device 1000A represents various forms of digital computers, such as laptops, desktops, workstations, personal digital assistants, servers, blade servers, mainframes, and other appropriate computers.

The computing device 1000A can include a power source 1008, a processor 1009, a memory 1010, a storage device 1011, all connected to a bus 1050. Further, a high-speed interface 1012, a low-speed interface 1013, high-speed expansion ports 1014 and low speed expansion ports 1015, can be connected to the bus 1050. Also, a low-speed connection port6 1016 is in connection with the bus 1050. Contemplated are various component configurations that may be mounted on a common motherboard, by non-limiting example, 1030, depending upon the specific application. Further still, an input interface 1017 can be connected via bus 1050 to an external receiver 1006 and an output interface 1018. A receiver 1019 can be connected to an external transmitter 1007 and a transmitter 1020 via the bus 1050. Also connected to the bus 1050 can be an external memory 1004, external sensors 1003, machine(s) 1002 and an environment 1001. Further, one or more external input/output devices 1005 can be connected to the bus 1050. A network interface controller (NIC) 1021 can be adapted to connect through the bus 1050 to a network 1022, wherein data or other data, among other things, can be rendered on a third-party display device, third party imaging device, and/or third party printing device outside of the computer device 1000A. Contemplated is that the memory 1010 can store instructions that are executable by the computer device 1000A, historical data, and any data that can be utilized by the methods and systems of the present disclosure. The memory 1010 can include random access memory (RAM), read only memory (ROM), flash memory, or any other suitable memory systems. The memory 1010 can be a volatile memory unit or units, and/or a non-volatile memory unit or units. The memory 1010 may also be another form of computer-readable medium, such as a magnetic or Optical disk.

Still referring to FIG. 10A, a storage device 1011 can be adapted to store supplementary data and/or software modules used by the computer device 1000A. For example, the storage device 1011 can store historical data and other related data as mentioned above regarding the present disclosure. Additionally, or alternatively, the storage device 1011 can store historical data similar to data as mentioned above regarding the present disclosure. The storage device 1011 can include a hard drive, an Optical drive, a thumb-drive, an array of drives, or any combinations thereof. Further, the storage device 1011 can contain a computer-readable medium, such as a floppy disk device, a hard disk device, an Optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1009), perform one or more methods, such as those described above.

The system can be linked through the bus 1050 optionally to a display interface or user Interface (HMI) 1023 adapted to connect the system to a display device 1025 and keyboard 1024, wherein the display device 1025 can include a computer monitor, camera, television, projector, or mobile device, among others. Still referring to FIG. 10A, the computing device 1000A can include a user input interface 1017 adapted to a printer interface (not shown) can also be connected through bus 1050 and adapted to connect to a printing device (not shown), wherein the printing device can include a liquid inkjet printer, solid ink printer, large-scale commercial printer, thermal printer, UV printer, or dye-sublimation printer, among others. The high-speed interface 1012 manages bandwidth-intensive operations for the computing device 1000A, while the low-speed interface 1013 manages lower bandwidth-intensive operations. Such allocation of functions is an example only. In some implementations, the high-speed interface 1012 can be coupled to the memory 1010, a user interface (HMI) 1023, and to a keyboard 1024 and display 1025 (e.g., through a graphics processor or accelerator), and to the high-speed expansion ports 1014, which may accept various expansion cards (not shown) via bus 1050. In the implementation, the low-speed interface 1013 is coupled to the storage device 1011 and the low-speed expansion port 1015, via bus 1050. The low-speed expansion port 1015, which may include various communication ports (e.g., USB, Bluetooth, Ethernet, wireless Ethernet) may be coupled to one or more input/output devices 1005, and other devices a keyboard 1024, a pointing device (not shown), a scanner (not shown), or a networking device such as a switch or router, e.g., through a network adapter. Still referring to FIG. 10A, the computing device 1000A may be implemented in a number of different forms, as shown in the figure. For example, it may be implemented as a standard server 1026, or multiple times in a group of such servers. In addition, it may be implemented in a personal computer such as a laptop computer 1027. It may also be implemented as part of a rack server system 1028. Alternatively, components from the computing device 1000A may be combined with other components in a mobile device, such as a mobile computing device. Each of such devices may contain one or more of the computing device 1000A and the mobile computing device, and an entire system may be made up of multiple computing devices communicating with each other.

Figure 10B:
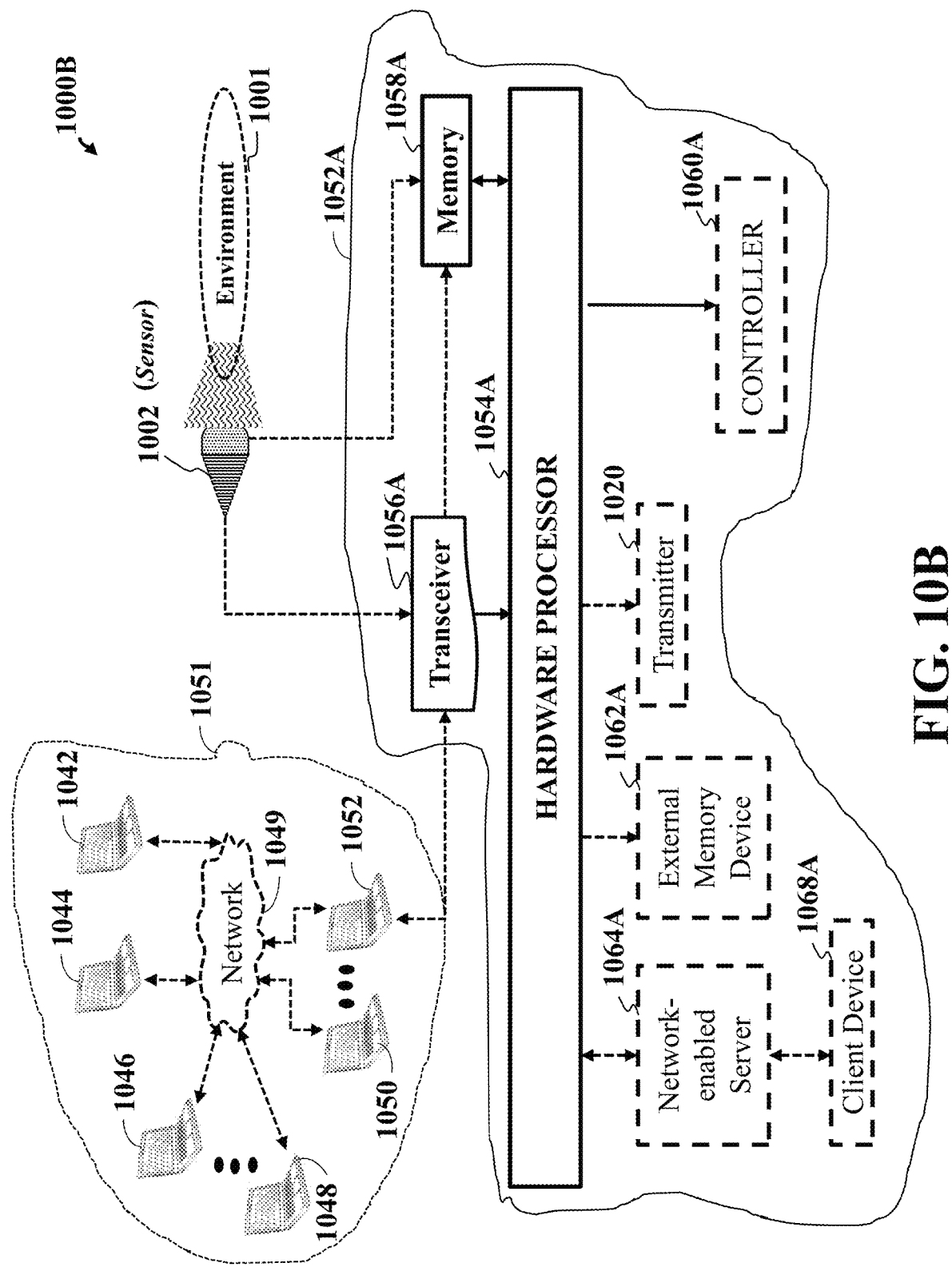
FIG. 10B is a block diagram illustrating some components that can be used for implementing the systems and methods, according to embodiments of the present disclosure.

FIG. 10B is a block diagram illustrating some computing devices that can be used for implementing the systems and methods that includes a network overview, according to embodiments of the present disclosure. An example of a network for implementing a VPP scheduling and trading system (VSTS) for future and pool markets 1051 can include a central computer 1042, i.e. may be more than one central computer and a network 1049 communicatively connected to networked computers 1044, 1046, 1048, 1050 and 1052. The central computer 1042 can manage and operate the VSTS 1051, and by non-limiting example, be associated with an operator that manages a virtual power plant that produces or consumes powers by distributed generations, energy storages or load demands associated with the networked computers 1044, 1046, 1048, 1050 and 1052. The central computer 1042 can be associated with one or more buses in an electric power system, one or more types of substations. Also, the network 1049 may by non-limiting example include computing hardware connected with a distributed generator, an energy storage, a local load, etc., wherein the computing hardware may include integrated circuits that are structured to perform the systems and method of the present disclosure. The central computer 1042 can receive power consumption forecasts from those computing devices associated with local power consumers which can be computing devices 1046, 1048, and receive power produced or stored forecast from those computing devices associated with power producers/suppliers or storages which can be computing devices 1044, 1050 and 1052. The operator or central computer 1042 can then compute bids/offers to the future and pool markets and schedule power dispatch for each participant of the VPP according to accepted bids/offers, and the power dispatch schedule is to be sent, and transmit to the computing devices 1044, 1046, 1048, 1050 and 1052. The central computer 1042 can be used by the computing devices 1044, 1046, 1048, 1050 and 1052 to predict produced or consumed powers. The central computer 1042 can also have other data such as future market data, pool market data that can be transmitted to the networked computers. Further, the central computer 1042 can be accessed over the network 1049, which can be used as a Local Area Network ("LAN") using wired networking (e.g., the Ethernet IEEE standard 802.3 or other appropriate standard) or wireless networking. For example, as noted above, the local power consumer can use computing devices 1046, 1048, to predict their power consumptions based on their current electricity needs, historical data and weather forecasts. The computing devices 1046, 1048, can be active controllers, which can be used to control or adjust the load demands of local power consumers. The local power consumer inputs their amount of electricity needed, or willing to curtailed for example, through a web site that transmits the requests over the Internet to the central computer 1042 used by a local power consumer to control the load demand. In such instances, the requests can be computed and transmitted by executing computer-executable instructions stored in non-transitory computer-readable media (e.g., memory or storage). The electricity requests include a quantity of the electricity needed or willing to curtail and a requested time. It is possible that the central computer 1042 can receive power demand and curtailment forecast from those computing devices associated with local power consumers 1046, 1048, and receive power supplied or stored forecast from those computing devices associated with electricity/power producers or storges via computing devices 1044, 1050 and 1052.

Still referring to FIG. 10B, 1000B includes a computing device 1052A (which is computing device 1052, which can be a controller such as a active controller), that includes a hardware processor 1054A, in communication with a transceiver 1056A. The transceiver 1056A can be in communication with a sensor 1002 or sensors, that collects data from an environment 1001 that is related to an area the power production or consumption occurs. The sensor 1002 converts an input into a signal, which can be stored in memory 1058A. The hardware processor 1054A in communication with a computer storage memory, i.e. memory 1058A, such that the memory 1058A includes stored data, including algorithms, instructions and other data, that can be implemented by the hardware processor 1054A. The computing device 1052A can further include a controller 1060A, external memory device 1062A, network-enabled server 1064A and a client device 1068A. It is contemplated the hardware processor 1054A can include two or more hardware processors depending upon the requirements of the specific application, wherein the processors can be either internal or external. Certainly, other components may be incorporated with method 1000B including output interfaces and transceivers, among other devices. It is possible the network 1049 can include, by non-limiting example, one or more local area networks (LANs) and/or wide area networks (WANs). Wherein the networking environments can be similar to enterprise-wide computer networks, intranets and the Internet. Contemplated for all the components mentioned that there can be any number of client devices, storage components, and data sources employed within the system 1000B. Each may comprise a single device or multiple devices cooperating in a distributed environment. Further, system 1000B can include one or more data source(s) (not shown). The data source(s) can comprise data resources for predicting maximum renewable generations, market prices and local load demands. The data provided by data source(s) may include historical future and pool market prices, and historical energy productions and consumptions.

The present disclosure improves the existing technology and technological field, for example the fields of electrical power grid management and energy storage control. For example, the computing hardware is activating and deactivating the charging and discharging of energy storages based on the longer trading target for future and pool market. Specifically, that the components of the systems and methods of the present disclosure are meaningfully applied to improve the efficiency of storage charging and discharging by following an Optimal trajectory determined for a longer time period and then making best use of storage's life cycle, which in turn, improves the electrical power grid management. Further, the steps of the systems and methods of the present disclosure are by computing hardware associated with the electrical device, such as energy storage device.

Features: According to the system embodiment recited in the claims, i.e. claim 1, the following aspects are contemplated to each include an another embodiment, or one or a combination of the aspects are intended to include embodiments. For example, an embodiment can include the system independent claim recited in the claims, i.e., claim 1, with an aspect of the energy system is one of, a virtual power plant, virtual energy plant, an energy hub, a multi-generation system or multi-energy systems. Another aspect can be the objectives prioritized relative to one another include one or more objectives associated with uncertainties of future market prices for future markets, that is prioritized relative to one or more objectives associated with uncertainties of pool market prices, renewable generation and load demand for a pool market. Still another aspect is the feasibility constraints for low risk tolerable level are information gap constraints associated with uncertainties of future market prices, and generated from a selling price for the lower bound of the information gap region, and a buying price for the upper bound of the information gap region. An aspect may be the feasibility constraints for high risk tolerable level are information gap constraints associated with uncertainties of future market prices, and generated from a selling price for the upper bound of the information gap region, and a buying price for the lower bound of the information gap region. Another aspect is the technical constraints are second-order stochastic dominance constraints (SDCs) associated with uncertainty of pool market prices, renewable generation and the load demand; wherein the SDCs are given by a step-wise profit probability distribution for stochastic scenarios describing the uncertainty of pool market prices, renewable generation and the load demand.

A particular aspect is the additional constraints are trading related constraints and scheduling related constraints. Wherein trading related constraints include: a) power balance equations between traded power and produced and consumed power for each time period and stochastic scenario; b) block-wise non-decreasing/non-increasing characteristics for biding/offering curves of future Option contracts and future strip contacts; c) non-increasing characteristics for offering curves of pool market, relationships between execution of trading block and trading rights for block of future Option contacts for each time period and stochastic scenario; d) mutual exclusivity for selling and buying Option and strip contracts; e) maximum allowed selling and buying powers for future Option and strip contracts at each time period, maximum allowed selling powers for pool market at each time period; scheduling related constraints can include: (1) energy balance equation for storages: (2) minimum and maximum stored energies for storages; (3) maximum charging and discharging capacities for storages; (4) maximum generated powers for wind and solar power plants; and (5) maximum load curtailments for loads. An aspect is that the energy market values include: a) energy blocks in which trading rights are purchased for future Option contracts; b) energy blocks purchased to be actually executed for future Option contracts at each time period and stochastic scenario; c) energy blocks to be traded for future strip contracts, selling powers to pool market at each time period and stochastic scenario; d) wherein the electricity rates include: (1) premium and execution prices for future selling and buying Option contracts; (2) prices for future selling and buying strip contracts; (3) selling prices for pool market at each time period and stochastic scenario; (4) wherein power producing, storing and consumption includes: (i) the charging/discharging statuses; (ii) powers and related wear cost for storages at each time period and stochastic scenario; (iii) the power generated and related wear cost for wind and solar power plants at each time period and stochastic scenario; (iv) the load curtailments and related cost for loads at each time period and stochastic scenario.

Another aspect is that the Optimized solution is obtained for a low risk tolerable level (i.e. risk-averse strategy) by solving a problem by maximizing an uncertainty horizon of future market prices under a profit constraint that requires the minimal profit for future prices within price bands defined by: a) the uncertainty horizon and forecasted future prices must be greater than a tolerable profit threshold; b) the minimal profit is determined by: (1) minimizing the expected total profits subject to the constraints of price bands; (2) technical constraints and additional constraints; (3) wherein the tolerable profit threshold is determined by multiplying a pre-determined less than one factor to the profit obtained by maximizing the expected total profits subject to the constraints of price bands, technical constraints, and additional constraints using the forecasted future prices. Still an aspect is that the Optimized solution is obtained for a low risk tolerable level (i.e. risk-averse strategy) by solving a problem by, maximizing an uncertainty horizon of future market prices subject to a set of constraints by: a) setting the selling prices using lower bounds of selling price bands defined by the uncertainty horizon and forecasted future selling prices; b) the buying prices using upper bounds of buying price bands defined by the uncertainty horizon and forecasted future buying prices; (c) wherein the set of constraints include: (1) a profit constraint that requires the profit must be greater than a tolerable profit threshold; (2) along with technical constraints and additional constraints; (3) wherein the tolerable profit threshold is determined by: (i) multiplying a pre-determined less than one factor to the profit obtained by maximizing the expected total profits subject to the constraints of price bands, technical constraints, and additional constraints using the forecasted future prices.

Another aspect is that the Optimized solution is obtained for a high risk tolerable level (i.e. risk-seeking strategy) by solving a problem by: a) minimizing an uncertainty horizon of future market prices under a profit constraint that requires the maximal profit for future prices within price bands defined by the uncertainty horizon and forecasted future prices must be greater than a tolerable profit threshold; b) wherein the maximal profit is determined by: (1) maximizing the expected total profits subject to the constraints of future price bands, technical constraints and additional constraints; wherein the tolerable profit threshold is determined by multiplying a pre-determined greater than one factor to the profit obtained by maximizing the expected total profits subject to the constraints of price bands, technical constraints, and additional constraints using the forecasted future prices. An aspect is the Optimized solution is obtained for a high risk tolerable level (i.e. risk-seeking strategy) by solving a problem by minimizing an uncertainty horizon of future market prices subject to a set of constraints by setting the selling prices using upper bounds of selling price bands defined by the uncertainty horizon and forecasted future selling prices, the buying prices using lower bounds of buying price bands defined by the uncertainty horizon and forecasted future buying prices; wherein the set of constraints include a profit constraint that requires the profit must be greater than a tolerable profit threshold, along with technical constraints and additional constraints; wherein the tolerable profit threshold is determined by multiplying a pre-determined greater than one factor to the profit obtained by maximizing the expected total profits subject to the constraints of price bands, technical constraints, and additional constraints using the forecasted future prices.

According to the system embodiment recited in the claims, i.e. claim 13, the following aspects are contemplated to each include an another embodiment, or one or a combination of the aspects are intended to include embodiments. For example, an embodiment can include the system independent claim recited in the claims, i.e. claim 13, with an aspect that the CC system is in communication with the renewable generating source, the energy storage system, the conversion system, the grid, data storage, a transceiver and communication network, such that the CC system includes a network cloud. Another aspect is the risk tolerance level for the energy system is communicated to the CC system via a network cloud by the energy system. Still another aspect is the energy storage device is a mobile energy storage device that stores energy to other energy storage devices.

According to the system embodiment recited in the claims, i.e., claim 17, the following aspects are contemplated to each include an another embodiment, or one or a combination of the aspects are intended to include embodiments. For example, an embodiment can include the system independent claim recited in the claims, i.e., claim 17, with the aspect based on the objective function, generating, at the VPP controller server, a VPP demand response (DR) event schedule that includes a charge/discharge schedule of one or more energy source devices and a consumption/curtailment schedule for one or more energy load devices; and communicating in real time, by the VPP controller server, the VPP DR event schedule to one or more VPP client servers, the VPP DR event schedule including control signals that are configured to affect an operating condition of one or more of the devices that are controlled by the VPP client servers. Another aspect is based on whether the reserve capacity request is either greater than or less than the updated reserve capacity forecast; and control a power output and power consumption of the subset of DERs with output of the dispatches in order to meet the reserve capacity request. Still another aspect is controlling of the at least one electrical power asset, such that electric power is provided, electric power is consumed, or electric power is provided and electric power is consumed.

Definitions: Decision Horizon, can include a set of pool trading time periods. Future Contracting Decisions, can be made at the beginning of the horizon and affect the whole horizon. Pool set of decisions are made throughout the horizon. Note that decisions related to the futures market are made before knowing the realizations of the stochastic variables (such as pool pricing, maximum renewable outputs, and local load demands), while decisions related to pool market are made using a rolling horizon approach. Strips and Options, are used to represent the contract formats in future markets. Risk Strategies, VPP buy electric energy in the futures market to sell it in the pool in order to increase its profit but at the cost of a higher risk, or can VPP sell its produced energy in the futures market which decreases the risk inherent to pool price volatility at the cost of a lower profit. Stochastic Variables, are considered as pool price, renewable generations, and local demands. Associated Uncertainty, is described through a set of scenarios created by using Monte-Carlo simulation, and each scenario contains a plausible realization of pool prices, generation resources and load demands. Deterministic, can be considered as the price for future market, but the impacts of its possible uncertain variation are modeled using information gap decision theory. VPP Goal, can include targeting of the plant is to maximize its profit while controlling the risk of variability of that profit. Selling energy in the pool entails high profit volatility as pool prices vary significantly, while selling through future forward contracts at fixed prices results in less volatility, but this Option prevents the producer to take advantage of periods of high pool prices. Thus, the VPP should determine its Optimal involvement in the pool, as well as the future contracts to sign. It also needs to establish the best production and consumption schedule for its production resources and loads. It is assumed the VPP is a price-taker producer, i.e., a producer whose market actions do not alter the market clearing prices. Pool Offer, in the bidding time period consists of non-increasing piecewise linear curve providing energies and their corresponding selling prices. Future selling contracting, in the bidding time period consists of non-increasing step-wise curve providing energy blocks and their corresponding selling prices. Future buying contracting, in the bidding time period consists of non-decreasing step-wise curve providing energy blocks and their corresponding buying prices. Processor, by non-limiting example, as stated in claim 1 can be computer hardware, i.e. a logic circuitry that responds to and processes the basic instructions that drive a computer to implement the algorithm described in present disclosure.

Embodiments

The following description provides exemplary embodiments only, and is not intended to limit the scope, applicability, or configuration of the disclosure.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A method for distributing energy along a given scheduling horizon for an energy system, the method comprising:
    determining an optimal value of a risk tolerance level for an uncertainty horizon of long-term forecasting non-stochastic uncertainties for the energy system, the risk tolerance level having objectives prioritized relative to one another and constrained by short-term forecasting stochastic uncertainties, wherein the energy system comprises an energy generation source, an energy storage system, and a demand load,
    wherein the long-term forecasting non-stochastic uncertainties and the short-term forecasting stochastic uncertainties are related to forecasted values including one or more of energy market values, electricity rates, and power producing, storing and consumption,
    wherein the objectives are optimized to generate solutions that maximize an expected total pool market revenue and an expected total future market revenue while minimizing an expected total energy cost for the energy system, and
    wherein the objectives are optimized subject to feasibility constraints generated from a lower bound and an upper bound of an information gap region defined for long-term uncertainties, and technical constraints wherein the technical constraints are generated from a lower boundary for a profit distribution using second-order stochastic dominance constraints, and wherein the additional constraints include a constraint that requires a level of balancing of power provided to and from a grid of the energy generation source;
    identifying long-term and short-term energy distribution schedules for charging or discharging the energy storage system, controlling local load demands and contributing to power balancing, based on the solutions of the optimization; and
    controlling the distribution of energy to manage the charging or discharging of the energy storage system, the controlling of local load demands and the contributing of power balancing according to the identified long-term and short-term energy distribution schedules.

2. The method of claim 1, wherein the energy system is one of a virtual power plant, a virtual energy plant, an energy hub, a multi-generation system or multi-energy systems.

3. The method of claim 1, wherein the objectives prioritized relative to one another include one or more objectives associated with uncertainties of future market electricity prices for future markets, that is prioritized relative to one or more objectives associated with uncertainties of pool market electricity prices, renewable generation and load demand for a pool market.

4. The method of claim 1, wherein the feasibility constraints include constraints for low risk tolerable level that are information gap constraints associated with uncertainties of future market electricity prices, and generated from a selling price for the lower bound of the information gap region, and a buying price for the upper bound of the information gap region.

5. The method of claim 1, wherein the feasibility constraints include constraints for high risk tolerable level that are information gap constraints associated with uncertainties of future market electricity prices, and generated from a selling price for the upper bound of the information gap region, and a buying price for the lower bound of the information gap region.

6. The method of claim 1, wherein the technical constraints are second-order stochastic dominance constraints (SDCs) associated with uncertainty of pool market electricity prices, renewable generation and the demand load; wherein the SDCs are given by a step-wise net reward profit probability distribution for stochastic scenarios describing the uncertainty of pool market prices, renewable generation and the demand load.

7. The method of claim 1,
    wherein the additional constraints are trading related constraints, and scheduling related constraints,
    wherein the trading related constraints include power balance equations between traded power and produced and consumed power for each time period and stochastic scenario, block-wise non-decreasing/non-increasing characteristics for biding/offering curves of future Option contracts and future strip contracts, non-increasing characteristics for offering curves of pool market, relationships between execution of trading block and trading rights for block of future Option contracts for each time period and stochastic scenario, mutual exclusivity for selling and buying Option and strip contracts, maximum allowed selling and buying powers for future Option and strip contracts at each time period, maximum allowed selling powers for pool market at each time period, and
    wherein the scheduling related constraints include energy balance equation for storages, minimum and maximum stored energies for the storages, maximum charging and discharging capacities for the storages, maximum generated powers for wind and solar power plants, and maximum load curtailments for loads.

8. The method of claim 1,
    wherein the energy market values include energy blocks in which trading rights are purchased for future Option contracts, energy blocks purchased to be actually executed for future Option contracts at each time period and stochastic scenario, energy blocks to be traded for future strip contracts, selling powers to pool market at each time period and stochastic scenario, wherein the electricity rates include premium and execution electricity prices for future selling and buying Option contracts, electricity prices for future selling and buying strip contracts, selling prices for pool market at each time period and stochastic scenario, and wherein power producing, storing and consumption includes the charging/discharging statuses, powers and related wear cost for storages at each time period and stochastic scenario, the power generated and related wear cost for wind and solar power plants at each time period and stochastic scenario, the load curtailments and related cost for loads at each time period and stochastic scenario.

9. The method of claim 1, wherein the solutions of the optimization include a solution obtained for a low risk tolerable level by solving a problem by maximizing an uncertainty horizon of future market electricity prices under a profit constraint.

10. The method of claim 1, wherein the solutions of the optimization include a solution obtained for a low risk tolerable level by solving a problem by maximizing an uncertainty horizon of future market electricity prices subject to a set of constraints that include a profit constraint that requires a profit to be greater than a tolerable threshold, along with the technical constraints and the additional constraints.

11. The method of claim 1, wherein the solutions of the optimization include a solution obtained for a high risk tolerable level by solving a problem by minimizing an uncertainty horizon of future market electricity prices under a profit constraint.

12. The method of claim 1, wherein the solutions of the optimization include a solution obtained for a high risk tolerable level by solving a problem by minimizing an uncertainty horizon of future market electricity prices subject to a set of constraints that include a profit constraint that requires a profit to be greater than a tolerable threshold, along with the technical constraints and the additional constraints.

13. A system for distributing energy along a given scheduling horizon for an energy system including a renewable generating source, an energy storage system, a demand load and a conversion system, the system comprising:
  a centralized control (CC) system configured to:
    determine, an optimal value of a risk tolerance level for an uncertainty horizon of long-term forecasting non-stochastic uncertainties, for the energy system, the risk tolerance level having objectives prioritized relative to one another and constrained by short-term forecasting stochastic uncertainties, wherein the energy storage system stores energy from at least one of the renewable generating source and a grid, and supplies energy to at least one of the demand load and the grid, and wherein the conversion system directs a flow of energy between the energy storage system, the renewable generating source and the grid,
    wherein the long-term forecasting non-stochastic uncertainties and the short-term forecasting stochastic uncertainties are related to forecasted values including one or more of energy market values, electricity rates, and power production, storage and consumption,
    wherein the objectives are optimized to generate solutions that maximize an expected total pool market revenue and an expected total future market revenue while minimizing an expected total energy cost for the energy system, and
    wherein the objectives are optimized subject to feasibility constraints generated from a lower bound and an upper bound of an information gap region defined for long-term uncertainties, and technical constraints and additional constraints, wherein the technical constraints are generated from a lower boundary for a profit distribution using second-order stochastic dominance constraints, and wherein the additional constraints include a constraint that requires a level of balancing of power provided to and from the grid;
    identify long-term and short-term energy distribution schedules for charging or discharging the energy storage system, controlling local load demands and contributing to power balancing, based on the solutions of the optimization; and
    control the distribution of energy to manage the charging or discharging of the energy storage system, the controlling of local load demands and the contributing of power balancing according to the identified long-term and short-term energy distribution schedules.

14. The system of claim 13, wherein the CC system is in communication with the renewable generating source, the energy storage system, the conversion system, the grid, a data storage, a transceiver and a communication network, such that the CC system includes a network cloud.

15. The system of claim 13, wherein the risk tolerance level for the energy system is communicated to the CC system via a network cloud by the energy system.

16. The system of claim 13, wherein the energy storage device is a mobile energy storage device.

17. A system for distributing energy along a given scheduling horizon for a virtual power plant (VPP) including a renewable generating source, an energy storage device, and a conversion system, the grid, the system comprising:
  a centralized control (CC) system in communication with the renewable generating source, the energy storage device, a grid and the conversion system, the CC system configured to:
    determine an optimal value of a risk tolerance level for an uncertainty horizon of long-term forecasting non-stochastic uncertainties for the VPP, the risk tolerance level having objectives prioritized relative to one another and constrained by short-term forecasting stochastic uncertainties, wherein the energy storage device is configured to store energy from the renewable generating source and the grid, and supply energy to a local demand load and the grid, and wherein the conversion system is configured to direct a flow of energy between the energy storage device, the renewable generating source and the grid,
    wherein the long-term forecasting non-stochastic uncertainties and the short-term forecasting stochastic uncertainties are related to forecasted values including one or more of energy market values, electricity rates, and power production, storage and consumption,
    wherein the objectives are optimized to generate solutions that maximize an expected total pool market revenue and an expected total future market revenue while minimizing an expected total energy cost for the energy system, and
    wherein the objectives are optimized subject to feasibility constraints generated from a lower bound and an upper bound of an information gap region defined for long-term uncertainties, and technical constraints and additional constraints, wherein the technical constraints are generated from a lower boundary for a profit distribution using second-order stochastic dominance constraints, and wherein the additional constraints include a constraint that requires a level of balancing of power provided to and from the grid;

identify long-term and short-term energy distribution schedules for charging or discharging the energy storage device, controlling local load demands and contributing to power balancing, based on the solutions of the optimization; and control the distribution of energy for the VPP to manage the charging or discharging of the energy storage device, the controlling of local load demands and the contributing of power balancing according to the identified long-term and short-term energy distribution schedules.

18. The system of claim 17, further comprising a VPP controller server configured to:

generate, a VPP demand response (DR) event schedule that includes a charge/discharge schedule of one or more energy source devices and a consumption/curtailment schedule for one or more energy load devices; and communicate in real time, the VPP DR event schedule to one or more VPP client servers, the VPP DR event schedule further including control signals that are configured to affect an operating condition of one or more of devices that are controlled by the VPP client servers.

* * * * *